(12) United States Patent
Mizoi et al.

(10) Patent No.: US 9,884,574 B2
(45) Date of Patent: Feb. 6, 2018

(54) VEHICLE SEAT

(71) Applicant: TS TECH CO., LTD., Asaka-shi, Saitama (JP)

(72) Inventors: Kensuke Mizoi, Tochigi (JP); Ryuzaburo Abe, Tochigi (JP); Kenichi Niitsuma, Tochigi (JP); Soichiro Tanaka, Tochigi (JP); Chihiro Muto, Tochigi (JP); Takeshi Ito, Saitama (JP); Ai Furuta, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 243 days.

(21) Appl. No.: 14/647,709

(22) PCT Filed: Nov. 27, 2013

(86) PCT No.: PCT/JP2013/081973
§ 371 (c)(1),
(2) Date: May 27, 2015

(87) PCT Pub. No.: WO2014/084283
PCT Pub. Date: Jun. 5, 2014

(65) Prior Publication Data
US 2015/0321590 A1    Nov. 12, 2015

(30) Foreign Application Priority Data

Nov. 28, 2012 (JP) .................. 2012-259384
Nov. 28, 2012 (JP) .................. 2012-259385
Nov. 15, 2013 (JP) .................. 2013-237090

(51) Int. Cl.
*B60N 2/48*    (2006.01)
*B60N 2/44*    (2006.01)
(Continued)

(52) U.S. Cl.
CPC ........... *B60N 2/643* (2013.01); *B60N 2/0284* (2013.01); *B60N 2/42* (2013.01); *B60N 2/4235* (2013.01);
(Continued)

(58) Field of Classification Search
CPC ...... B60N 2/4415; B60N 2/4492; B60N 2/42; B60N 2/42754; B60N 2/4235; B60N 2/4808
See application file for complete search history.

(56) References Cited

U.S. PATENT DOCUMENTS 4,589,695 A * 5/1986 Isono ..................... A47C 7/022
                                                              297/284.11
5,228,183 A * 7/1993 Saeki .................. B29C 44/1271
                                                                   29/450
(Continued)

FOREIGN PATENT DOCUMENTS

EP    0 229 737 A2    7/1987
EP    2 431 220 A1    3/2012
(Continued)

OTHER PUBLICATIONS

Extended European Search Report issued for related application EP 13858575.7, dated Dec. 3, 2015, 7 pages.
(Continued)

*Primary Examiner* — Timothy J Brindley
(74) *Attorney, Agent, or Firm* — Drinker Biddle & Reath LLP

(57) ABSTRACT

A seating posture is stabilized for the shoulders of a passenger seated on a vehicle seat. A vehicle seat is provided with a seat back configured to support the seated person from the rear. A shoulder support portion of the seat back configured to support a corresponding one of the shoulders of the seated passenger includes an air cell configured to
(Continued)

expand when air is supplied. When the air cell expands, one end portion of the shoulder support portion on the outside in the width direction of the vehicle seat moves more forward than the other end portion of the shoulder support portion on the inside in the width direction.

19 Claims, 56 Drawing Sheets

(51) Int. Cl.
*B60N 2/42* (2006.01)
*B60N 2/64* (2006.01)
*B60N 2/68* (2006.01)
*B60N 2/427* (2006.01)
*B60N 2/62* (2006.01)
*B60N 2/66* (2006.01)
*B60N 2/02* (2006.01)

(52) U.S. Cl.
CPC ......... *B60N 2/42754* (2013.01); *B60N 2/449* (2013.01); *B60N 2/4415* (2013.01); *B60N 2/48* (2013.01); *B60N 2/62* (2013.01); *B60N 2/66* (2013.01); *B60N 2/68* (2013.01)

(56) References Cited

U.S. PATENT DOCUMENTS

| | | | | |
|---|---|---|---|---|
| 5,280,997 A * | 1/1994 | Andres | .................. | A47C 7/467 |
| | | | | 297/284.6 |
| 5,772,281 A * | 6/1998 | Massara | ............... | B60N 2/4415 |
| | | | | 297/284.4 |
| 6,283,547 B1 * | 9/2001 | Bauer | .................. | B60N 2/4415 |
| | | | | 297/284.1 |
| 7,234,771 B2 * | 6/2007 | Nakhla | ................ | B60N 2/2845 |
| | | | | 297/219.12 |
| 7,641,281 B2 * | 1/2010 | Grimm | .................. | B60N 2/449 |
| | | | | 297/216.13 |
| 8,136,883 B2 * | 3/2012 | Rehfuss | ............... | B60N 2/4415 |
| | | | | 297/284.6 |
| 8,602,449 B2 * | 12/2013 | Kojima | .................. | B60N 2/449 |
| | | | | 280/728.2 |
| 8,702,120 B2 * | 4/2014 | Kalisz | .................. | B60R 21/207 |
| | | | | 180/271 |
| 9,393,891 B2 * | 7/2016 | Beier | | |
| 9,434,341 B2 * | 9/2016 | Kaneko | .................. | B60N 2/449 |
| 9,475,446 B2 * | 10/2016 | Hotta | .................... | B60R 21/207 |
| 9,586,553 B2 * | 3/2017 | Wiegelmann | ......... | B60R 21/207 |
| 2006/0001304 A1 | 1/2006 | Walker et al. | | |
| 2006/0163850 A1 * | 7/2006 | Inazu | ................... | B60N 2/5825 |
| | | | | 280/730.2 |
| 2008/0136237 A1 * | 6/2008 | Kayumi | ................ | B60N 2/4492 |
| | | | | 297/284.9 |
| 2008/0191532 A1 * | 8/2008 | Wain | .................... | B60N 2/4415 |
| | | | | 297/284.1 |
| 2010/0117414 A1 | 5/2010 | Hwang et al. | | |
| 2015/0108744 A1 * | 4/2015 | Line | ..................... | B60N 2/6009 |
| | | | | 280/730.2 |
| 2016/0129920 A1 * | 5/2016 | Hall | ....................... | B60W 50/16 |
| | | | | 701/1 |
| 2016/0288838 A1 * | 10/2016 | Kindaichi | ............ | B62D 21/157 |
| 2016/0339814 A1 * | 11/2016 | Tanaka | ................. | B60N 2/4415 |
| 2017/0008480 A1 * | 1/2017 | Ohno | .................... | B60N 2/4279 |
| 2017/0036634 A1 * | 2/2017 | Ohno | .................... | B60R 21/013 |

FOREIGN PATENT DOCUMENTS

| | | | |
|---|---|---|---|
| JP | 63-5846 U | | 1/1988 |
| JP | 64-1545 U | | 1/1989 |
| JP | 06-133829 A | | 5/1994 |
| JP | 09-010067 A | | 1/1997 |
| JP | 2000-095000 A | | 4/2000 |
| JP | 2004-167070 A | | 6/2004 |
| JP | 2006-006957 A | | 1/2006 |
| JP | 2010-115474 A | | 5/2010 |
| JP | 3162435 U | | 9/2010 |
| JP | 2010-235021 A | | 10/2010 |
| WO | WO2010/131322 | * | 11/2010 |

OTHER PUBLICATIONS

Office Action issued in related application JP 2012-259385, dated Aug. 23, 2016, with machine generated English language translation, 7 pages.

Office Action issued for related application CN 201380062316.7, dated Apr. 5, 2016, with partial English language translation, 11 pages.

* cited by examiner

FRONT ←→ REAR

FRONT ←——→ REAR

FIG. 24
NORMAL STATE
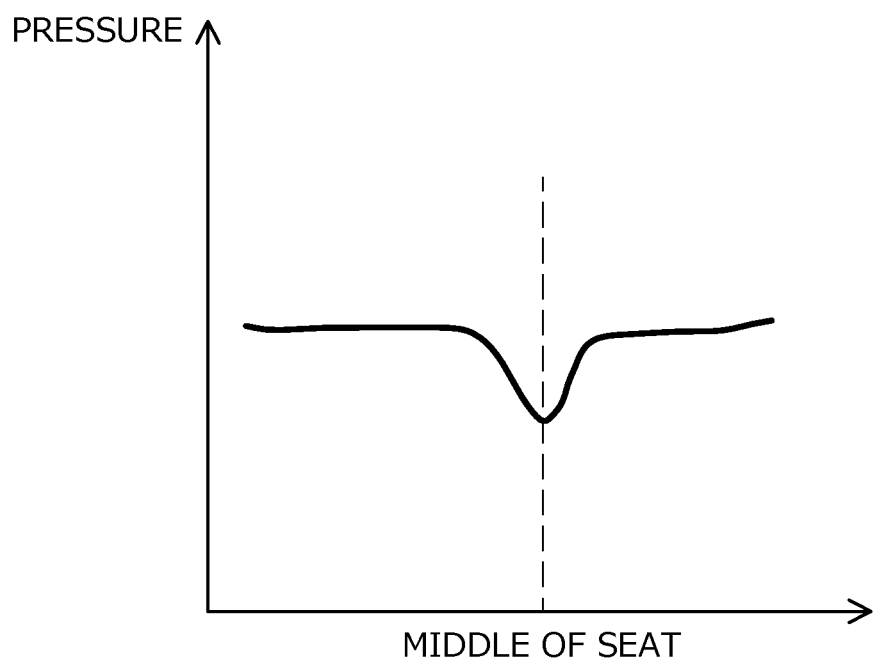
BACKBONE DISTORTED STATE
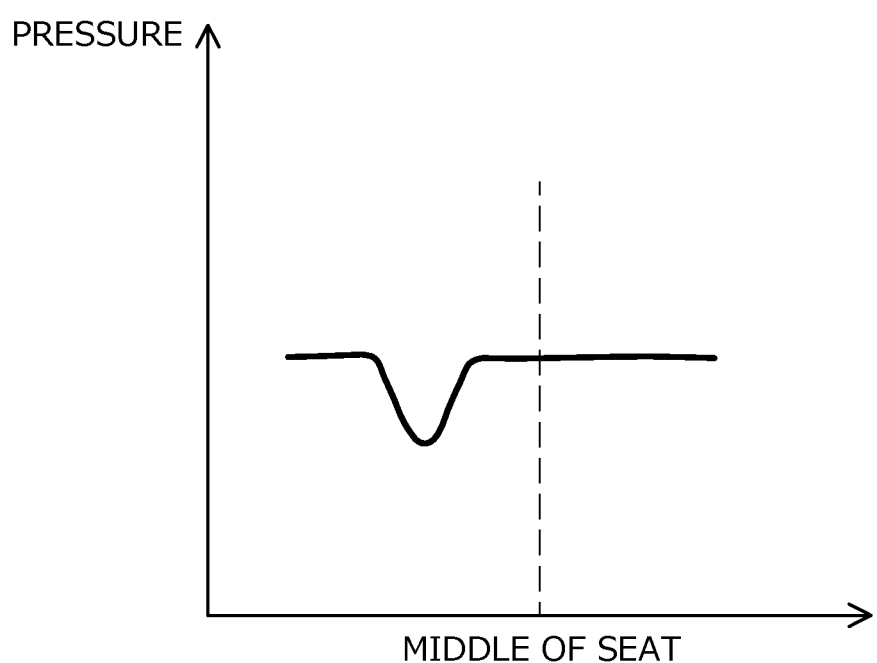

FIG. 42

| SEATED PASSENGER | REGION A | REGION B | REGION C |
|---|---|---|---|
| 1 | $Xa1$ | $Xb1$ | $Xc1$ |
| 2 | $Xa2$ | $Xb2$ | $Xc2$ |
| 3 | $Xa3$ | $Xb3$ | $Xc3$ |
| 4 | $Xa4$ | $Xb4$ | $Xc4$ |

VEHICLE SEAT

CROSS REFERENCE TO RELATED APPLICATIONS

This application is a National Stage Entry application of PCT Application No. PCT/JP2013/081973, filed Nov. 27, 2013, which claims the priority benefit of Japanese Patent Application No. 2012-259384, filed Nov. 28, 2012, Japanese Patent Application No. 2012-259385, filed Nov. 28, 2012, and Japanese Patent Application No. 2013-237090, filed Nov. 15, 2013, the contents of all being incorporated herein by reference.

BACKGROUND

Disclosed herein is a vehicle seat, and particularly a vehicle seat including a seat back that supports a seated passenger from the rear.

One indicator of the performance required for vehicle seats is that the posture (the seating posture) of a seated passenger is stably maintained, and some techniques satisfying such a need have been already developed (see, e.g., Japanese Patent Document No. 2000-095000 A ("the '000 Document"). In the vehicle seat described in the '000 Document, each shoulder portion of a seat back includes a protective bag. This protective bag expands forward in a raised shape to cover around the shoulders of a seated passenger from the above toward the front, thereby engaging with the shoulders of the seated passenger. As a result, the posture of the seated passenger is stably maintained, and in particular, upward movements of the upper body of the seated passenger can be reduced.

In the vehicle seat described in the '000 Document, the above-described protective bags expand when an excessive load is input to the seat due to, e.g., rear-end collision, and are used as the device for protecting the seated passenger in emergency situations. It is also required for a normal vehicle running situation to hold the shoulders of the seated passenger to maintain the posture of the seated passenger as in the vehicle seat described in the '000 Document. More specifically, of the pressure applied to the seat back in a seated state, the pressure applied to the portions supporting the shoulders of the seated passenger is relatively high, and therefore, the posture of the seated passenger can be stabilized in such a manner that the shoulders of the seated passenger are held while a vehicle is running. In order to provide such an advantage, it is required to properly hold the shoulders of the seated passenger while the vehicle is running.

In the configuration in which, as described in the '000 Document, the protective bags cover around the shoulders of the seated passenger from the above toward the front to engage with the shoulders of the seated passenger, forward movement and upward movement of the body of the seated passenger can be restricted, but it is difficult to restrict movement in the right-to-left direction (i.e., in the width direction of the seat). As long as movement of the upper body of the seated passenger in the right-to-left direction cannot be properly restricted, it is difficult to stabilize the posture of the seated passenger.

Moreover, when the shoulders of the seated passenger are held only by the protective bags in order to maintain the posture of the seated passenger, sufficiently-large protective bags are required to hold the shoulders of the seated passenger. This leads to an increase in the size of the protective bag and the size of the mechanism for expanding the protective bag.

SUMMARY

The system described below has been made in view of the above-described problems, and is intended to provide a vehicle seat capable of properly holding the shoulders of a seated passenger to stabilize the seating posture of the seated passenger. It is further designed to properly hold the shoulders of the seat passenger even in the configuration in which a seat back includes a bag having a reduced size.

The above-described problem is solved by a vehicle seat described below, which is a vehicle seat including a seat back configured to support a seated passenger from the rear. A shoulder support portion provided at the seat back and configured to support each of the shoulders of the seated passenger includes a bag configured to expand by supply of fluid into the bag, and the bag expands such that a one end portion of the shoulder support portion positioned on the outside in the width direction of the vehicle seat moves more forward than a other end portion of the shoulder support portion positioned on the inside in the width direction.

According to the above-described vehicle seat, the bag expands to move the one end portion of the shoulder support portion of the seat back on the outside in the width direction of the vehicle seat more forward than the other end portion of the shoulder support portion on the inside in the width direction. Accordingly, force acts inward in the width direction on the shoulders of the seated passenger from the seat back. That is, the shoulders of the seated passenger are pushed inward in the width direction by the shoulder support portions of the seat back. As a result, displacement movement of the upper body of the seated passenger in the width direction can be reduced, and therefore, the posture of the seated passenger is stably maintained.

In the above-described vehicle seat, when the bag expands to move the one end portion more forward than the other end portion, an upper portion of the one end portion preferably moves more forward than a lower portion of the one end portion.

According to the above-described configuration, force acting on the shoulders of the seated passenger from the seat back has a component acting inward in the width direction and a component acting downward. That is, the shoulders of the seated passenger are pushed inward in the width direction, as well as being pressed downward. As a result, upward displacement movement of the upper body of the seated passenger is reduced, and therefore, the posture of the seated passenger can be stably maintained.

In the above-described vehicle seat, the bag is preferably provided such that an end of the bag on the outside in the width direction is positioned below an end of the bag on the inside in the width direction.

The above-described configuration is intended for the shoulders of a typical seated passenger, and the bag is disposed to extend downward toward the outside. Thus, the shoulder support portions of the seat back support the shoulders of the seated passenger to cover around the shoulders. As a result, the posture of the seated passenger is further stabilized.

In the above-described vehicle seat, the seat back preferably includes a plate-shaped member disposed in the front of the bag. When the bag expands while contacting a rear surface of the plate-shaped member, the plate-shaped member preferably deforms such that a portion of the plate-shaped member corresponding to the one end portion is positioned more forward than a portion of the plate-shaped member corresponding to the other end portion, thereby moving the one end portion more forward than the other end portion. The area of a front surface of the plate-shaped member is preferably greater than the area of a surface of the bag contacting the plate-shaped member.

In the above-described configuration, the plate-shaped member having a greater area than that of the bag is disposed in the front of the bag. As compared to the configuration of using only the bag without providing the plate-shaped member, the plate-shaped member expands the area where force acts on the shoulders of the seated passenger by expansion of the bag. Thus, the shoulders of the seated passenger can be properly held even if the size of the bag is reduced.

In the above-described vehicle seat, the seat back preferably includes a plate-shaped member disposed in the front of the bag. When the bag expands while contacting the rear surface of the plate-shaped member, the plate-shaped member preferably deforms such that the portion of the plate-shaped member corresponding to the one end portion is positioned more forward than the portion of the plate-shaped member corresponding to the other end portion, thereby moving the one end portion more forward than the other end portion. In the plate-shaped member, a dividing portion configured to divide the plate-shaped member into first and second portions is preferably formed between the first and second portions, the first portion being positioned in the rear of one of the shoulders of the seated passenger, the second portion being positioned in the rear of the other shoulder of the seated passenger.

In the above-described configuration, in the plate-shaped member, the first portion positioned in the rear of one of the shoulders of the seated passenger and the second portion positioned in the rear of the other shoulder of the seated passenger are separated from each other by the dividing portion. Thus, the first and second portions can be separately deformed, and in other words, both shoulders of the seated passenger can be separately held. Consequently, the force generated when the shoulders of the seated passenger are held in order to stably maintain the posture of the seated passenger can be adjusted separately for the right and left shoulders.

In the above-described vehicle seat, the seat back preferably includes a plate-shaped member disposed in the front of the bag, and movement restriction portions disposed respectively at both end portions of the seat back in the width direction and configured to restrict movement of the seated passenger in the width direction. The plate-shaped member preferably includes a deformable portion configured to, when the bag expands while contacting the rear surface of the plate-shaped member, deform such that the portion of the plate-shaped member corresponding to the one end portion is positioned more forward than the portion of the plate-shaped member corresponding to the other end portion, and an extension positioned below the deformable portion and extending downward to pass a space between the movement restriction portions in the width direction. The extension is preferably narrower than the deformable portion in the width direction, and is preferably disposed such that both ends of the extension in the width direction are positioned on the inside of the movement restriction portions.

In the above-described configuration, in the plate-shaped member extending along the vertical direction, the portion (the deformable portion) moving to hold the shoulders of the seated passenger is in a wider shape so that the shoulders can be properly held. On the other hand, the extension positioned below the deformable portion is in a narrower shape so that contact with the movement restriction portions can be reduced. As a result, contact between the plate-shaped member and each movement restriction portion can be reduced, and the shoulders of the seated passenger can be properly held using the plate-shaped member.

In the above-described vehicle seat, the bag preferably includes two bags arranged in the width direction, and a tube member, that forms a path of fluid to be supplied to each bag and to be sucked from each bag, is preferably disposed to pass a middle portion of the seat back where a clearance is formed between the bags in the width direction.

In the above-described configuration, the tube member is disposed using the space where the clearance is formed between the bags, and therefore, the size of the seat back can be reduced.

In the above-described vehicle seat, the seat back preferably includes a plate-shaped member disposed in the front of the bags. The plate-shaped member preferably includes, at an upper end portion thereof, a deformable portion configured to, when the bag expands while contacting the rear surface of the plate-shaped member, deform such that the portion of the plate-shaped member corresponding to the one end portion is positioned more forward than the portion of the plate-shaped member corresponding to the other end portion. Of an outer edge of the deformable portion, an end portion positioned on the outside in the width direction preferably inclines downward toward the outside in the width direction.

In the above-described configuration, the end portion of the outer edge of the deformable portion positioned on the outside in the width direction is intended for the shoulders of a typical seated passenger, and inclines downward toward the outside. Thus, the shoulder support portions of the seat back support the shoulders of the seated passenger to cover around the shoulders. As a result, the posture of the seated passenger is further stabilized.

In the above-described vehicle seat, the seat back preferably includes a plate-shaped member disposed in the front of the bags. The plate-shaped member preferably includes a deformable portion configured to, when the bag expands while contacting the rear surface of the plate-shaped member, deform such that the portion of the plate-shaped member corresponding to the one end portion is positioned more forward than the portion of the plate-shaped member corresponding to the other end portion, and an extension positioned below the deformable portion and extending downward. The deformable portion and the extension are preferably integrally connected together.

In the above-described configuration, the plate-shaped member expands the area where force acts on the shoulders of the seated passenger by expansion of the bags. Moreover, since the plate-shaped member extends downward, the above-described acting area of the force generated by expansion of the bags can be further expanded, and the waist of the seated passenger can be also held.

In the above-described vehicle seat, the seat back preferably includes a seat back frame forming a framework of the seat back, a support plate attached to the seat back frame and configured to support the bags from the rear, and a holding portion attached to the seat back frame and configured to contact a rear surface of the support plate to hold the support plate.

In the above-described configuration, since the support plate configured to support the bags is held by the holding portion, the bags can be properly supported at predetermined positions.

According to various embodiments of the present invention, since the shoulders of the seated passenger are pushed inward in the width direction by the shoulder support portions of the seat back, the posture of the seated passenger is stably maintained.

Moreover, according to various embodiments of the present invention, upward displacement movement of the upper body of the seated passenger is reduced, the posture of the seated passenger is more stably maintained.

In addition, according to various embodiments of the present invention, the bags are intended for the shoulders of a typical seated passenger, and are arranged to extend downward toward the outside. Thus, the shoulder support portions support the shoulders of the seated passenger to cover around the shoulders, and as a result, the posture of the seated passenger is further stabilized.

Further, according to various embodiments of the present invention, since the plate-shaped member is provided in the front of the bags, the area is expanded, where force acts on the shoulders of the seated passenger by expansion of the bags. As a result, the shoulders of the seated passenger can be properly held even if the size of the bags is reduced.

Moreover, according to various embodiments of the present invention, in the plate-shaped member, the first portion positioned in the rear of one of the shoulders of the seated passenger and the second portion positioned in the rear of the other shoulder of the seated passenger separately deform. Thus, the force generated when the shoulders of the seated passenger are held can be adjusted separately for the right and left shoulders.

In addition, according to various embodiments of the present invention, contact between the plate-shaped member and the movement restriction portion provided at each end portion of the seat back in the width direction can be reduced, and the shoulders of the seated passenger can be properly held using the plate-shaped member.

Further, according to various embodiments of the present invention, the tube member is disposed using the space where the clearance is formed between the bags, and therefore, the size of the seat back can be reduced.

Moreover, according to various embodiments of the present invention, at the outer edge of the deformable portion positioned at an upper end portion of the plate-shaped member, the end portion positioned on the outside in the width direction inclines downward toward the outside. Thus, the shoulder support portions support the shoulders of the seated passenger to cover around the shoulders. As a result, the posture of the seated passenger is further stabilized.

In addition, according to various embodiments of the present invention, since the plate-shaped member extends downward, the acting area of the force generated by expansion of the bags can be further expanded, and the waist of the seated passenger can be also held.

Further, according to various embodiments of the present invention, since the support plate configured to support the bags is held by the holding portion, the bags can be properly supported at the predetermined positions.

BRIEF DESCRIPTION OF THE DRAWINGS

FIG. 24 is graphs showing the relationship between a body pressure distribution on a rear side and the position of the center of gravity.

FIG. 42 is a table showing reference curving state data stored in a memory.

DETAILED DESCRIPTION

A vehicle seat of an embodiment (the present embodiment) of the present invention will be described below with reference to drawings. In the description below, a "front-to-back direction" indicates the front-to-back direction of the vehicle seat, and is coincident with a running direction while a vehicle is running. Moreover, a "width direction" indicates the width direction of the vehicle seat, and specifically indicates the right-to-left direction when the vehicle seat is viewed from the front.

The embodiment described below will be set forth merely as an example for the sake of ease of understanding the invention, and is not intended to limit the present invention. It will be appreciated that changes and modifications may be made to the present invention without departing from the spirit of the present invention and that the present invention includes all equivalents. In particular, changes may be optionally made to, e.g., the shape, material, and arrangement position of each component described below without departing from the spirit of the present invention.

Outline Configuration of Vehicle Seat of the Present Embodiment

Figure 1:
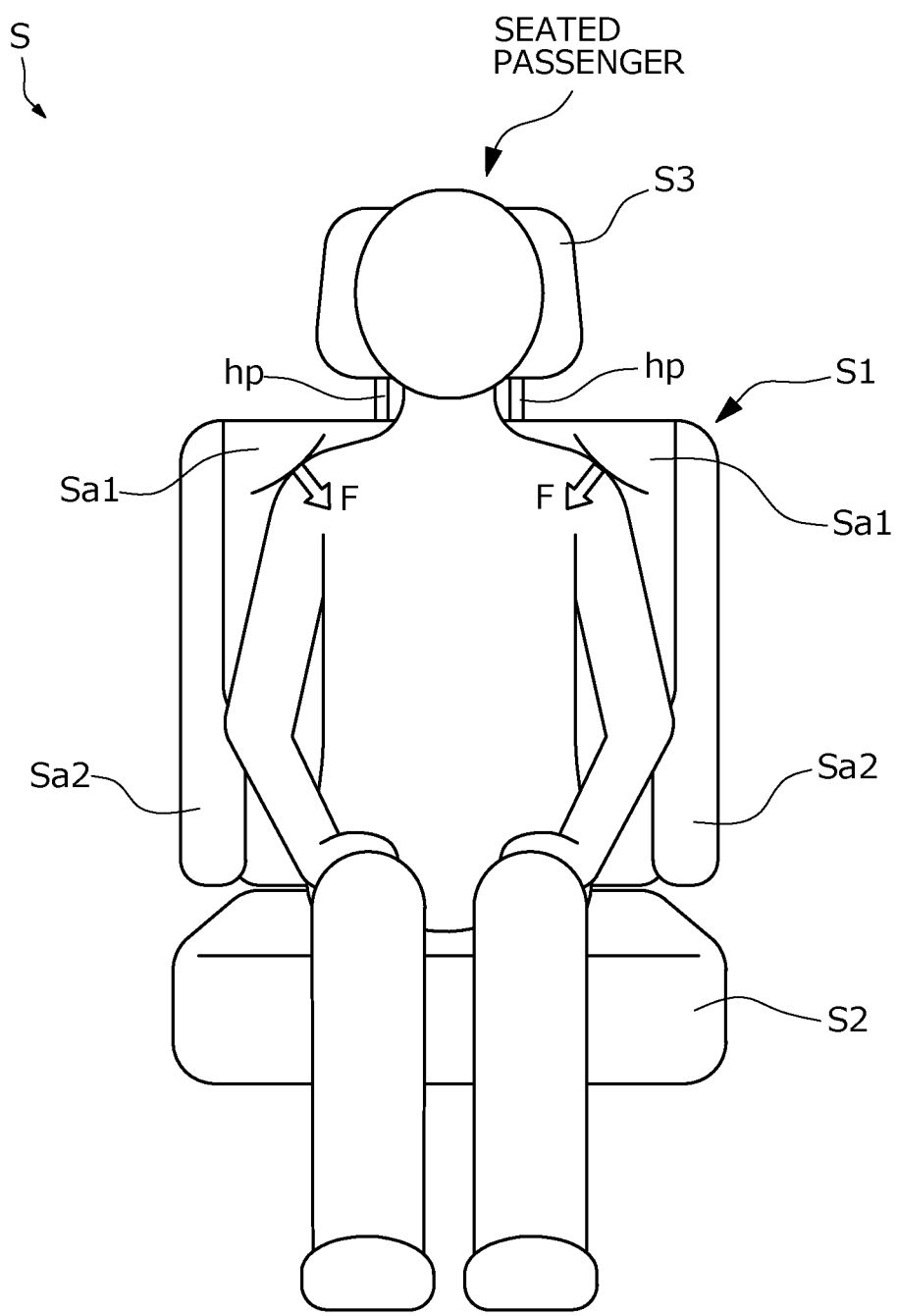
FIG. 1 is a front pictorial view illustrating an outline configuration of a vehicle seat of an embodiment of the present invention.

First, an outline configuration of a vehicle seat (hereinafter referred to as a "seat S") of the present embodiment will be described with reference to FIG. 1. FIG. 1 is a view illustrating the outline configuration of the seat S.

The seat S has a basic configuration (except for later-described novel shoulder support portions) in common with a conventional vehicle seat. That is, the seat S includes, as illustrated in FIG. 1, a seat back S1 configured to support a seated passenger from the rear, a seat cushion S2 configured to support the buttocks of the seated passenger, and a head rest S3 configured to support the head of the seated passenger. The seat back S1 and the seat cushion S2 are configured such that a pad material placed in a frame body is covered with a cover material. The head rest S3 is configured such that a pad material disposed on a core material for the head is covered by a cover material. In addition, the head rest S3 is supported by head rest pillars hp at an upper end portion of the seat back S1.

The seat S comprises shoulder support portions Sa1 of the seat back S1 configured to support the shoulders of the seated passenger. Specifically, when the passenger is seated on the seat S to lean on the seat back S1, the shoulder support portions Sa1 cover around the shoulders of the seated passenger to hold the shoulders. More specifically, the mechanism mounted in each shoulder support portion Sa1 operates to cause the shoulder support portion Sa1 to contact the shoulder of the seated passenger. Accordingly, force indicated by a character F in FIG. 1 acts from the shoulder support portions Sa1 to the shoulders of the seated passenger. Such force F has, as illustrated in FIG. 1, a component acting inward in the width direction and a component acting downward. Thus, the shoulders of the seated passenger are pressed inward in the width direction, as well as being pressed downward.

As described above, each shoulder of the seated passenger is supported by a corresponding one of the shoulder support portions Sa1 of the seat back S1, and then, is pressed inward in the width direction and downward. Thus, displacement movement of the upper body of the seated passenger in the width direction and the vertical direction can be reduced. This can stably maintain the posture of the seated passenger while the passenger is seated on the seat S.

Internal Structure of Seat Back

Figure 2:
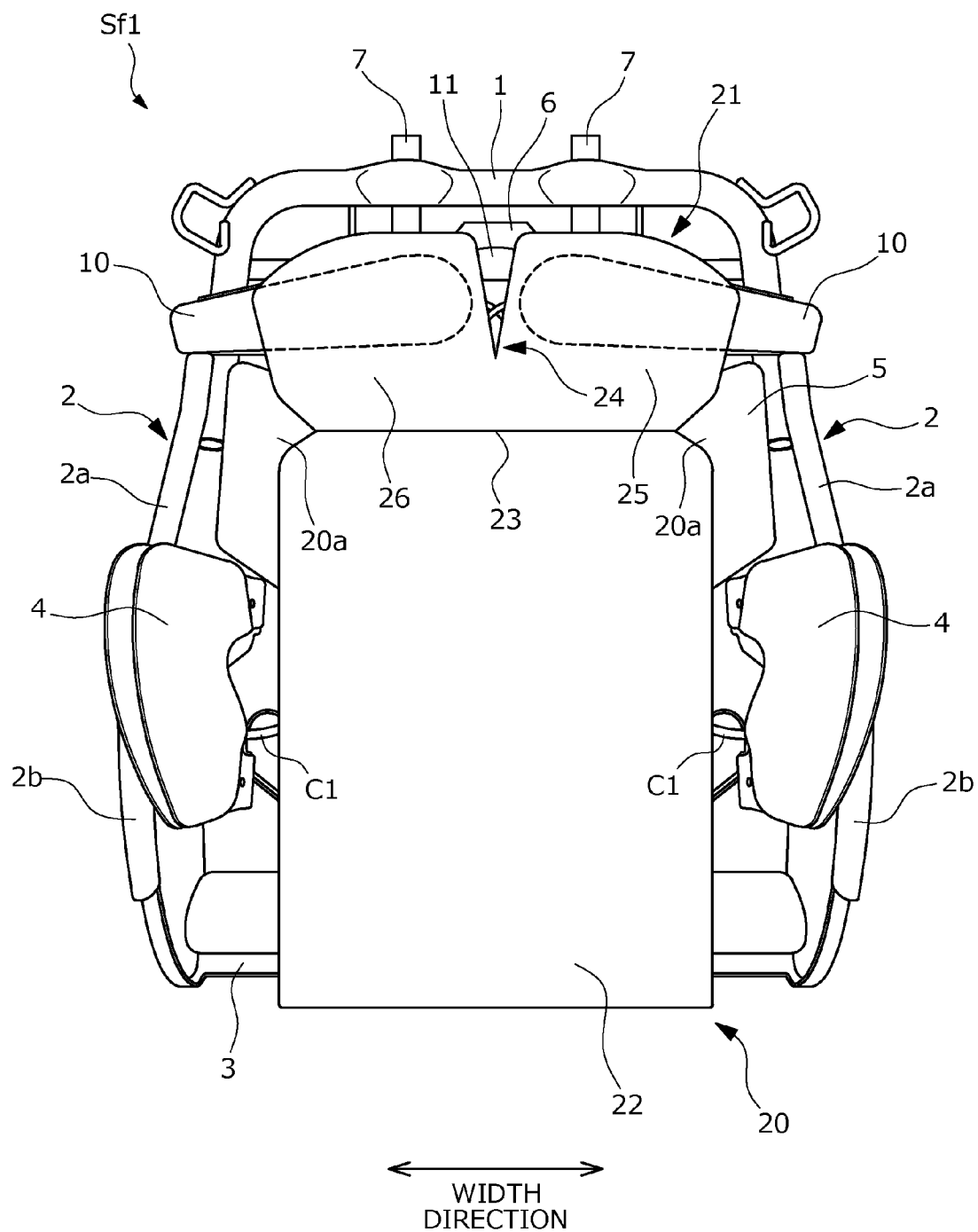
FIG. 2 is a front view illustrating the configuration of a seat back frame provided at a vehicle seat of an embodiment of the present invention.
Figure 3:
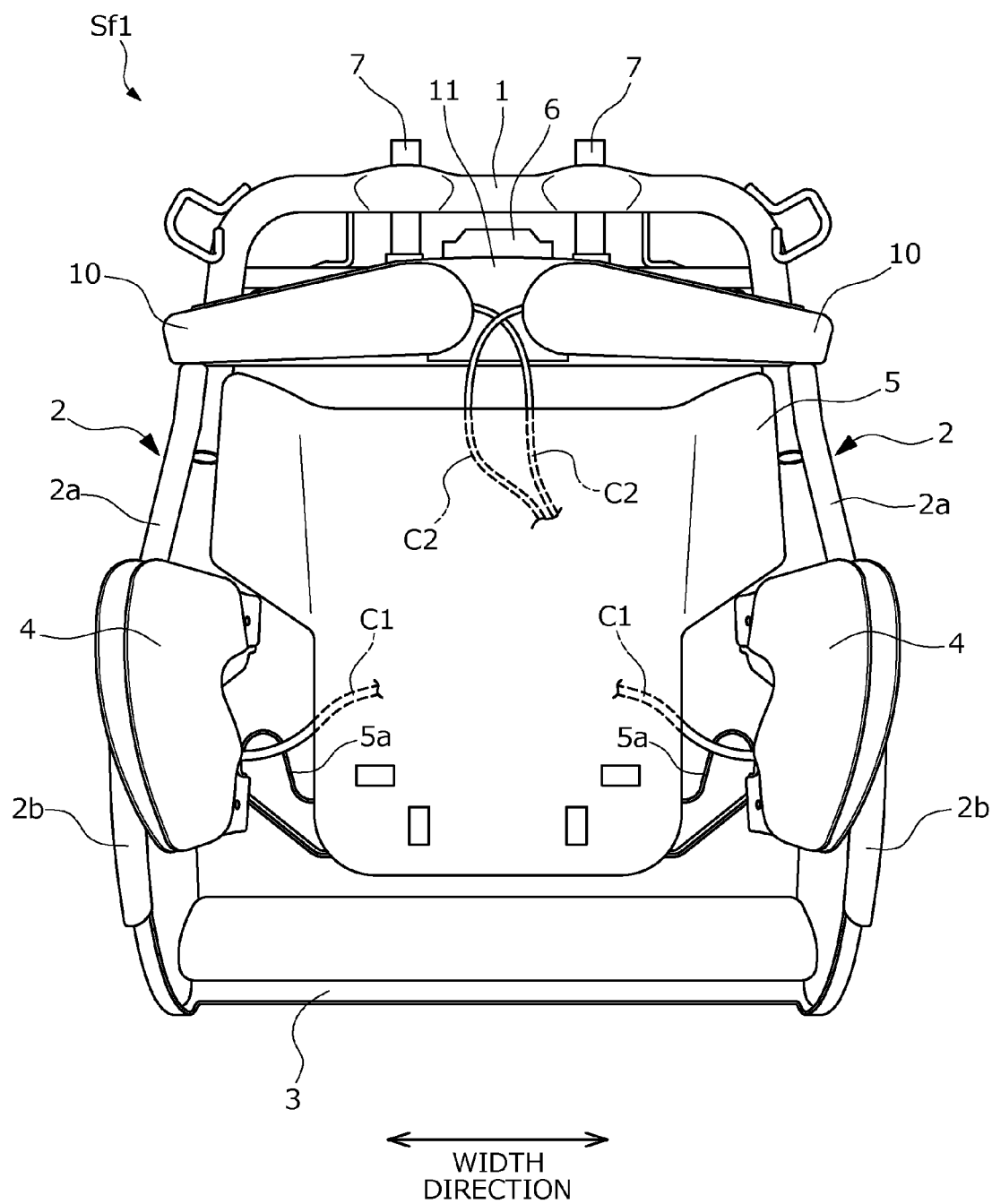
FIG. 3 is a front view illustrating the state in which a plate-shaped member of the seat back frame of the vehicle seat of the embodiment of the present invention is detached.
Figure 4:
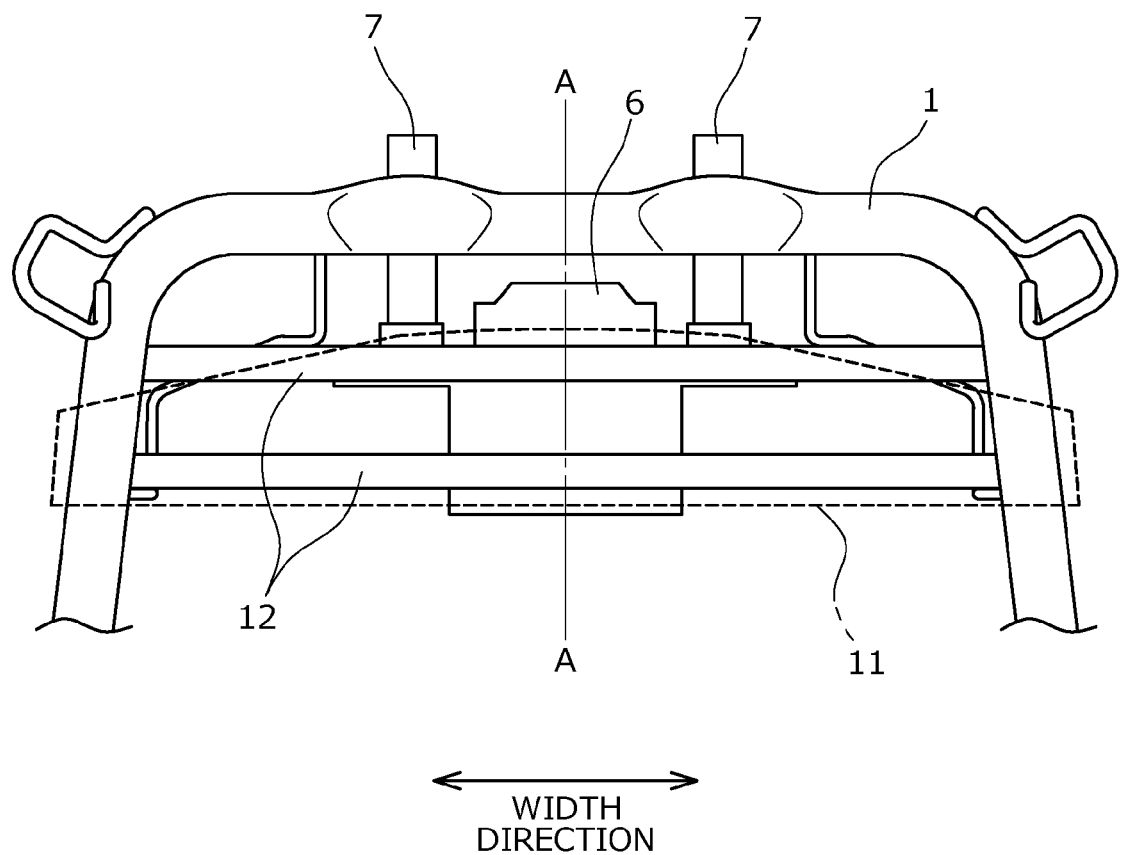
FIG. 4 is a front view illustrating an attachment position of a support plate.
Figure 5:
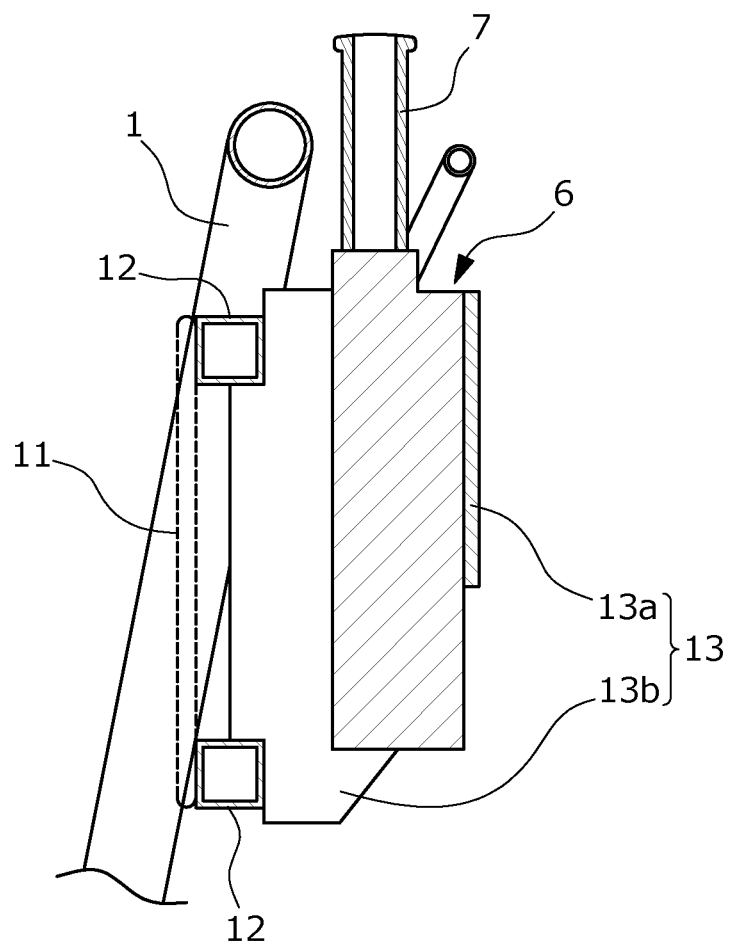
FIG. 5 is a cross-sectional view along an A-A line of FIG. 4.

Next, the internal structure of the seat back S1 of the seat S including the shoulder support portions Sa1 described above will be described with reference to FIGS. 2 to 5. FIG. 2 is a view illustrating the configuration of a seat back frame Sf1 of the seat back S1 of the seat S when the seat back frame Sf1 is viewed from the front. FIG. 3 is a view illustrating the state in which a plate member is detached from the seat back frame Sf1 illustrated in FIG. 2. FIG. 4 illustrates, for describing an attachment position of a support plate, the state in which the support plate is detached from an upper end portion of the seat back frame Sf1, and the attachment position of the support plate is indicated by a dashed line in FIG. 4. FIG. 5 is a cross-sectional view along an A-A line of FIG. 4.

For the sake of simplicity in illustrating each component, the components illustrated in FIGS. 2 to 5 are simplified to some extent. For example, in FIG. 5, a pillar position adjustment mechanism 6 is illustrated without the internal structure thereof being shown.

In the seat back S1, the seat back frame Sf1 is provided as illustrated in FIGS. 2 and 3, and various components forming the seat back S1 are attached to the seat back frame Sf1. The seat back frame Sf1 forms the framework of the seat back S1, and is a frame body substantially in a rectangular shape as viewed from the front. Specifically, the seat back frame Sf1 includes an upper frame 1 disposed at an upper end of the seat back frame Sf1, a pair of side frames 2 provided respectively at both ends of the seat back frame Sf1 in the width direction, and a lower connection frame 3 connecting lower ends of the side frames 2 together.

The upper frame 1 is in an inverted U-shape, and is formed in such a manner that a metal pipe is bent substantially in a U-shape. One end portion of the upper frame 1 is connected to an upper end of one of the side frames 2, and the other end portion of the upper frame 1 is connected to an upper end of the other side frame 2. That is, the upper frame 1 connects the upper ends of the pair of side frames 2 together.

The head rest S3 is disposed above the upper frame 1. More specifically, the pillar position adjustment mechanism 6 including pillar support portions 7 configured to support the head rest pillars hp extending from a lower portion of the head rest S3 is provided in the rear of the upper frame 1. The pillar position adjustment mechanism 6 is configured to vertically move, by a not-shown drive mechanism, the positions of the head rest pillars hp supported by the pillar support portions 7 to automatically adjust the height of the head rest S3.

In order to hold the pillar position adjustment mechanism 6 described above, holding pipes 12 being in the form of square pipe and extending from one end to the other end of the upper frame 1 are attached to the upper frame 1. In the present embodiment, two holding pipes 12 are provided to be arranged in the vertical direction as illustrated in FIG. 4, but the number of holding pipes 12 may be optionally set.

Moreover, as illustrated in FIG. 5, an attachment bracket 13 configured to attach the pillar position adjustment mechanism 6 is fixed to the holding pipes 12. More specifically, the attachment bracket 13 includes a base portion 13a to which the pillar position adjustment mechanism 6 is attached, and a pair of side portions 13b extending forward respectively from both side ends of the base portion 13a. A tip end of each side portion 13b is welded to rear surfaces of two holding pipes 12, and therefore, the attachment bracket 13 is fixed to the holding pipes 12.

The pair of side frames 2 form side surfaces of the seat back frame Sf1. The side frames 2 are separated from each other in the right-to-left direction to define the width of the seat back S1, and extend in the vertical direction. Each side frame 2 includes, as illustrated in FIGS. 2 and 3, a flat plate-shaped side plate 2a, and a front edge portion 2b bending inward from a front end portion of the side plate 2a in a U-shape.

Of the surface of each side plate 2a, the surface positioned on the inside in the width direction is attached to an air cell (hereinafter referred to as a "side air cell 4"), and the side air cell 4 forms a side support Sa2. The side support Sa2 serves as a movement restriction portion, and is configured such that air as an example of fluid is supplied to the side air cell 4 to expand the side air cell 4 inward in the width direction, and as a result, movement of the upper body of the seated passenger in the width direction is restricted. In the present embodiment, the side support Sa2 is provided at each end portion of the seat back S1 in the width direction, and is disposed substantially at the same height as that of the abdomen of the seated passenger in the vertical direction. Further, a tube member C1 for supplying and exhausting air is connected to the side air cell 4 forming the side support Sa2.

In the space formed between the pair of side frames 2 in the width direction, a pressure receiving plate 5 configured to receive pressure generated when the back of the seated passenger leans on the seat back S1 is disposed. The pressure receiving plate 5 is a member made of resin, and is formed substantially in a T-shape as viewed from the front. A wider upper end portion of the pressure receiving plate 5 bends, at both end portions thereof in the width direction, to extend forward to some extent.

Moreover, the pressure receiving plate 5 is attached to each side frame 2 with an elastic connection wire 5a. More specifically, the connection wire 5a is provided to bridge between the pair of side frames 2, and each end portion of the connection wire 5a is fixed to a corresponding one of the side frames 2. A middle portion of the connection wire 5a is hung on a hanging portion (not shown) formed on a rear surface of the pressure receiving plate 5. As a result, the pressure receiving plate 5 is disposed in the space formed between the pair of side frames 2.

When the back of the seated passenger leans on the seat back S1 to apply pressure to a front surface of the pressure receiving plate 5, the elastic connection wire 5a warps, and the pressure receiving plate 5 moves backward. Accordingly, the upper body of the seated passenger moderately sinks backward. The shape of the pressure receiving plate 5 is not limited to that illustrated in, e.g., FIG. 3, and other shapes may be applicable.

As described above, the seat back S1 of the present embodiment is characterized by the shoulder support portions Sa1 supporting the shoulders of the seated passenger to cover around the shoulders. The internal structure of the shoulder support portions Sa1 of the present embodiment includes air cells 10 illustrated in FIG. 3, and a resin plate 20 illustrated in FIG. 2.

The air cells 10 are bags configured to expand when air as an example of fluid is supplied into the bags, and two air cells 10 are provided to be arranged in the width direction as illustrated in FIG. 2. Specifically, each air cell 10 is, as viewed from the front, in such a rectangular outer shape that one end portion thereof is in a semicircular shape. The outer shape of the air cell 10 is not limited as long as the outer shape of the air cell 10 is a shape elongated in a predetermined direction. Further, in the present embodiment, the air cell 10 configured to expand by supply of air is used as an example of the bag, but a bag configured to expand by supply of fluid other than air, such as liquid, may be used.

Moreover, two air cells 10 are positioned right above the pressure receiving plate 5 in the vertical direction, and each air cell 10 is provided in such an attitude that the longitudinal direction thereof slightly inclines relative to the width direction. Of both ends of each air cell 10 in the longitudinal direction thereof, the end on the outside in the width direction protrudes outward from a side end of the seat back frame Sf1 (to be exact, a side end of the upper frame 1) to some extent as illustrated in FIG. 3.

Further, of both ends of each air cell 10 in the longitudinal direction thereof, the end on the outside in the width direction is, as illustrated in FIG. 3, positioned lower than the end on the inside in the width direction. In addition, a clearance is formed between two air cells 10 in the width direction, and is positioned at the middle of the seat back S1 in the width direction as illustrated in FIG. 3.

In order to arrange two air cells 10 at the above-described positions, a support plate 11 is attached to the seat back frame Sf1. The support plate 11 is a metal plate elongated in the width direction, and is configured to support each air cell 10 from the rear. Each side end portion of the support plate 11 extends to reach a corresponding one of the side ends of the seat back frame Sf1, and bends backward.

Each air cell 10 is supported in such a manner that two air cells 10 are attached to a front surface of the support plate 11, and specifically, a middle portion of each air cell 10 in the longitudinal direction thereof is fixed to the support plate 11. Of both end portions of each air cell 10 in the longitudinal direction thereof, the end portion on the outside in the width direction is provided with a not-shown tongue-shaped protrusion. The tongue-shaped protrusion bends backward along a side end portion of the support plate 11, and is screwed to the side end portion of the support plate 11.

On the other hand, the support plate 11 is attached to a front surface of the seat back frame Sf1 to be positioned substantially at the same height as that of each joint portion between the upper frame 1 and the side frame 2 in the vertical direction. The attachment position of the support plate 11 will be specifically described with reference to FIGS. 4 and 5. The support plate 11 contacts, at a rear surface thereof, front surfaces of two holding pipes 12 provided for holding the pillar position adjustment mechanism 6, and is fixed to each holding pipe 12 by welding. That is, in the present embodiment, the holding pipes 12 contact the rear surface of the support plate 11 to function as a holding portion configured to hold the support plate 11.

The support plate 11 is held by the holding pipes 12 provided in the rear of the support plate 11 as described above, and therefore, can be properly held without obstructing the air cells 10. As a result, each air cell 10 supported by the support plate 11 is favorably maintained at the preset attachment position. In the present embodiment, the support plate 11 is held by the holding pipes 12 provided for holding the pillar position adjustment mechanism 6. That is, in the present embodiment, the member for holding the pillar position adjustment mechanism 6 is also used as the member for holding the support plate 11, and therefore, the support stiffness of the support plate 11 can be efficiently improved.

A tube member C2 is connected to each air cell 10 as illustrated in FIG. 3. The tube member C2 forms the path of air supplied to the air cell 10 and exhausted from the air cell 10. The tube member C2 has flexibility, and is provided for each air cell 10.

Each tube member C2 reaches an upper end of the pressure receiving plate 5 by way of the rear of the pressure receiving plate 5, and then, extends forward from the top of the pressure receiving plate 5 to be connected to a corresponding one of the air cells 10. Each tube member C2 is disposed to pass the middle portion of the seat back S1 where the clearance is formed between two air cells 10 in the width direction.

Specifically, each tube member C2 provided for each air cell 10 protrudes from a compressed air supply source (specifically, a later-described compressor 52), and extends toward the air cell 10 by way of the rear of the pressure receiving plate 5. The tube members C2 extend, upon passing the rear of the pressure receiving plate 5, from the side of the seat back frame Sf1 toward the middle of the pressure receiving plate 5 in the width direction, and at such a middle position, are tied together with a not-shown clip attached to the rear surface of the pressure receiving plate 5. A portion of each tube member C2 from the middle of the pressure receiving plate 5 in the width direction to the air cell 10 extends to pass the middle portion of the seat back frame Sf1 in the width direction.

As described above, in the present embodiment, each tube member C2 is disposed to pass the middle portion of the seat back S1 in the width direction, and in the middle portion, the clearance is formed between the air cells 10. Thus, the space where the clearance is formed between the air cells 10 can be effectively utilized, and therefore, the size of the seat back S1 of the seat S can be reduced.

The resin plate 20 is a plate-shaped member disposed in the front of two air cells 10. The resin plate 20 is provided to expand the area where force acts on the shoulders of the seated passenger by expansion of the air cells 10, and is in an outer shape elongated in the vertical direction as viewed from the front. More specifically, the resin plate 20 includes, as illustrated in FIG. 2, a deformable portion 21 configured to deform by expansion of the air cells 10, and an extension 22 positioned below the deformable portion 21 and extending downward. The deformable portion 21 and the extension 22 are adjacent to each other, and a groove 23 is linearly formed along the width direction at the boundary between the deformable portion 21 and the extension 22. In the region of the resin plate 20 where the groove 23 is formed, a substantially-triangular cutout 20a is, at each end portion of the region in the width direction, formed to point inward in the width direction.

The deformable portion 21 is formed at an upper end portion of the resin plate 20, and is substantially in a hexagonal shape as viewed from the front. At a middle portion of the deformable portion 21 in the width direction, a cutout 24 in an inverted triangular shape is formed to point downward at an upper end of the deformable portion 21, and the apex of the cutout 24 is positioned slightly below the middle of the deformable portion 21 in the vertical direction. The deformable portion 21 is divided into two portions (specifically, a one-end-side deformable piece 25 and another-end-side deformable piece 26) with respect to the cutout 24, and the two divided portions, i.e., the one-end-side deformable piece 25 and the other-end-side deformable piece 26 are individually deformable. In other words, the cutout 24 is formed between the deformable pieces 25, 26, and serves as a dividing portion configured to divide the deformable pieces 25, 26 from each other.

The one-end-side deformable piece 25 and the other-end-side deformable piece 26 are positioned in the rear of the shoulders of the seated passenger when the back of the seated passenger leans on the seat back S1. To be exact, the one-end-side deformable piece 25 serves as a first portion positioned in the rear of one of the shoulders of the seated passenger, and the other-end-side deformable piece 26 serves as a second portion positioned in the rear of the other shoulder of the seated passenger.

Each of the one-end-side deformable piece 25 and the other-end-side deformable piece 26 is positioned right in the front of a corresponding one of the air cells 10, and deforms to curve along a corresponding one of the shoulders of the seated passenger and to cover around the shoulder when the corresponding one of the air cells 10 expands. Accordingly, the shoulder support portions Sa1 of the seat back S1 hold the shoulders of the seated passenger, and therefore, the posture of the seated passenger is stably maintained.

Each air cell 10 contacts a rear surface of a corresponding one of the deformable pieces 25, 26, and expands in such a contact state. The air cells 10 expand to cause force from the air cells 10 to act on the shoulders of the seated passenger. In this state, the force acting area is expanded by the deformable portion 21, and as a result, the shoulders of the seated passenger are held across a large area.

That is, the area of a front surface of each of the deformable pieces 25, 26 of the deformable portion 21 is larger than a contact area between the air cell 10 and the deformable piece 25, 26. Thus, the force generated by expansion of the air cells 10 acts on the shoulders of the seated passenger across a larger area. Since the acting area of the force generated by expansion of the air cells 10 is expanded by the resin plate 20, the shoulders of the seated passenger can be properly held even if relatively-small air cells 10 are used. In particular, in the present embodiment, the deformable portion 21 of the resin plate 20 is wider than the other portion (specifically, the extension 22) of the resin plate 20, and therefore, the acting area of the force generated by expansion of the air cells 10 can be more easily expanded.

Moreover, in the present embodiment, the one-end-side deformable piece 25 and the other-end-side deformable piece 26 are individually deformable as described above. Thus, in the seat S, the shoulders of the seated passenger can be individually held, and as a result, the force for holding the shoulders of the seated passenger to stably maintain the posture of the seated passenger can be adjusted separately for the right and left shoulders.

A middle portion of each of the deformable pieces 25, 26 in the vertical direction is widest, and the middle portion is positioned right in the front of a corresponding one of the air cells 10 as illustrated in FIG. 2. Of both ends of each air cell 10 in the longitudinal direction thereof, the end on the outside in the width direction protrudes, to some extent, outward from a corresponding one of the deformable pieces 25, 26 as illustrated in FIG. 2. Of an outer edge of each of the deformable pieces 25, 26, the portion positioned at the outer end in the width direction curves substantially in an arc shape along the shoulder of the seated passenger, and inclines to extend downward toward the outside in the width direction.

The extension 22 is a portion of the resin plate 20 from the middle of the resin plate 20 in the vertical direction to a lower end of the resin plate 20. The extension 22 (to be exact, a lower end portion of the extension 22) is positioned in the rear of the waist of the seated passenger when the back of the seated passenger leans on the seat back S1. Moreover, in the seat S, the deformable portion 21 and the extension 22 are integrally connected together, and specifically, is an integrally-molded product. Thus, when the air cells 10 expand, the area where force acts on the shoulders of the seated passenger expands, and therefore, the waist of the seated passenger can be also held. In the present embodiment, the extension 22 is in an arch shape slightly curving in the vertical direction. Thus, when the extension 22 pushes the waist of the seated passenger forward, the waist of the seated passenger can be properly pushed at a relatively-gentle surface.

As illustrated in FIG. 2, the extension 22 is narrower than the deformable portion 21, and is narrower than the clearance between the pair of side supports Sa2 (to be exact, the clearance between the side air cells 4) provided respectively at both end portions of the seat back S1 in the width direction. In placement of the resin plate 20, the extension 22 is disposed between the pair of right and left side supports Sa2 in the width direction. Thus, in the seat S, contact between the resin plate 20 and each side support Sa2 is reduced, and the shoulders and waist of the seated passenger can be properly held using the resin plate 20.

Positional Relationship Between Air Cell 10 and Resin Plate 20

Each air cell 10 is positioned in the rear of the deformable portion 21 of the resin plate 20. To be exact, each air cell 10 is positioned in the rear of a corresponding one of the deformable pieces 25, 26. Specifically, one of the air cells 10 is positioned right in the rear of the one-end-side deformable piece 25, and the other air cell 10 is positioned right in the rear of the other-end-side deformable piece 26. Each air cell 10 expands while contacting the rear surface of a corresponding one of the deformable pieces 25, 26. This deforms the deformable pieces 25, 26, and therefore, the shoulder support portions Sa1 of the seat back S1 hold the shoulders of the seated passenger to cover around the shoulders.

Figure 6:
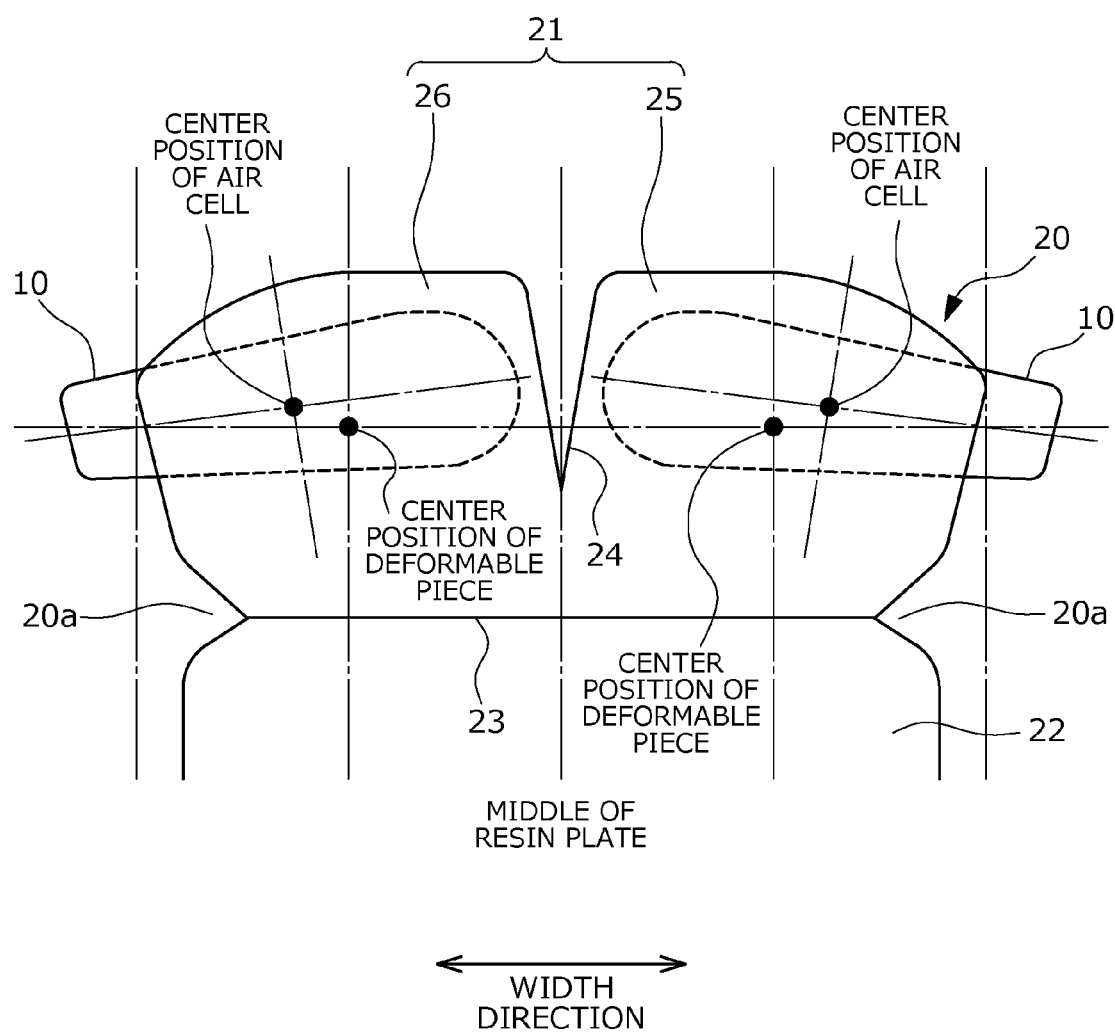
FIG. 6 is a front view illustrating the positional relationship between a bag and the plate-shaped member.

In order that the resin plate 20 may deform by expansion of the air cells 10 to cover around the shoulders of the seated passenger, the positional relationship between each air cell 10 and the resin plate 20 is adjusted. The positional relationship between each air cell 10 and the resin plate 20 will be described below with reference to FIG. 6. FIG. 6 is a view illustrating the positional relationship between each air cell 10 and the resin plate 20. For the sake of simplicity in explanation, only the air cells 10 and the resin plate 20 are illustrated in FIG. 6.

The positional relationship between the one-end-side deformable piece 25 and the air cell 10 is the horizontally-reversed positional relationship between the other-end-side deformable piece 26 and the air cell 10. Thus, only the positional relationship between the one-end-side deformable piece 25 and the air cell 10 will be described below.

As illustrated in FIG. 6, the center position of the air cell 10 is above the center position of the one-end-side deformable piece 25, and is on the outside of the center position of the one-end-side deformable piece 25 in the width direction. The "center position of the air cell 10" indicates the position at the middle of the air cell 10 in the longitudinal direction thereof and at the middle of the air cell 10 in the height direction thereof. Moreover, the "center position of the one-end-side deformable piece 25" indicates the position at the middle of the one-end-side deformable piece 25 in the width direction and at the middle of the one-end-side deformable piece 25 in the vertical direction. One end of the one-end-side deformable piece 25 in the width direction corresponds to the outermost portion of the one-end-side deformable piece 25 in the width direction, and the other end of the one-end-side deformable piece 25 in the width direction corresponds to the position of the apex of the cutout 24 described above (in other words, the middle of the deformable portion 21 in the width direction).

The tube member C2 for supplying and exhausting air as described above is connected to the position substantially coincident with the center position of the air cell 10 as viewed from the front. Thus, the air cell 10 expands starting preferentially from the center position of the air cell 10. Thus, when the air cell 10 expands, a portion of the one-end-side deformable piece 25 positioned on the outside in the width direction selectively deforms. That is, the one-end-side deformable piece 25 deforms such that the portion of the one-end-side deformable piece 25 on the outside in the width direction is positioned more forward than a portion of the one-end-side deformable piece 25 on the inside in the width direction.

Figure 7A:
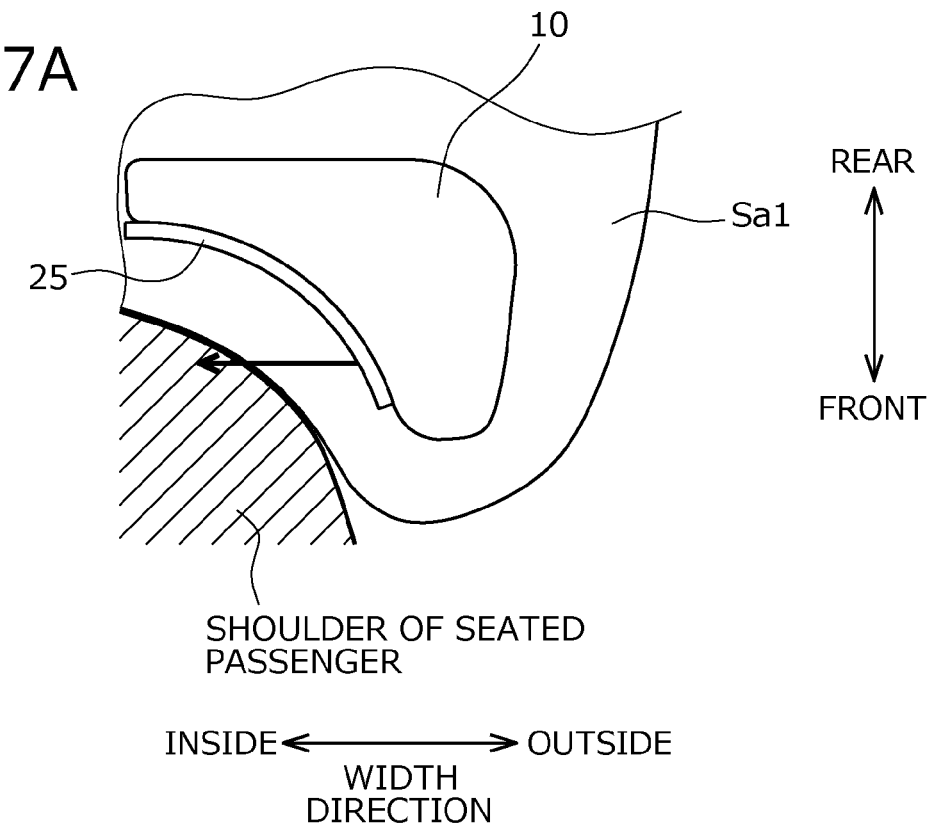
FIG. 7A is a cross-sectional view of a shoulder support portion of the seat back along the horizontal plane.

Since the one-end-side deformable piece 25 deforms as described above, one end portion of the shoulder support portion Sa1 of the seat back S1 on the outside in the width direction moves, as illustrated in FIG. 7(A), more forward than the other end portion of the shoulder support portion Sa1 of the seat back S1 on the inside in the width direction. Accordingly, force acts on the shoulder of the seated passenger from the seat back S1 toward the inside in the width direction, and then, the shoulder of the seated passenger is pushed by the shoulder support portion Sa1 toward the inside in the width direction. As a result, displacement movement of the upper body of the seated passenger in the width direction can be reduced, and therefore, the posture of the seated passenger can be stably maintained.

FIG. 7A is a view illustrating the state in which the shoulder support portion Sa1 of the seat back S1 supports the shoulder of the seated passenger, and illustrates the cross section of the shoulder support portion Sa1 along the horizontal plane.

The portion of the one-end-side deformable piece 25 on the outside in the width direction corresponds to one end portion of the shoulder support portion Sa1 on the outside in the width direction, and the portion of the one-end-side deformable piece 25 on the inside in the width direction corresponds to one end portion of the shoulder support portion Sa1 on the inside in the width direction.

When the air cell 10 expands, the portion of the one-end-side deformable piece 25 on the outside in the width direction selectively deforms as described above. In particular, deformation occurs such that an upper region of the selectively-deformed portion is positioned more forward than a lower region of the selectively-deformed portion. This is because the center position of the air cell 10 including an air supply/exhaust port is positioned above the center position of the one-end-side deformable piece 25.

Figure 7B:
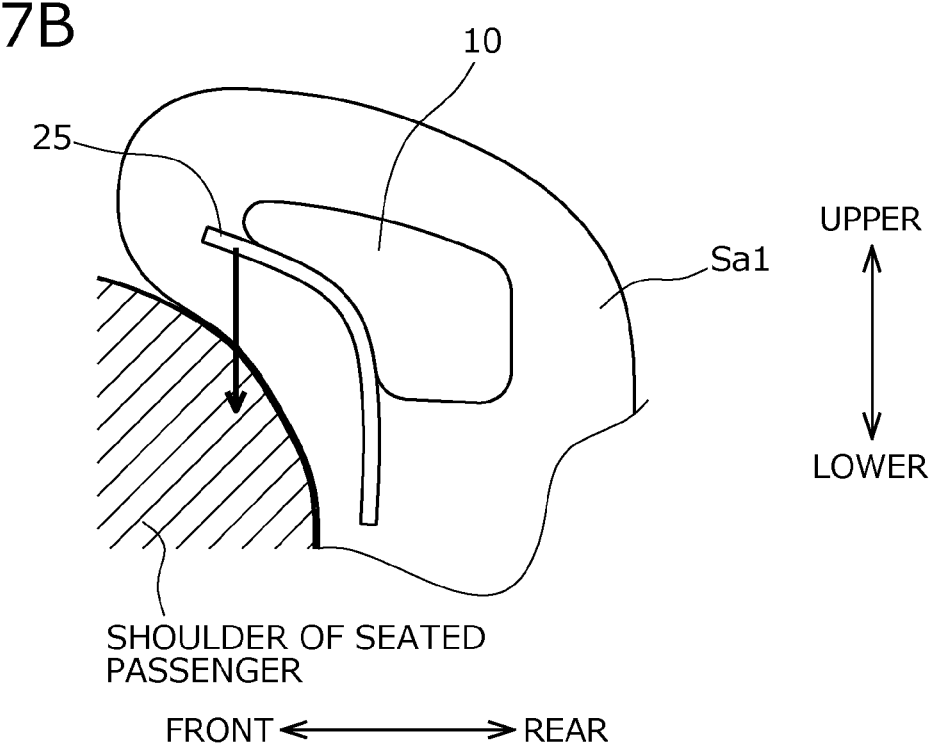
FIG. 7B is a cross-sectional view of the shoulder support portion along the vertical plane.

When one end portion of the shoulder support portion Sa1 on the outside in the width direction moves, by deformation of the one-end-side deformable piece 25 as described above, more forward than the other end portion of the shoulder support portion Sa1 on the inside in the width direction, an upper portion of the above one end portion moves more forward than a lower portion of the above one end portion as illustrated in FIG. 7B. Thus, the force acting on the shoulders of the seated passenger from the seat back S1 has a component acting inward in the width direction, and a component acting downward. Accordingly, the shoulders of the seated passenger are pushed inward in the width direction, and are also pushed downward. As a result, upward displacement movement of the upper body of the seated passenger can be reduced, and the posture of the seated passenger can be more stably maintained.

FIG. 7B is a view illustrating the state in which the shoulder support portion Sa1 of the seat back S1 supports the shoulder of the seated passenger, and illustrates the cross section of the shoulder support portion Sa1 along the vertical plane.

In the present embodiment, arrangement of the air cells 10 is set to proper arrangement for the purpose of assisting the outer portion of the one-end-side deformable piece 25 in the width direction in selectively deforming by expansion of the air cells 10. Specifically, of both ends of each air cell 10 in the longitudinal direction thereof, the end on the outside in the width direction is positioned lower than the end on the inside in the width direction. This is intended for the shoulders of a typical seated passenger. Since the air cells 10 are arranged such that each air cell 10 extends downward toward the outside in the width direction as the shoulder of the seated passenger extends, the shoulder support portions Sa1 of the seat back S1 support the shoulders of the seated passenger to cover around the shoulders. As a result, the posture of the passenger seated on the seat S is further stabilized.

Further, in the present embodiment, as illustrated in FIGS. 2 and 6, the end of each air cell 10 on the outside in the width direction protrudes, to some extent, outward from the end of the one-end-side deformable piece 25 on the outside in the width direction. Such arrangement further facilitates deformation of the portion of the one-end-side deformable piece 25 on the outside in the width direction, and therefore, the posture of the seated passenger can be easily stabilized.

In addition, in the present embodiment, a greater portion of the air cell 10 is, as illustrated in FIG. 6, positioned between an upper end position of the one-end-side deformable piece 25 and a middle position of the one-end-side deformable piece 25 in the vertical direction as viewed from the front. Such arrangement facilitates deformation of the portion of the deformable piece 25 on the outside in the width direction such that the upper region of the outer portion is positioned more forward than the lower region of the outer portion, and therefore, the posture of the seated passenger can be more easily stabilized.

Moreover, in the present embodiment, the shape of the resin plate 20 is set to a suitable shape for the purpose of assisting the shoulder support portions Sa1 of the seat back S1 in covering and supporting the shoulders of the seated passenger. Specifically, of the outer edge of each of the deformable pieces 25, 26 provided at the deformable portion 21 of the resin plate 20, the portion positioned at the outer end in the width direction inclines to extend downward toward the outside in the width direction along the shoulder of the seated passenger. Since the portion of the resin plate 20 positioned in the rear of the shoulder of the seated passenger is in a shape along the shoulder of the seated passenger as described, the advantage that the shoulder support portions Sa1 support the shoulders of the seated passenger to cover around the shoulders is more effectively provided. As a result, the posture of the passenger seated on the seat S is further stabilized.

Modifications in Holding of Air Cells

Figure 8:
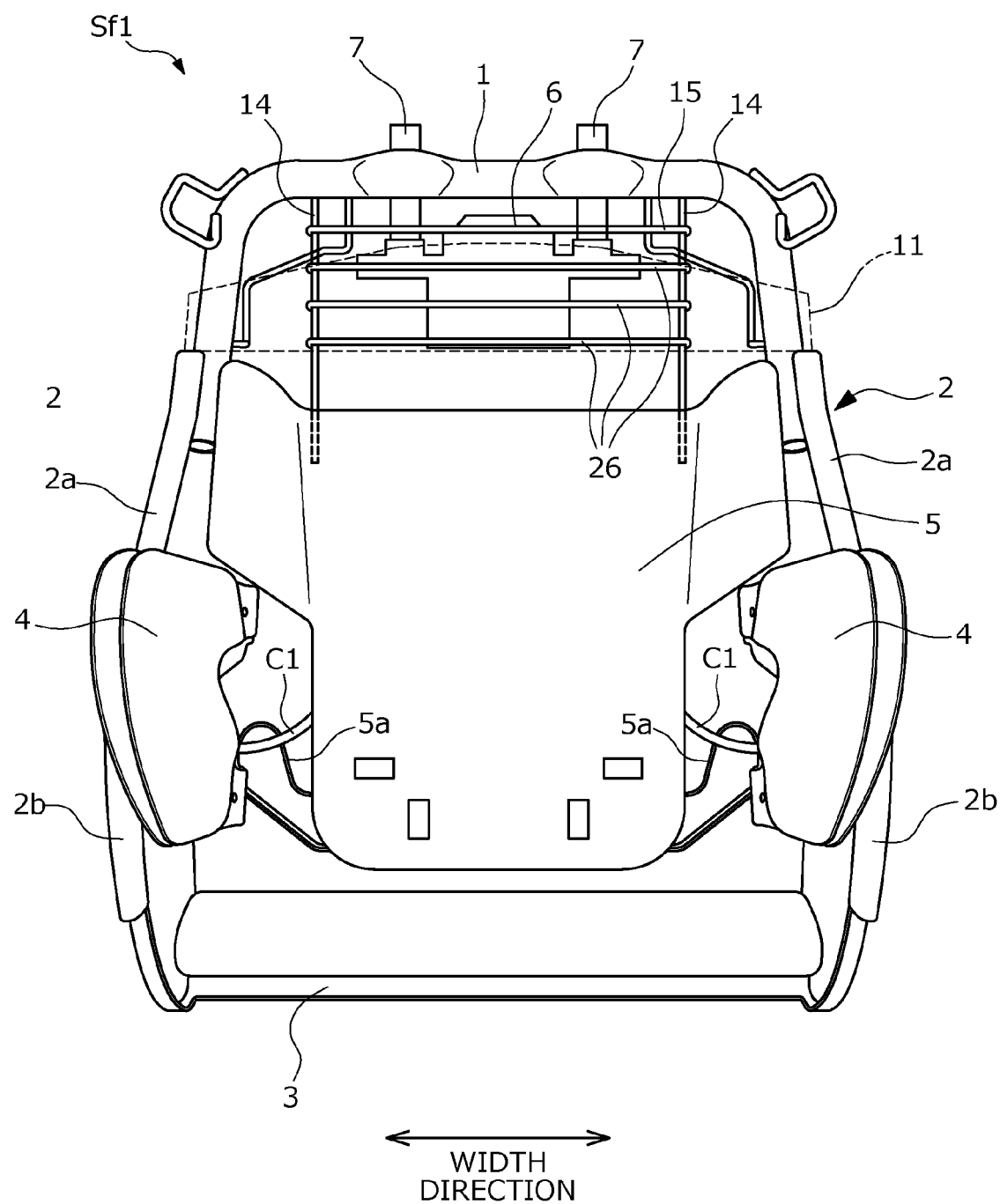
FIG. 8 is a front view illustrating the configuration of a vehicle seat of a first modification.
Figure 9:
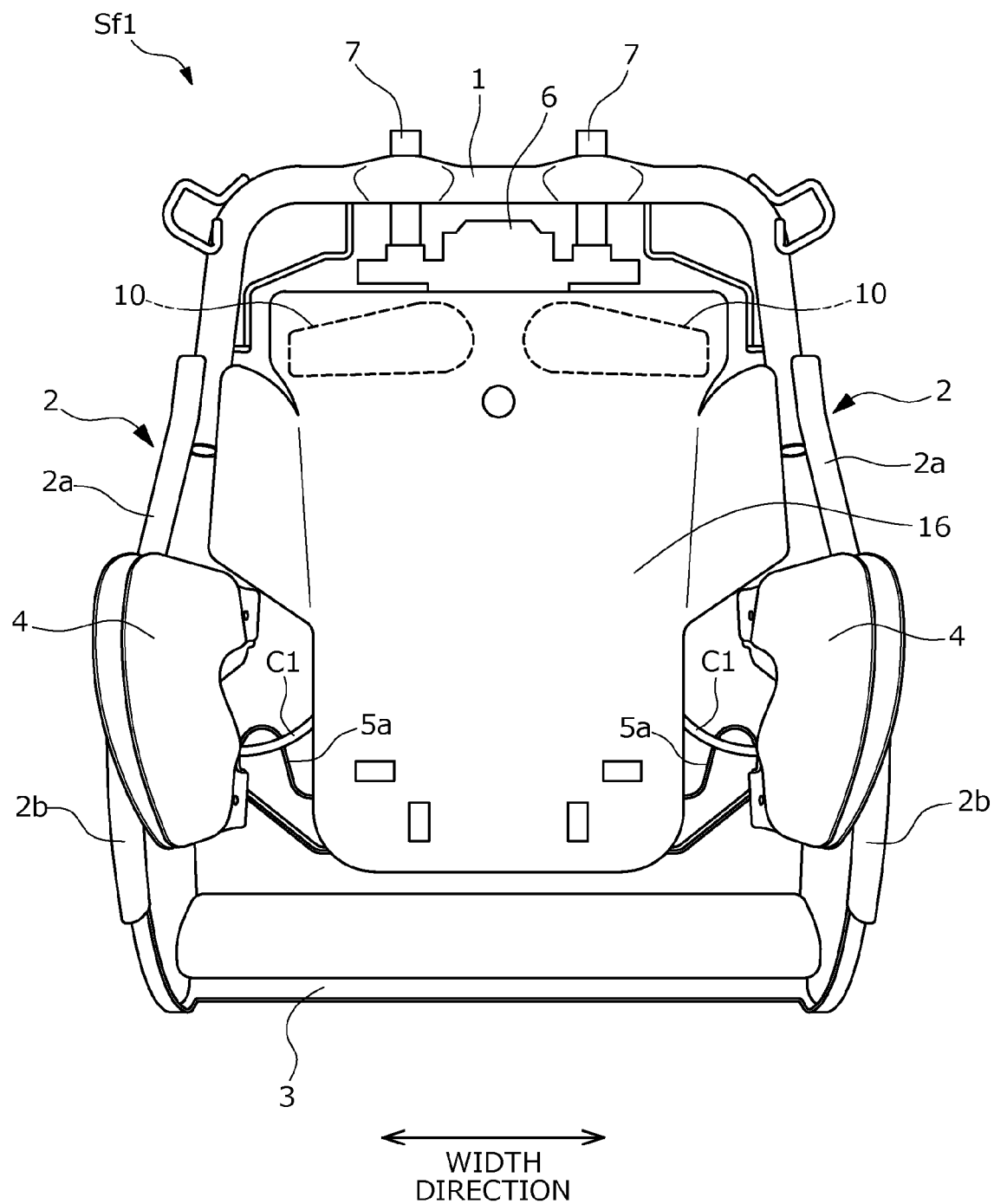
FIG. 9 is a front view illustrating the configuration of a vehicle seat of a second modification.

In the above-described embodiment, the support plate 11 configured to support the air cells 10 from the rear is provided. Moreover, in the above-described embodiment, the support plate 11 is held by the holding pipes 12, in the form of square pipes, attached to the seat back frame Sf1 to hold the pillar position adjustment mechanism 6. The configuration of holding the air cells 10 is not limited to that of the above-described embodiment, and other configurations may be employed. Modifications in holding of the air cells 10 will be described below with reference to FIGS. 8 and 9. FIGS. 8 and 9 are views illustrating configurations of vehicle seats of the modifications, and each illustrate a seat back frame Sf1 different from that of the above-described embodiment in the configuration of holding the air cells 10.

First, a first modification illustrated in FIG. 8 will be described. Instead of proving the holding pipes 12 described above, rod-shaped members 14 made of metal having a relatively-high stiffness are used. The rod-shaped members 14 extend downward from a horizontal portion of the upper frame 1, and are provided in a pair to be separated from each other in the right-to-left direction. An upper end portion of each rod-shaped member 14 is fixed to the upper frame 1, and a lower end portion of each rod-shaped member 14 is fixed to a fixing portion (not shown) provided on the rear surface of the pressure receiving plate 5.

Elastic wires 15 bridge between the rod-shaped members 14 along the width direction. The plurality of wires 15 are arranged at regular pitches in the vertical direction. In the first modification, the support plate 11 is attached to front surfaces of the plurality of wires 15, and specifically, is attached to an attachment position indicated by a dashed line in FIG. 8.

Next, a second modification illustrated in FIG. 9 will be described. Instead of providing the support plate 11 and the holding pipes 12, a modified pressure receiving plate 16 is provided. The pressure receiving plate 16 is formed to upwardly expand to some extent as compared to the pressure receiving plate 5 used in the above-described embodiment. In the state in which the pressure receiving plate 16 of the present modification is attached to the seat back frame Sf1, an upper end of the pressure receiving plate 16 is positioned slightly above the arrangement positions of the air cells 10.

In the second modification, the air cells 10 are, as illustrated in FIG. 9, attached not to the support plate 11 but to an upper end portion of the pressure receiving plate 16 of the present modification, and specifically, are attached to attachment positions indicated by dashed lines in FIG. 9. With such a configuration, the number of components is reduced because the support plate 11 is not used, and assembly of the seat back frame Sf1 is simpler.

Application Example

The vehicle seat described so far is configured such that the shoulder support portions Sa1 of the seat back S1 cover around the shoulders of the seated passenger to support the shoulders when the passenger is seated. Such a configuration may be applicable to provide a vehicle seat (hereinafter referred to as an "application seat XS") configured to correct the posture of the passenger while the passenger is seated. The configuration, etc., of the application seat XS as an application example of the present invention will be described below.

Figure 10:
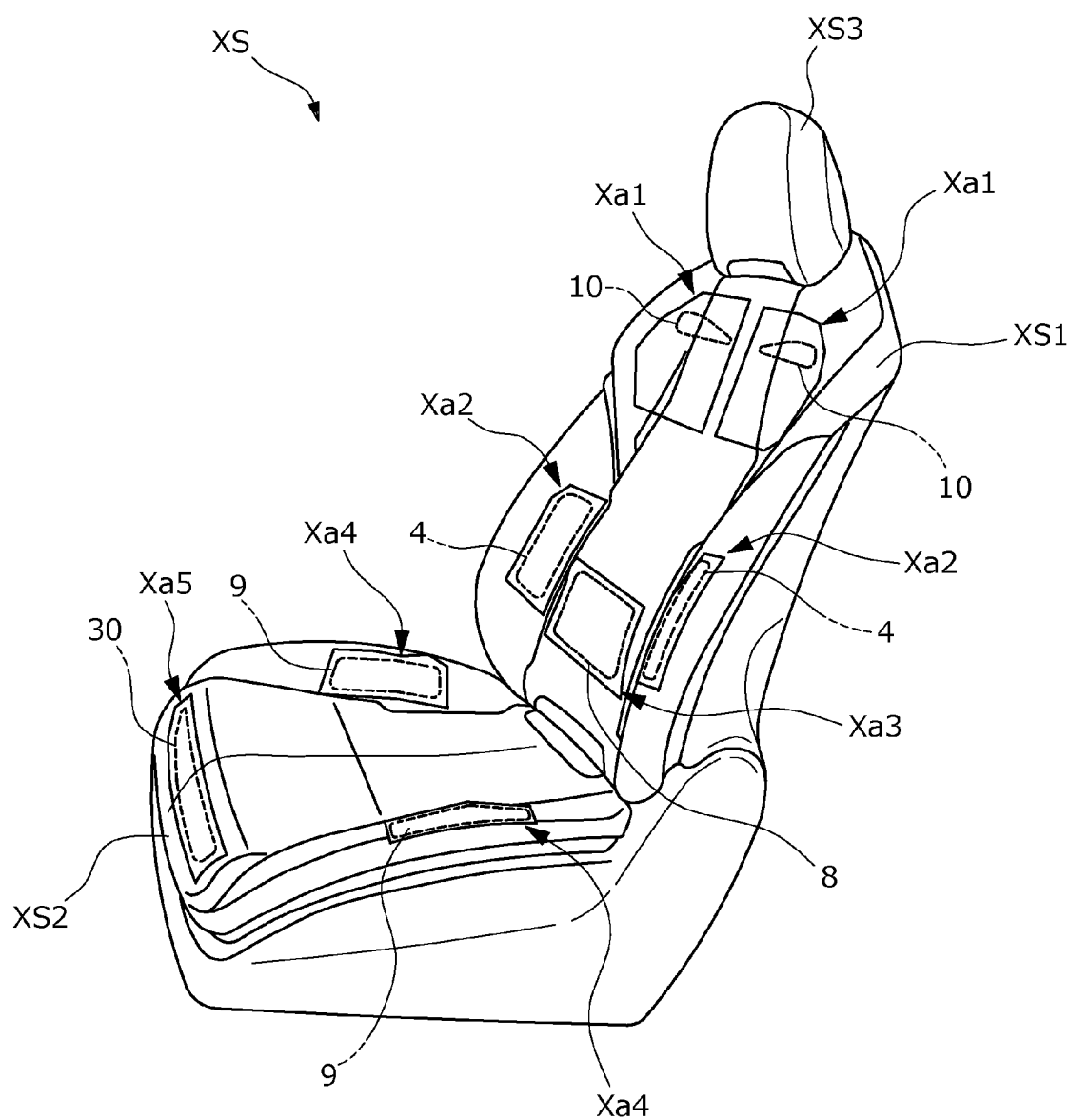
FIG. 10 is a perspective view illustrating the configuration of a vehicle seat of an application example.

First, a basic configuration of the application seat XS will be described with reference to FIG. 10. FIG. 10 is a view illustrating the basic configuration of the application seat XS.

The configuration of the vehicle seat (i.e., the seat S) of the above-described embodiment is employed for the application seat XS, and specifically, a seat back XS1 includes shoulder supports Xa1 equivalent to the shoulder support portions Sa1. Each shoulder support Xa1 includes the air cell 10, and has a function to push the shoulder of the seated passenger inward in the width direction and downward by expansion of the air cell 10.

The application seat XS further includes side supports Xa2 provided respectively at both end portions of the seat back XS1 in the width direction. Each side support Xa2 has a configuration similar to that of the side support Sa2 provided at the vehicle seat of the above-described embodiment. That is, each side support Xa2 provided at the application seat XS includes an air cell (the side air cell 4), and is configured to push the upper body of the seated passenger inward in the width direction by expansion of the side air cell 4.

In addition to the shoulder supports Xa1 and the side supports Xa2, the application seat XS further includes a portion in which an air cell is provided. Specifically, as illustrated in FIG. 10, a lumber support Xa3 is provided at a portion of the seat back XS1 contacting the waist of the seated passenger. The lumber support Xa3 includes a waist air cell 8, and is configured to press the waist of the seated passenger forward by expansion of the waist air cell 8.

Side cushion supports Xa4 are provided respectively at both end portions of a seat cushion XS2 of the application seat XS in the width direction. Each side cushion support Xa4 includes a side air cell (hereinafter referred to as a "cushion air cell 9") for cushion, and is configured to push the femoral region of the seated passenger inward in the width direction by expansion of the cushion air cell 9.

An ottoman portion Xa5 serving as a knee support portion configured to support the knees of the legs of the seated passenger is provided at a front end portion of the seat cushion XS2 of the application seat XS. The ottoman portion Xa5 includes an air cell (an ottoman air cell 30) disposed at a front end of the seat cushion XS2, and supports the knees of the legs of the seated passenger from the below when the ottoman air cell 30 expands.

If the knees of the legs of the seated passenger are placed on the ottoman air cell 30 and are supported by the ottoman air cell 30, there is a difference in expansion degree between each portion of the ottoman air cell 30 on which the knee is placed and the other portion of the ottoman air cell 30. This leads to unstable force for supporting the knees of the legs of the seated passenger, and therefore, the knees cannot be properly supported.

Figure 11:
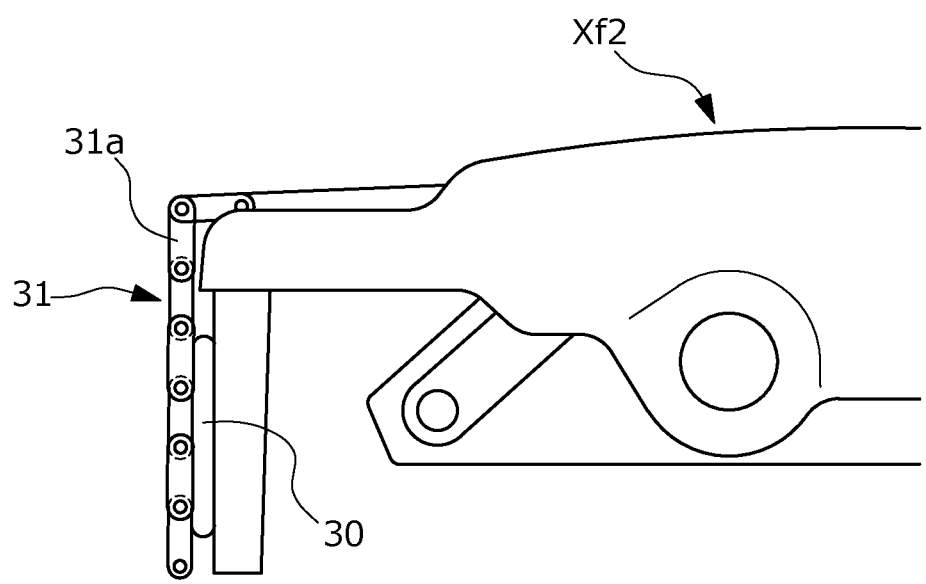
FIG. 11 is a (first) side view illustrating the mechanism configured to support the knees of the legs of the seated passenger.
Figure 12:
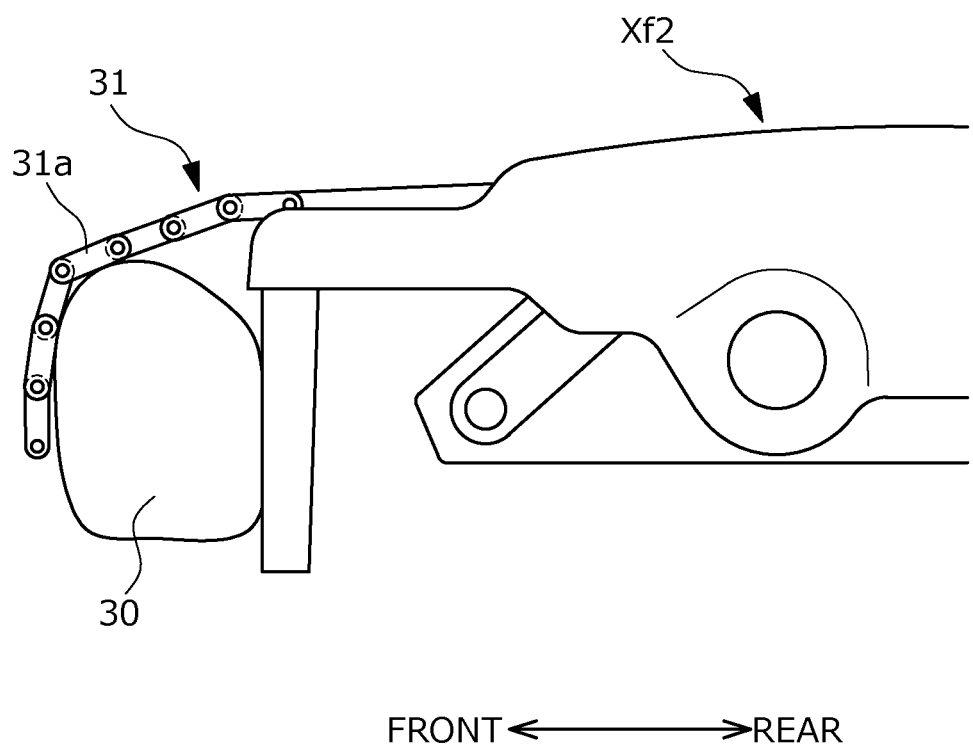
FIG. 12 is a (second) side view illustrating the mechanism configured to support the knees of the legs of the seated passenger.

For such reasons, as illustrated in FIGS. 11 and 12, a belt-shaped support member 31 is disposed in the front of the ottoman air cell 30 in the ottoman portion Xa5 of the application seat XS. FIGS. 11 and 12 are views illustrating the ottoman portion Xa5 configured to support the knees of the legs of the seated passenger when a front end portion of a cushion frame Xf2 forming the seat cushion XS2 is viewed from the side.

The support member 31 is attached to the front end portion of the seat cushion XS2 of the application seat XS, and is formed of a plurality of support pieces 31a connected together. Each support piece 31a is formed of a substantially-strip-shaped metal plate elongated in the width direction. In the support member 31, adjacent ones of the support pieces 31a are connected together with hinges such that one support piece 31a is rotatable relative to another support pieces 31a.

When the ottoman air cell 30 expands, the support member 31 moves to a support position (the position of the support member 31 illustrated in FIG. 12) at which the knees of the legs of the seated passenger are supported at front surface of each support piece 31a. On the other hand, when the ottoman air cell 30 contracts, the support member 31 moves to a standby position (the position of the support member 31 illustrated in FIG. 11) at which the support member 31 stands by in a suspending state at a front portion of the seat cushion XS2.

With the ottoman portion Xa5 configured as described above, the knees of the legs of the seated passenger can be supported at a flat surface, more specifically at the front surfaces of the support pieces 31a, when the ottoman air cell 30 expands to support the knees of the legs of the seated passenger. As a result, the state in which the knees of the legs of the seated passenger are stably supported can be well maintained.

Arrangement of Various Sensors in Application Seat XS

Figure 13:
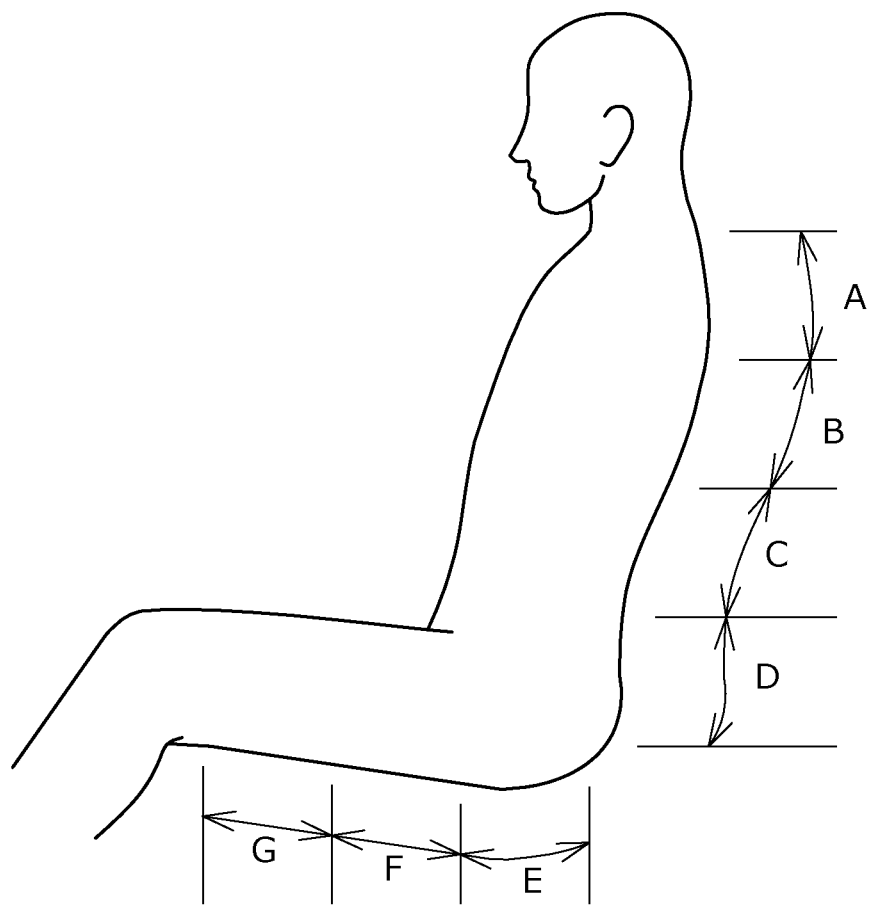
FIG. 13 is a side pictorial view illustrating a curving state of the bones of the seated passenger.

The application seat XS includes, at plural positions thereof, the movable portions with the air cells as described above. When the passenger is seated on the application seat XS, each movable portion is automatically activated. Accordingly, the back and femoral regions of the body of the seated passenger are pressed, and then, the posture of the seated passenger is corrected. In other words, the passenger is seated on the application seat XS so that a curving state of the bones of the seated passenger can be actively corrected. The "curving state of the bones" described herein is an indicator for a three-dimensional bone structure, such as a bone shape and bone misalignment or distortion. In the present embodiment, as illustrated in FIG. 13, the curvature of arc-shaped bones in each region (each of regions with reference characters A to G in FIG. 13) indicates the curving state. FIG. 13 is a view illustrating the curving state of the bones of the seated passenger.

Figure 14:
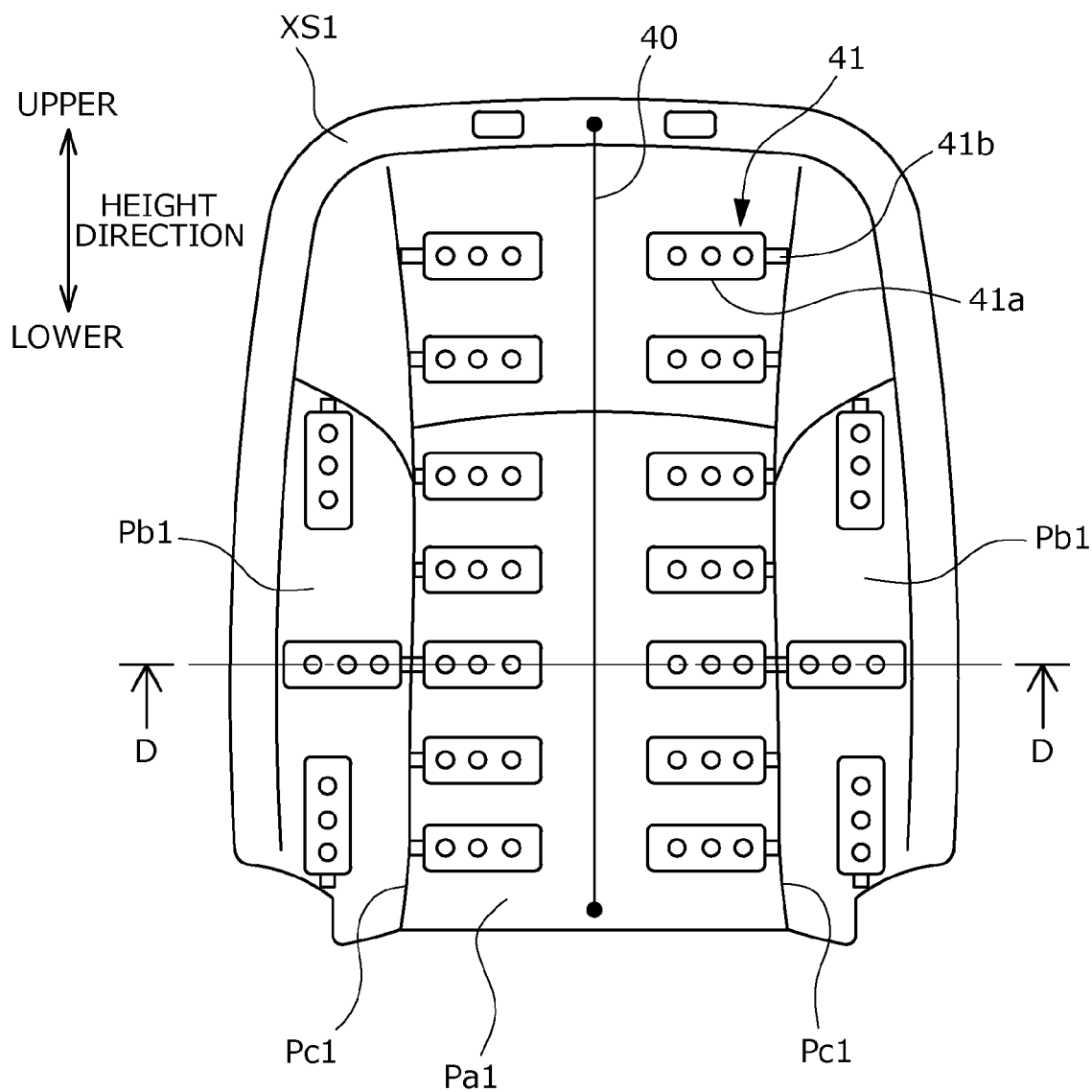
FIG. 14 is a front view illustrating an example of arrangement of posture measurement sensors in the seat back.
Figure 15:
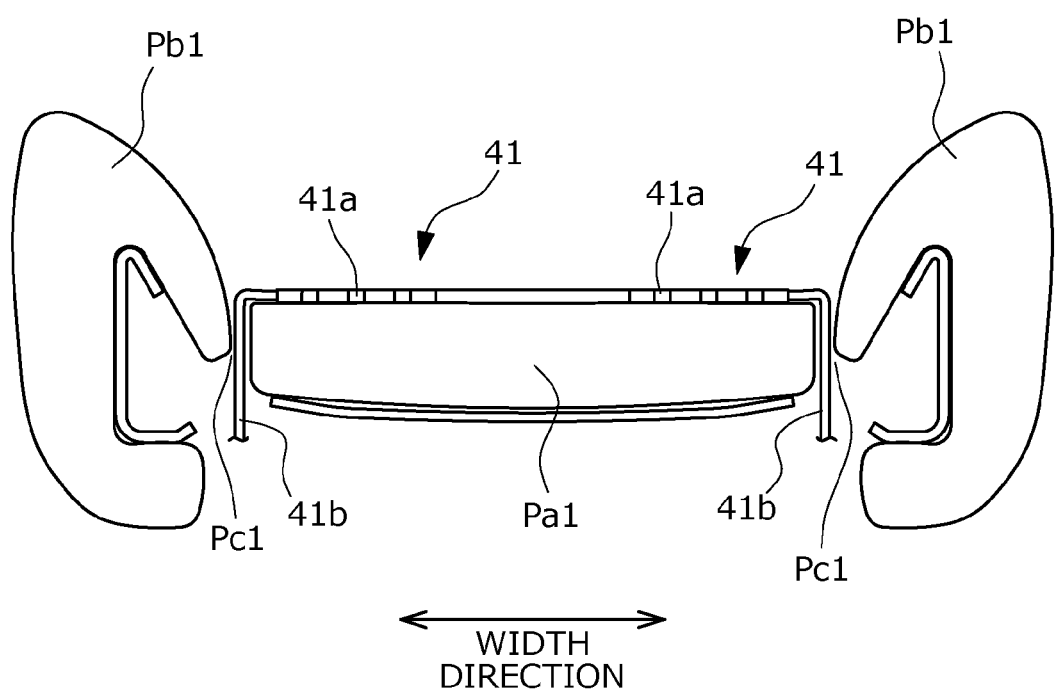
FIG. 15 is a schematic cross-sectional view along a D-D line of FIG. 14.
Figure 16:
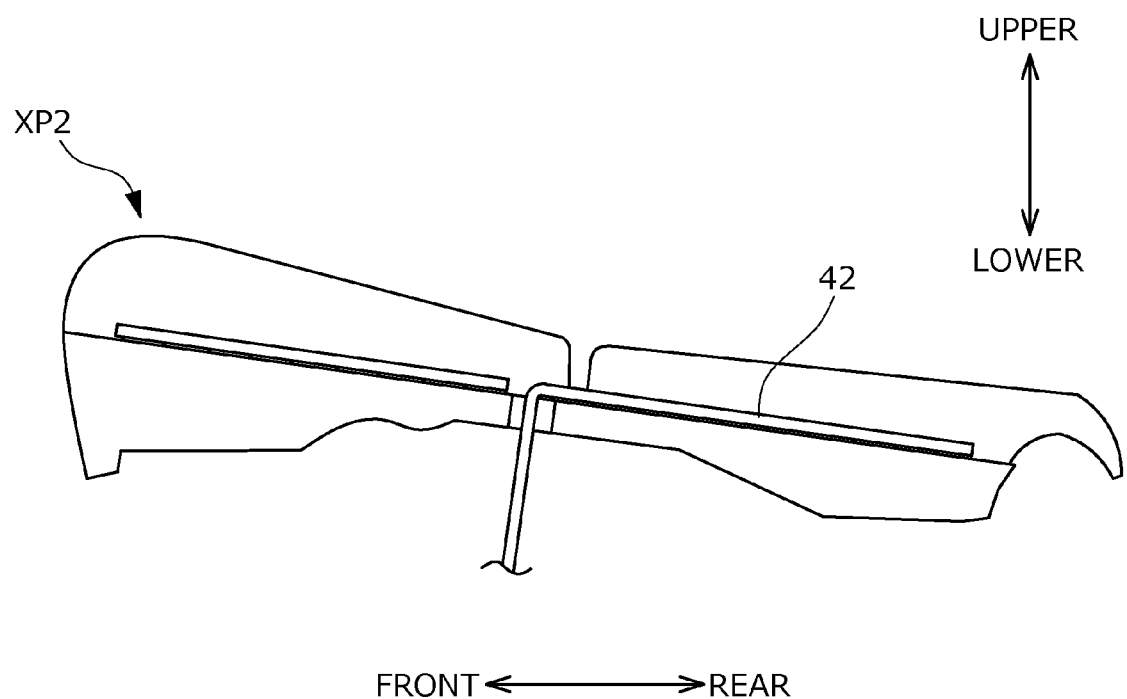
FIG. 16 is a side view illustrating an attachment state of the posture measurement sensors in the seat cushion.

In correction of the posture of the seated passenger by the application seat XS, an initial posture of the seated passenger, i.e., an initial curving state of the bones of the seated passenger, needs to be detected. For such a reason, a posture measurement sensor is disposed at each of the seat back XS1 and the seat cushion XS2 of the application seat XS. Arrangement of the posture measurement sensors will be described below with reference to FIGS. 14 to 16. FIG. 14 is a view illustrating an example of arrangement of the posture measurement sensors in the seat back XS1. FIG. 15 is a schematic cross-sectional view along a D-D line of FIG. 14. FIG. 16 is a view illustrating an attachment state of the posture measurement sensors in the seat cushion XS2, and is also a schematic cross-sectional view of the seat cushion XS2 along the vertical plane.

In the application seat XS, a shape sensor 40 illustrated in FIG. 14 is used as one of the posture measurement sensors. The shape sensor 40 is formed of a shape-sensing optical fiber, and has flexibility. The shape sensor 40 is configured to bend along the curving shape of the bones of the seated passenger to detect the posture of the seated passenger. Specifically, when the shape sensor 40 bends in an arch shape along the back of the body of the passenger seated on the application seat XS, the refractive index of light at each portion of the shape sensor 40 changes. The shape sensor 40 is connected to a not-shown circuit board via, e.g., a connector or a cable, and outputs a signal corresponding to the change in the refractive index of light to the circuit board. Then, in the circuit board, the three-dimensional shape of the shape sensor 40 such as twisting or bending of the shape sensor 40 is specified based on the signal output from the shape sensor 40, and the posture of the seated passenger is determined based on the identification result.

The shape sensor 40 is, as illustrated in FIG. 14, disposed at the middle of the application seat XS in the width direction to properly bend along the bones (e.g., the spine) of the seated passenger.

In addition to the shape sensor 40 described above, body pressure sensors 41 as other posture measurement sensors are used at the seat back XS1 of the application seat XS. Each body pressure sensor 41 is in the form of a substantially-strip-shaped film, and includes a detector 41a as a sensor body and a transmission line 41b for transmitting a signal output from the detector 41a. The detector 41a is configured to detect a pressure (a body pressure) applied when the passenger is seated on the application seat XS to output a signal corresponding to the magnitude of the body pressure. The transmission line 41b is drawn from a front surface to a rear surface of the seat back XS1.

The body pressure sensors 41 are arranged at such positions in the width direction that the shape sensor 40 is avoided. Specifically, the plurality of body pressure sensors 41 in a horizontally-oriented attitude are arranged in the vertical direction at the side of the shape sensor 40 as illustrated in FIG. 14. More specifically, the body pressure sensors 41 are arranged at such positions that the distribution of the body pressure in the vicinity of the shoulders of the seated passenger, the distribution of the body pressure in the entirety of the back of the seated passenger, and the distribution of the body pressure in the vicinity of the waist of the seated passenger can be measured.

Each body pressure sensor 41 is interposed between a pad material XP1 and a cover material, the pad material XP1 and the cover material forming the seat back XS1. The pad material XP1 is made of, e.g., urethane, and includes a flat portion Pa1 at a middle portion in the width direction and projections Pb1 at both end portions in the width direction. An insertion groove Pc1 into which the cover material is inserted is, in the height direction of the pad material XP1 (the vertical direction of the seat), formed between the flat portion Pa1 and each projection Pb1.

The transmission line 41b of the body pressure sensor 41 is drawn from the front surface to the rear surface of the seat back XS1 as described above, and a line-drawing path is preferably the shortest possible. In addition, the line-drawing path of the transmission line 41b needs to be set such that a passenger's feeling of discomfort due to providing the transmission lines 41b is reduced to the minimum possible.

For such reasons, in the application seat XS, though-holes reaching a rear surface of the pad material XP1 are formed at several positions of the insertion grooves Pc1, and each transmission line 41b is, as illustrated in FIG. 15, drawn to the rear surface of the pad material XP1 through the hole. This reduces the passenger's feeling of discomfort due to providing the transmission lines 41b. The positions of the above-described holes are formed at the insertion grooves Pc1 are preferably determined corresponding to the arrangement positions of the body pressure sensors 41, and for example, may be the positions adjacent respectively to the body pressure sensors 41.

Arrangement of the sensors of the seat cushion XS2 of the application seat XS will be described. In the seat cushion XS2, capacitance sensors 42 as other posture measurement sensors are used in addition to the shape sensor 40 described above. Each capacitance sensor 42 is drawn to a lower surface of the seat cushion XS2. For such a configuration, through-holes reaching the lower surface of the seat cushion XS2 are formed at a pad material XP2 forming the seat cushion XS2 as illustrated in FIG. 16, and each capacitance sensor 42 is drawn to the lower surface of the seat cushion XS2 through the corresponding hole.

Typically in attachment of the capacitance sensors 42 to the seat cushion XS2, each capacitance sensor 42 is bonded to an upper surface of the pad material XP2. However, in such an attachment method, the capacitance sensors 42 may be damaged due to an excessive load applied to the capacitance sensors 42 when the passenger is seated. Moreover, since the capacitance sensors 42 are on the upper surface of the pad material XP2, a feeling of discomfort may be provided to the passenger seated on the seat. In addition, upon placement of a component such as a heater on the surface of the pad material XP2, the area for the placement of the component is limited due to the placement of the capacitance sensors 42.

For such reasons, in the application seat XS, the capacitance sensors 42 are embedded in the pad material XP2 as illustrated in FIG. 16. More specifically, after a lower portion of the pad material XP2 is formed, the capacitance sensors 42 are bonded to a surface (an upper surface) of the portion. Then, an upper portion of the pad material XP2 is formed. With such a configuration, in the application seat XS, the problems in bonding of the capacitance sensors 42 to the upper surface of the pad material XP2 are solved.

In order to form the upper portion of the pad material XP2 after the capacitance sensors 42 are bonded, the upper portion of the pad material XP2 may be prepared as a separate member, and after the capacitance sensors 42 are bonded, the upper portion of the pad material XP2 as the separate member may be bonded to the lower portion of the pad material XP2. Alternatively, the lower portion of the pad material XP2 to which the capacitance sensors 42 are bonded may be placed in a not-shown mold again, and then, the upper portion of the pad material XP2 may be molded in the manner of insert molding. That is, the upper and lower portions of the pad material XP2 may be integrally molded.

The posture measurement sensors described so far are mounted in the application seat XS, and posture measurement using the above-described sensors automatically begins, e.g., when the passenger is seated. In the application seat XS, weight sensors for measuring the weight of the seated passenger are further provided one by one respectively on the front, rear, right, and left sides. Weight measurement using the weight sensors is performed at the same time as posture measurement.

Control of Correction of Seating Posture

The above-described configuration allows the application seat XS to correct the posture of the seated passenger (i.e., the curving state of the bones of the seated passenger). The control of correction of the seating posture by the application seat XS will be described below in detail.

Control Configuration

Figure 17:
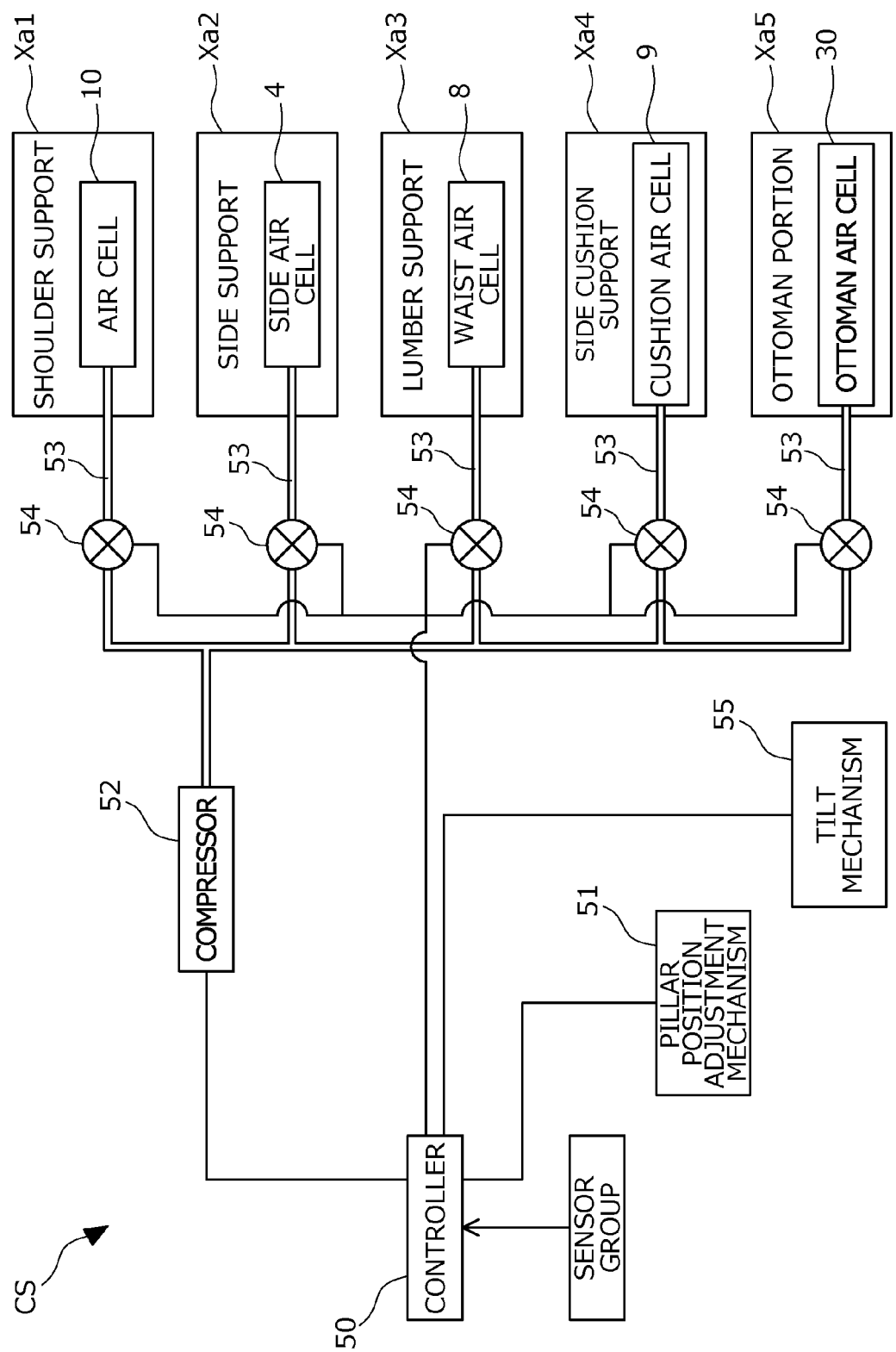
FIG. 17 is a block diagram illustrating the configuration of the system for controlling correction of a seating posture.

First, the configuration of the system for controlling correction of the seating posture will be described with reference to FIG. 17. FIG. 17 is a block diagram illustrating the configuration of the system for controlling correction of the seating posture.

The system (hereinafter referred to as a "control system CS") for controlling correction of the seating posture includes, as illustrated in FIG. 17, the above-described sensor group, a controller 50, the movable portions mounted in the application seat XS and each including the air cell, and a drive mechanism configured to drive the movable portions. The "movable portions" described herein includes, as described above, the shoulder supports Xa1, the side supports Xa2, the lumber support Xa3, the side cushion supports Xa4, and the ottoman portion Xa5.

The control system CS further includes a pillar position adjustment mechanism 51. The pillar position adjustment mechanism 51 is mounted in the application seat XS, and is configured to adjust the positions of the head rest pillars hp in the vertical direction and the front-to-back direction. The pillar position adjustment mechanism 51 adjusts the positions of the head rest pillars hp to change the position of a head rest XS3 in the vertical direction and the front-to-back direction.

The control system CS further includes a tilt mechanism 55. The tilt mechanism 55 is mounted in the seat cushion XS2 of the application seat XS, particularly in the front end portion of the seat cushion XS2 supporting the femoral regions of the seated passenger. The tilt mechanism 55 is configured to adjust a seating surface angle of the front end portion.

The sensor group includes, e.g., the posture measurement sensors and the weight sensors, these sensors being mounted in the application seat XS. For the passenger seated on the application seat XS, the sensor group can measure the following: the curving state of the bones; a pressure distribution in the vicinity of the shoulders; a pressure distribution at each portion of the back; a pressure distribution in the vicinity of the waist; a pressure distribution across the area from the buttocks to back portions of the knees; and the weight of the passenger.

The controller 50 includes an electronic control unit (ECU) mounted in a vehicle, and is configured to receive signals output from the sensors to calculate various index values on the posture of the seated passenger. For example, the controller 50 calculates the position of the center of gravity of the seated passenger based on the measurement result on the pressure distribution at the back of the seated passenger.

The controller 50 further controls, based on the calculated values, the movable portions mounted in the application seat XS and each including the air cell, as well as controlling the pillar position adjustment mechanism 51. Specifically, the movable portions with the air cells are operated by operation of the drive mechanism. The "drive mechanism" described herein includes the compressor 52, air supply lines 53 (specifically, the paths formed by the above-described tube members C1, C2) connected to the compressor 52, and solenoid valves 54 provided respectively at the air supply lines 53. The air supply line 53 is provided for each air cell, and a terminal end portion of the air supply line 53 is connected to the air cell. Moreover, the solenoid valve 54 is provided for each air cell (i.e., for each air supply line 53).

The controller 50 controls ON/OFF of the compressor 52 and opening/closing of the solenoid valves 54 to control the degree of expansion of each air cell. Moreover, the controller 50 controls ON/OFF of a not-shown drive mechanism mounted in the pillar position adjustment mechanism 51, thereby controlling the pillar position adjustment mechanism 51 such that the head rest pillars hp reach target positions. Further, the controller 50 controls ON/OFF of a not-shown drive mechanism mounted in the tilt mechanism 55, thereby controlling the tilt mechanism 55 such that the seating surface angle of the front end portion of the seat cushion XS2 reaches a predetermined angle.

Flow in Control of Correction of Seating Posture

Figure 18:
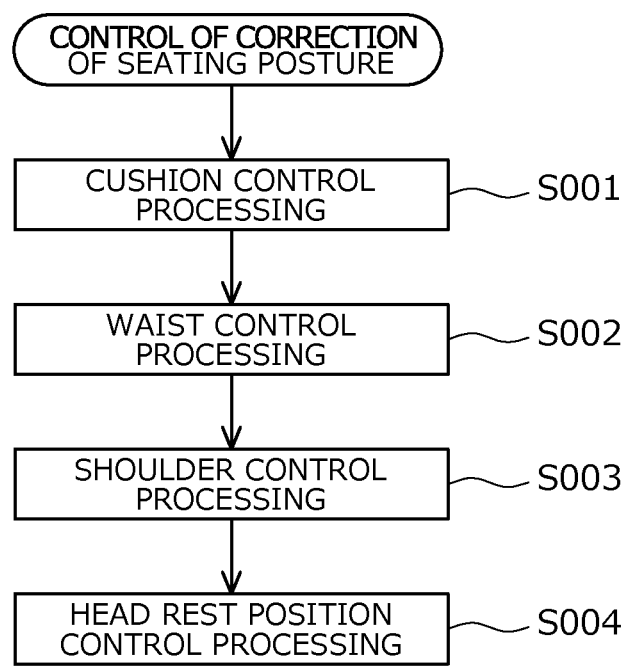
FIG. 18 is a flowchart showing the outline of a flow in the control of correction of the seating posture.

Next, a flow in the control of correction of the seating posture will be described with reference to FIG. 18. FIG. 18 is a flowchart showing the outline of the flow in the control of correction of the seating posture.

Correction of the seating posture is, as illustrated in FIG. 18, controlled in the order of cushion control processing S001, waist control processing S002, shoulder control processing S003, and head rest position control processing S004. Each control processing will be separately described below.

(1) Cushion Control Processing S001

The cushion control processing S001 includes control processing (hereinafter referred to as "seating surface pressure distribution optimizing processing") for optimizing the pressure distribution across the area from the buttocks to the back portions of the knees, and control processing (hereinafter referred to as "gravity center correction processing") for moving the center of gravity of the seated passenger to a regular position.

Figure 19:
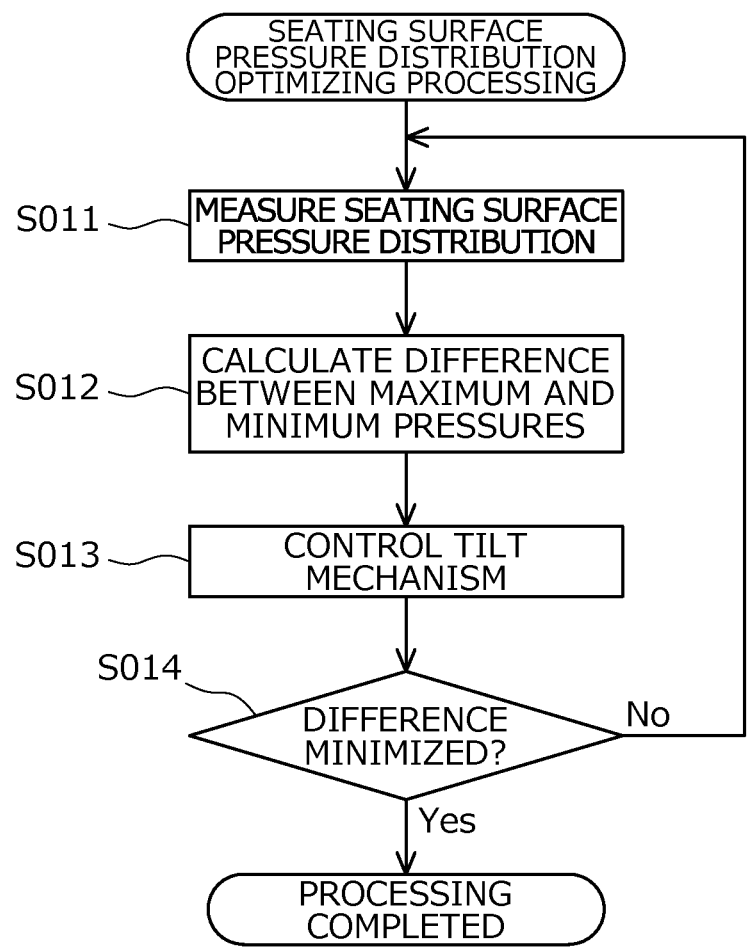
FIG. 19 is a flowchart showing the procedure of first control processing in the control of correction of the seating posture.

The seating surface pressure distribution optimizing processing will be described. This processing is performed by the procedure illustrated in FIG. 19. FIG. 19 is a flowchart showing the procedure of the seating surface pressure distribution optimizing processing.

The seating surface pressure distribution optimizing processing starts from measurement of a seating surface pressure distribution, i.e., the pressure distribution across the area from the buttocks to the back portions of the knees, when the passenger is seated on the application seat XS (S011). After measurement, the controller 50 calculates the index value on the seating surface pressure distribution (S012). The index value on the seating surface pressure distribution is not limited, and an example thereof is that the maximum pressure and the minimum pressure in the measured seating surface pressure distribution are specified to calculate the difference between the maximum pressure and the minimum pressure.

Subsequently, the controller 50 controls the tilt mechanism 55 such that the seating surface angle of the front end portion of the seat cushion XS2 changes by a predetermined degree (S013). Then, the following steps are repeated such that the above-described difference is minimized: the step S011 for measuring the seating surface pressure distribution; the step S012 for calculating the difference between the maximum and minimum pressures in the seating surface pressure distribution; and the step S013 for controlling the tilt mechanism 55. Finally, when the above-described difference reaches the minimum value (S014), the seating surface pressure distribution optimizing processing is completed.

Figure 20:
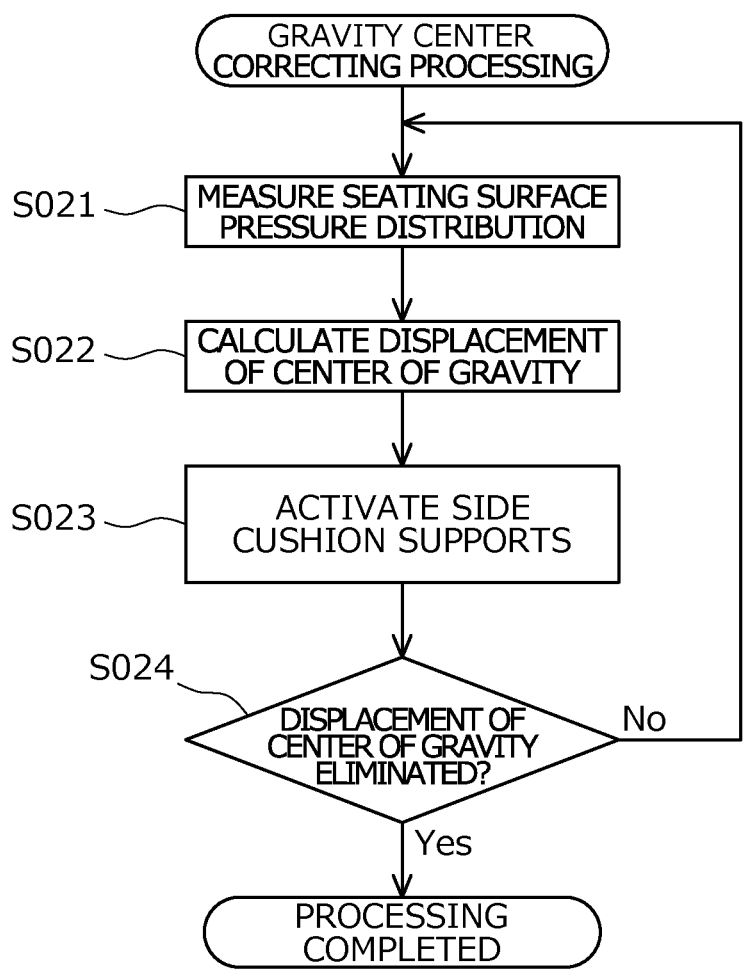
FIG. 20 is a flowchart showing the procedure of second control processing in the control of correction of the seating posture.

Next, the gravity center correction processing will be described. This gravity center correction processing is performed by the procedure illustrated in FIG. 20. FIG. 20 is a flowchart showing the procedure of the gravity center correction processing.

Specifically, the gravity center correction processing starts from measurement of the seating surface pressure distribution when the passenger is seated on the application seat XS (S021). After measurement, the controller 50 calculates a seating surface pressure balance, i.e., a displacement of the center of gravity, based on the measurement result (S022).

The procedure for calculating the displacement of the center of gravity based on the measurement result of the seating surface pressure distribution is not limited specifically, and an example thereof is that the measured seating surface pressure distribution is divided into right and left portions with respect to the middle of the seat in the width direction, and then, an average in the left pressure distribution and an average in the right pressure distribution are calculated. The difference between the calculated averages is taken as the displacement of the center of gravity.

After the displacement of the center of gravity is calculated, the controller 50 controls the compressor 52 and the solenoid valves 54 such that the air cells (the cushion air cells 9) of the side cushion supports Xa4 expand by a predetermined degree (S023). Then, the following steps are repeated until the displacement of the center of gravity is eliminated, i.e., the seating surface pressure exhibits a substantially-symmetrical distribution: the step S021 for measuring the seating surface pressure distribution; the step S022 for calculating the displacement of the center of gravity; and the step S023 for activating the side cushion supports Xa4. Finally, when the displacement of the center of gravity is eliminated (S024), the gravity center correction processing is completed.

(2) Waist Control Processing S002

The waist control processing S002 includes control processing (hereinafter referred to as "body pressure distribution optimizing processing") for optimizing a body pressure distribution at the back of the seated passenger, and control processing (hereinafter referred to as "second gravity center correction processing") for moving the center of gravity of the seated passenger to the regular position.

Figure 21:
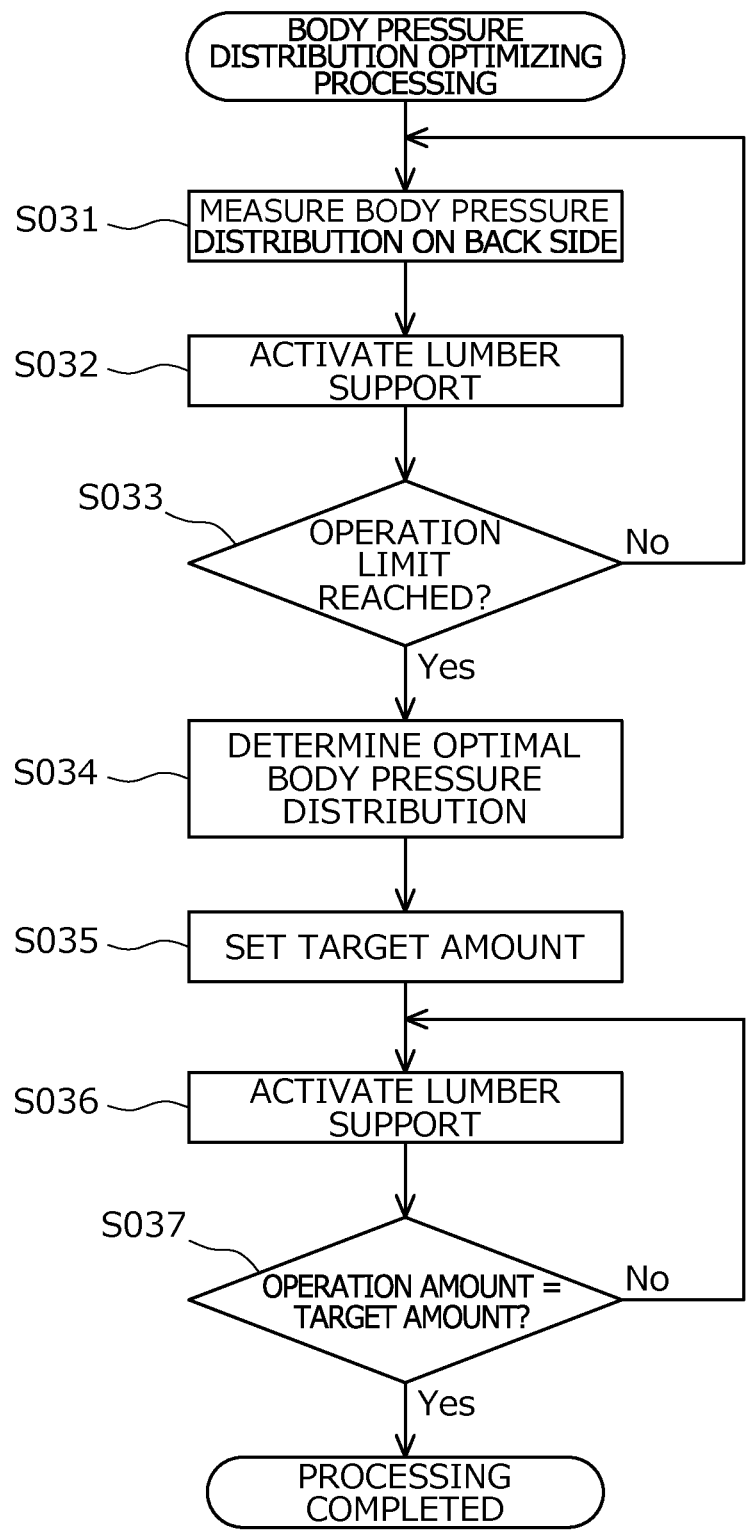
FIG. 21 is a flowchart showing the procedure of third control processing in the control of correction of the seating posture.

The body pressure distribution optimizing processing will be described. This processing is performed by the procedure illustrated in FIG. 21. FIG. 21 is a flowchart showing the procedure of the body pressure distribution optimizing processing.

The body pressure distribution optimizing processing starts from measurement of the body pressure distribution at the back of the seated passenger when the passenger is seated on the application seat XS (S031). After measurement, the controller 50 controls the compressor 52 and the solenoid valve 54 such that the air cell (the waist air cell 8) of the lumber support Xa3 expands by a predetermined degree (S032). These steps S031, S032 (i.e., measurement of the body pressure distribution at the back of the seated passenger and activation of the lumber support Xa3) are repeated until the lumber support Xa3 reaches the operation limit thereof, more clearly until the degree of expansion of the waist air cell 8 reaches the maximum degree (S033).

An optimal body pressure distribution is determined based on the measurement result of the body pressure distribution measured while the operation amount of the lumber support Xa3 is changed (S034). The procedure for determining the optimal body pressure distribution is not limited specifically, and an example thereof is that the measured body pressure distribution at the back of the seated passenger is divided into a distribution at an upper portion of the back, a distribution at a middle portion of the back, and a distribution at a lower portion of the back to calculate an average of a body pressure at each portion of the back. Of the calculated three averages, the difference between the maximum value and the minimum value is obtained. The body pressure distribution with the minimum difference is set as the optimal body pressure distribution.

When the optimal body pressure distribution is determined, the controller 50 sets, as a target amount, the operation amount of the lumber support Xa3 taken when the same measurement result as that of the optimal body pressure distribution is obtained (S035). Subsequently, the controller 50 controls the compressor 52 and the solenoid valve 54 such that the operation amount of the lumber support Xa3 reaches the target amount (S036). Finally, when the operation amount of the lumber support Xa3 reaches the target amount (S037), the body pressure distribution optimizing processing is completed.

Figure 22:
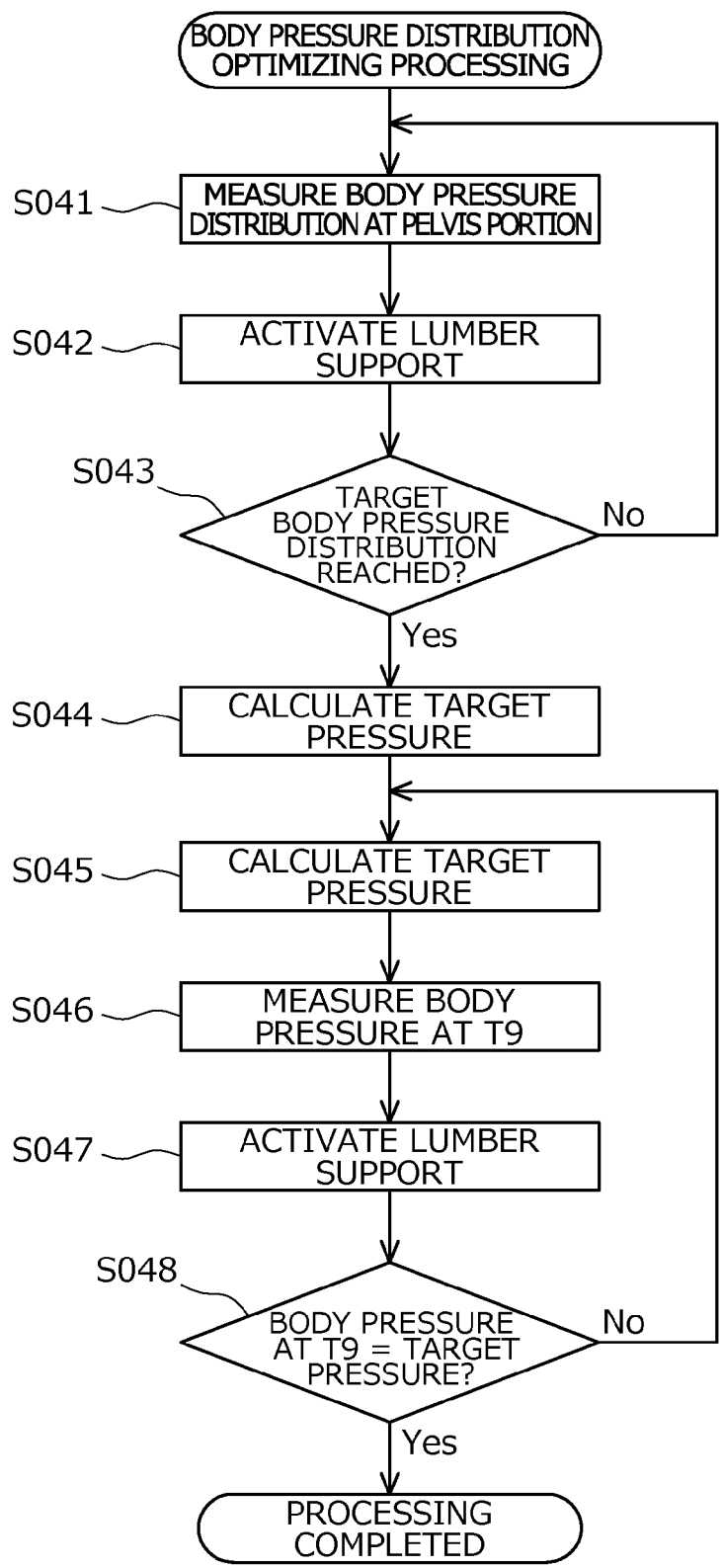
FIG. 22 is a flowchart showing a variation of the procedure of the third control processing.

The body pressure distribution optimizing processing may be performed not only by the procedure illustrated in FIG. 21 but also by the procedure illustrated in FIG. 22. FIG. 22 is a flowchart showing a modification in the procedure of the body pressure distribution optimizing processing.

More specifically, in the modification, the body pressure distribution optimizing processing starts from measurement of a body pressure distribution at a pelvis portion of the back of the seated passenger when the passenger is seated on the application seat XS (S041). After measurement, the controller 50 controls the compressor 52 and the solenoid valve 54 such that the waist air cell 8 expands by a predetermined degree (S042). These steps S041, S042 (i.e., measurement of the body pressure distribution at the pelvis portion and activation of the lumber support Xa3) are repeated until the body pressure distribution at the pelvis portion reaches a target body pressure distribution (S043). The "target body pressure distribution" described herein is an ideal body pressure distribution at the pelvis portion, and specifically, is clearly defined by statistical data or experiments.

After the body pressure distribution at the pelvis portion reaches the target body pressure distribution, the weight of the seated passenger is measured (S044), and then, the controller 50 further calculates a target pressure based on the weight measurement result (S045). The "target pressure" described herein is an ideal body pressure at a predetermined portion (specifically, a portion called "T9" in the field of anatomy) of the spine of a seated passenger. The procedure for calculating the target pressure based on the weight is not limited specifically, and an example thereof is that the correlation between the ideal pressure at the predetermined portion of the spine of the seated passenger and the weight of the seated passenger is clearly defined by experiments and the target pressure is calculated based on its correlation equation.

After calculation of the target pressure, a body pressure at the predetermined portion (specifically, the portion corresponding to the "T9") of the spine of the seated passenger is measured (S046). After measurement, the controller 50 controls the compressor 52 and the solenoid valve 54 such that the waist air cell 8 expands by a predetermined degree (S047). These steps S046, S047 (i.e., measurement of the body pressure distribution at the portion corresponding to the "T9" and activation of the lumber support Xa3) are repeated until the body pressure measurement result reaches the target pressure. Finally, when the body pressure distribution measurement result at the portion corresponding to the "T9" reaches the target pressure (S048), the body pressure distribution optimizing processing of the modification is completed.

Figure 23:
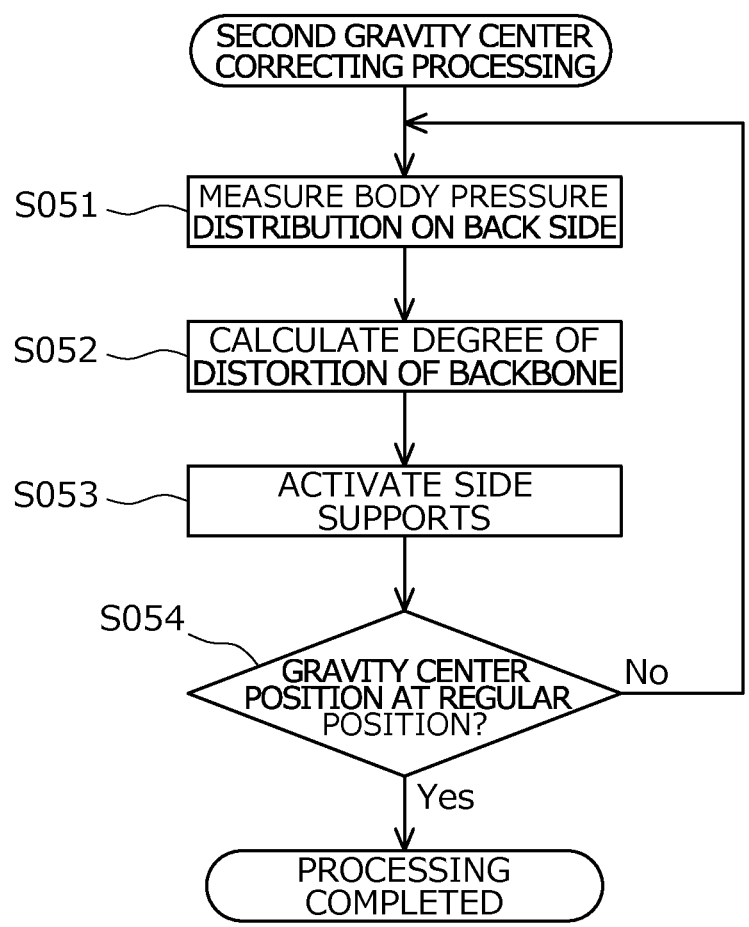
FIG. 23 is a flowchart showing the procedure of fourth control processing in the control of correction of the seating posture.

Next, the second gravity center correction processing will be described. This second gravity center correction processing is performed by the procedure shown in FIG. 23. FIG. 23 is a flowchart showing the procedure of the second gravity center correction processing.

Specifically, the second gravity center correction processing starts from measurement of the body pressure distribution at the back of the seated passenger when the passenger is seated on the application seat XS (S051). After measurement, the controller 50 calculates the degree of distortion of the backbone (the degree of curvature in the right-to-left direction) (S052).

The procedure for calculating the degree of distortion of the backbone based on the body pressure distribution at the back of the seated passenger is not limited specifically, and an example thereof is that the least body pressure portion of the body pressure distribution corresponds to the backbone. Thus, in a regular seating posture, the least body pressure portion of the body pressure distribution is positioned in the middle of the seat in the width direction as shown in FIG. 24, and in such a state, the center of gravity is on the regular position. FIG. 24 is graphs showing the relationship between the body pressure distribution at the back of the seated passenger and the position of the center of gravity.

On the other hand, when distortion of the backbone occurs, the least body pressure portion of the body pressure distribution is positioned off of the middle of the seat in the width direction as shown in FIG. 24, and the degree of distortion of the backbone is calculated from the displacement. Needless to say, in the distortion state of the backbone, the center of gravity is positioned off of the regular position.

After the degree of distortion of the backbone is calculated, the controller 50 controls the compressor 52 and the solenoid valves 54 such that the air cells (the side air cells 4) of the side supports Xa2 expand by a predetermined degree (S053). Then, the following steps are repeated until the position of the center of gravity reaches the regular position, i.e., distortion of the backbone is eliminated: the step S051 for measuring the body pressure distribution at the back of the seated passenger; the step S052 for calculating the degree of distortion of the backbone; and the step S053 for activating the side supports Xa2. Finally, when the position of the center of gravity reaches the regular position (S054), the second gravity center correction processing is completed.

(3) Shoulder Control Processing S003

Figure 25:
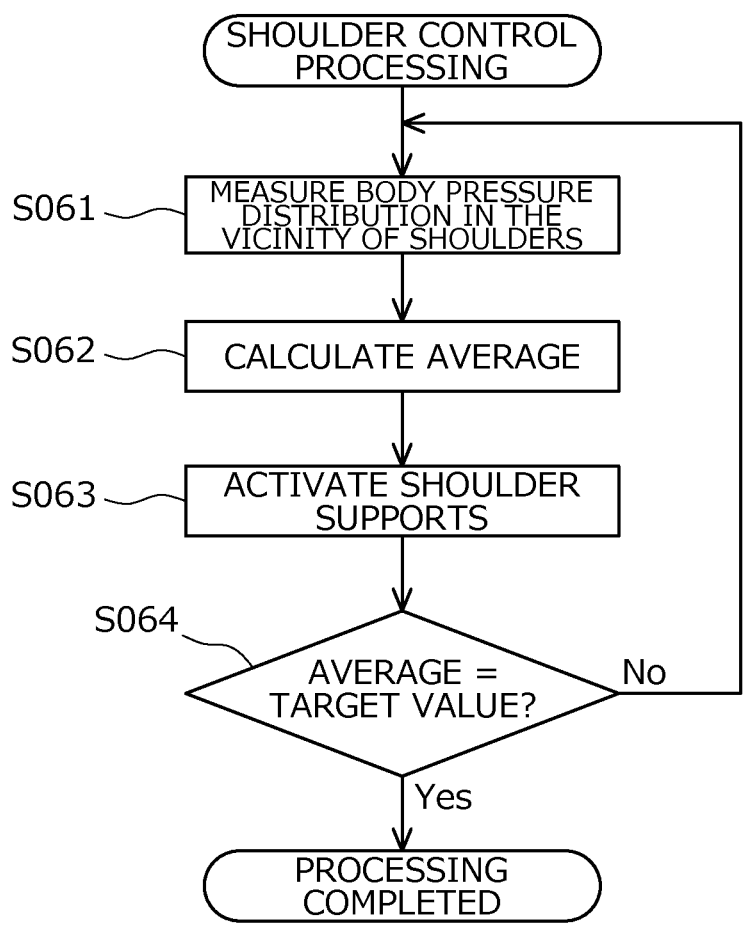
FIG. 25 is a flowchart showing the procedure of fifth control processing in the control of correction of the seating posture.

The shoulder control processing S003 is processing for properly supporting the shoulders of the seated passenger according to the corrected seating posture, and is performed by the procedures shown in FIG. 25. FIG. 25 is a flowchart showing the procedure of the shoulder control processing S003.

Specifically, the shoulder control processing S003 starts from measurement of the body pressure distribution in the vicinity of the shoulders of the seated passenger when the passenger is seated on the application seat XS (S061). After measurement, the controller 50 calculates the index value on the body pressure distribution in the vicinity of the shoulders based on the measurement result (S062). The index value on the body pressure distribution in the vicinity of the shoulders is not limited, and an example thereof is that an average in the measured body pressure distribution is calculated.

Subsequently, in order to activate the shoulder supports Xa1, the controller 50 controls the compressor 52 and the solenoid valves 54 such that the air cells 10 expand by a predetermined degree (S063). At this point, the shoulder supports Xa1 push the shoulders of the seated passenger such that force acts inward in the width direction and downward on the shoulders of the seated passenger.

The steps described so far, i.e., the step S061 for measuring the body pressure distribution in the vicinity of the shoulders, the step S062 for calculating the average in the body pressure distribution, and the step S063 for activating the shoulder supports Xa1, are repeated until the above-described average reaches a target value. The "target value" described herein is an average in the body pressure distribution in the vicinity of the shoulders with the shoulders being favorably held, and is clearly defined by, e.g., statistical data or experiments.

When the above-described average reaches the target value (S064), the shoulder control processing S003 is completed. When the shoulder control processing S003 is completed, the contact pressure of the shoulder supports Xa1 on the shoulders of the seated passenger is properly adjusted, and the shoulder supports Xa1 cover around the shoulders of the seated passenger to support the shoulders.

(4) Head Rest Position Control Processing S004

The head rest position control processing S004 is processing for properly supporting the head of the seated passenger according to the corrected seating posture. In this control processing, the controller 50 controls the pillar position adjustment mechanism 51 based on the body pressure distribution at each portion of the body, the body pressure distribution being changed by posture correction. As a result, the positions of the head rest pillars hp and the position of the head rest XS3 supported by the head rest pillars hp are adjusted to proper positions according to the corrected seating posture.

The procedure of the head rest position control processing S004, i.e., the procedure for adjusting the positions of the head rest pillars hp, is not described specifically, and may be freely determined as long as the positions of the head rest pillars hp can be adjusted to such positions that the head of the seated passenger can be properly supported.

The control of correction of the seating posture proceeds by the flow described so far, and the posture of the seated passenger is corrected to a proper posture when a series of the control processing is completed in its entirety. In the above-described example, the posture correction control proceeds by performing the cushion control processing S001, the waist control processing S002, the shoulder control processing S003, and the head rest position control processing S004 in this order, but is not limited to such an order. That is, the order of the respective control processing in the posture correction control may be other than the example described above. Specifically, the posture correction control may proceed in the orders described in the table below as R1 to R9. In each of R1 to R9, each control processing is indicated only by a reference character, and for example, the cushion control processing S001 is indicated by "S001."

| R1 | S001 | S003 | S002 | S004 |
|----|------|------|------|------|
| R2 | S001 | S003 | S004 | S002 |
| R3 | S002 | S003 | S001 | S004 |
| R4 | S002 | S001 | S003 | S004 |
| R5 | S002 | S003 | S004 | S001 |
| R6 | S003 | S002 | S001 | S004 |
| R7 | S003 | S001 | S002 | S004 |
| R8 | S003 | S002 | S004 | S001 |
| R9 | S004 | S003 | S002 | S001 |

Developed Configuration of Application Seat XS

In the above-described embodiment, the vehicle seat, i.e., the application seat XS, capable of correcting the posture of the seated passenger based on the measurement results of various sensors has been described. The configuration further developed from the configuration of the application seat XS includes the configuration in which the position and state of the seat itself can be adjusted based on the measurement results of various sensors. The developed configuration of the application seat XS will be described below.

Figure 26:
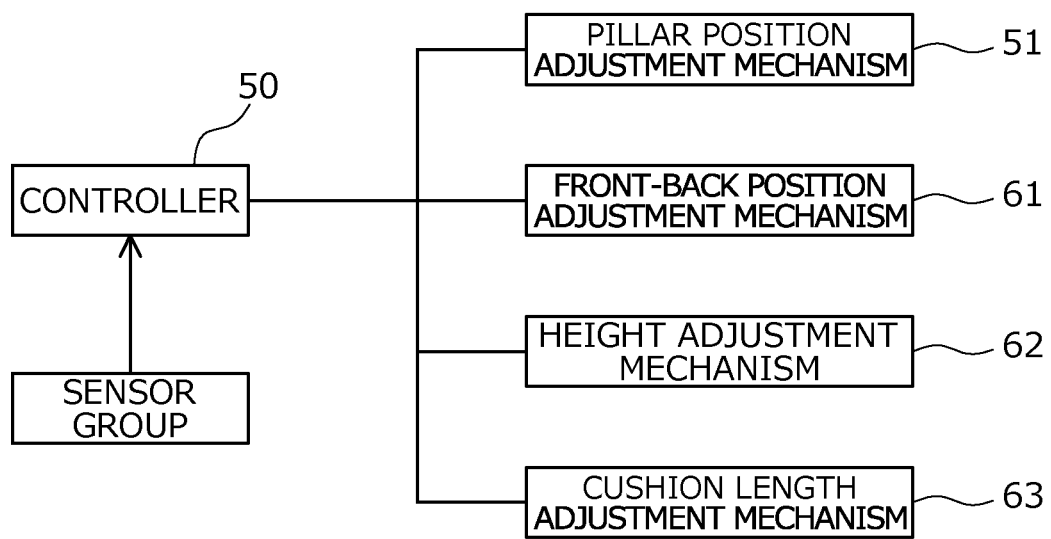
FIG. 26 is a diagram illustrating a developed configuration of the vehicle seat of the application example.

The application seat XS (hereinafter referred to as an "application seat XS of a developed example") having the configuration developed as described above is capable of actively adjusting the position and state of the application seat XS. Specifically, the application seat XS of the developed example includes, as illustrated in FIG. 26, the sensor group, the controller 50, and the pillar position adjustment mechanism 51 described above. The application seat XS of the developed example further includes a front-back position adjustment mechanism 61, a height adjustment mechanism 62, and a cushion length adjustment mechanism 63. FIG. 26 is a diagram illustrating the developed configuration of the application seat XS, and to be exact, illustrates the configuration of the system for adjusting the position and state of the seat.

The front-back position adjustment mechanism 61 is the mechanism configured to move the application seat XS back and forth, and includes a well-known slide rail device provided at a lower portion of the seat and a drive mechanism configured to drive a movable portion of the slide rail device. The height adjustment mechanism 62 is the mechanism configured to adjust the position of the application seat XS in the vertical direction, and includes a well-known rotary link device provided at the lower portion of the seat and a drive mechanism configured to drive a rotary link. The cushion length adjustment mechanism 63 is the mechanism configured to extend the entire length (the length in the front-to-back direction) of the seat cushion XS2 of the application seat XS. The cushion length adjustment mechanism 63 includes an extension device (e.g., a device equivalent to the ottoman portion Xa5 described above) provided to freely move back and forth at the front end portion of the seat cushion XS2, and a drive mechanism configured to drive a movable portion of the extension device.

In the application seat XS of the developed example. The controller 50 estimates the build of the seated passenger based on the measurement results obtained when information on the body of the seated passenger is measured by various sensors. Subsequently, the controller 50 controls each of the above-described mechanisms (specifically, the pillar position adjustment mechanism 51, the front-back position adjustment mechanism 61, the height adjustment mechanism 62, and the cushion length adjustment mechanism 63) based on the estimation result. As a result, the position, cushion length, and head rest position (hereinafter referred to as the "seat position, etc.") of the application seat XS of the developed example are adjusted to an optimal state according to the estimated build of the seated passenger.

Figure 27:
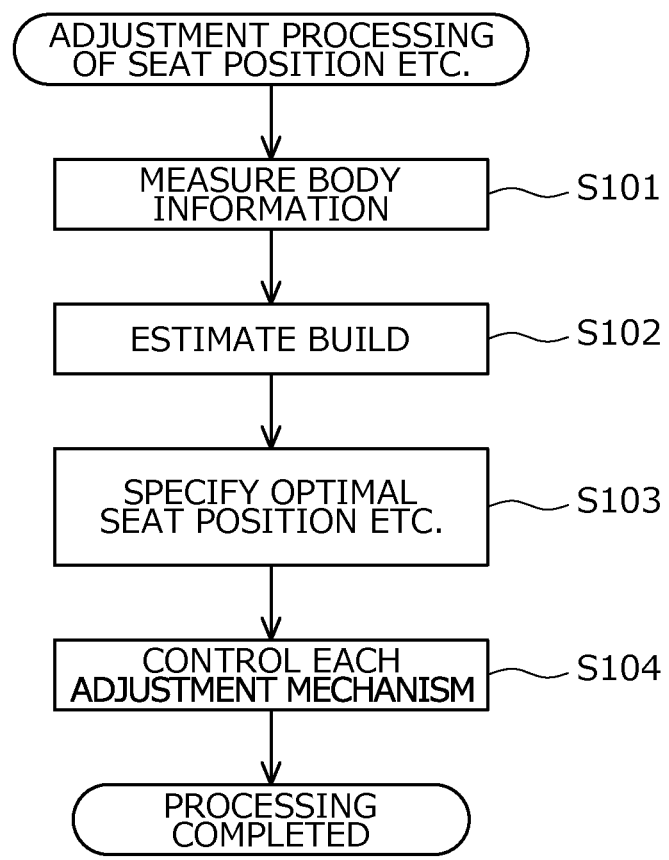
FIG. 27 is a flowchart showing the procedure of adjustment processing of a seat position, etc.

Adjustment of the seat position, etc., described above is performed by, e.g., the procedure shown in FIG. 27. FIG. 27 is a flowchart showing the procedure for adjustment processing of the seat position etc.

The adjustment processing of the seat position, etc., starts from measurement of the information on the body of the seated passenger by various sensors mounted in the application seat XS (S101). At this measurement step S101, the weight of the seated passenger is measured by the weight sensors mounted in the application seat XS, and the body width of the seated passenger (the horizontal width of the body) is measured. Measurement of the body width described herein is not limited, and an example thereof is that the contact length between the seated passenger and the seat is obtained after measurement of a body pressure distribution (particularly, a pressure distribution in the vicinity of the vertebrae lumbales or the pelvis) of the seated passenger and the body width is determined from the contact length. Alternatively, an image of the seated passenger may be captured by a camera placed in the front of the seat, and this image may be analyzed to determine the body width.

The measurement step S101 is automatically performed when a predetermined condition is satisfied. For example, any of the following conditions 1) to 4) may be employed as the condition for performing the measurement step S101:
1) a load applied when the passenger is seated on the application seat XS is detected by the weight sensors;
2) fastening of a seat belt is detected by a sensor for detecting fastening of the seat belt;
3) the passenger seated on the application seat XS is detected by a camera placed inside the vehicle; or
4) it is detected that the speed of an increase in the seating surface temperature of the seat cushion XS2 monitored by a temperature sensor is equal to or higher than a threshold.

In addition to the above-described conditions 1) to 4), the measurement step S101 may be performed when the seated passenger operates a not-shown switch provided inside the vehicle.

After the measurement step S101 is performed, the controller 50 estimates the build of the seated passenger based on the measurement results (S102). Specifically, the controller 50 estimates the height of the seated passenger based on the measured body width and weight, and then, estimates the build of the seated passenger based on the estimated height. The "build of the seated passenger" described herein includes, e.g., the length of the leg of the seated passenger, the length of the arm of the seated passenger, the position of the head of the seated passenger, and the level of the eye of the seated passenger. The method for estimating the height based on the body width and the weight and the method for estimating the build of the seated passenger based on the height are not limited, and an example thereof is that a correlation equation is obtained by experiments or statistical data and each value is substituted in the correlation equation to obtain the above-described values.

Figure 28:
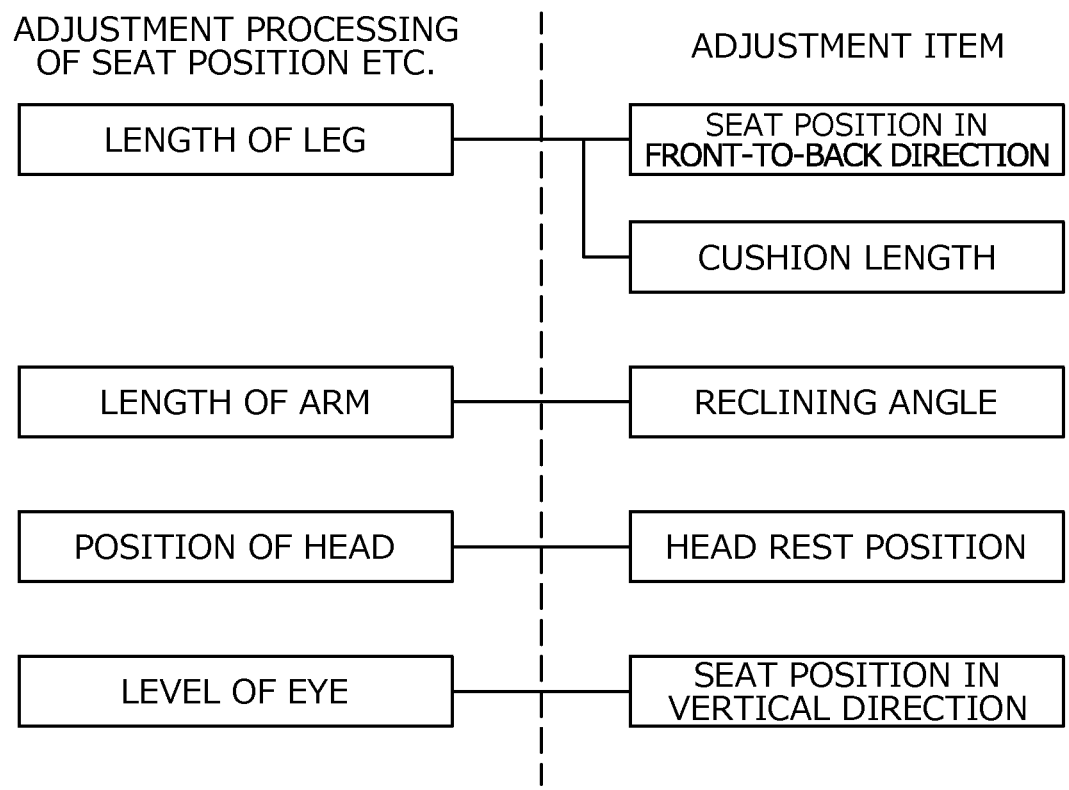
FIG. 28 is a table showing the correspondence between parameters of the build of the seated passenger and adjustment items of the seat.

Subsequently, based on the estimated build of the seated passenger, the controller 50 specifies an optimal seat position, etc., according to the build (S103). Specifically, the controller 50 estimates the length of the leg of the seated passenger, the length of the arm of the seated passenger, the position of the head of the seated passenger, and the level of the eye of the seated passenger at the preceding step S102, and the amount of adjustment is determined for each adjustment item of these parameters. The correspondence between the parameter and the adjustment item is shown in FIG. 28, and for example, the seat position and the cushion length in the front-to-back direction are adjusted according to the length of the leg. FIG. 28 is a table showing the correspondence between the parameter of the build of the seated passenger and the adjustment item of the seat.

Then, the controller 50 controls, after specifying of the optimal seat position, etc., the pillar position adjustment mechanism 51, the front-back position adjustment mechanism 61, the height adjustment mechanism 62, and the cushion length adjustment mechanism 63 according to the specified results (S104). As a result, the seat position, etc., of the application seat XS are adjusted to the optimal seat position, etc., specified by the preceding step S103. When such adjustments are completed, the adjustment processing of the seat position, etc., is ended.

As described above, the adjustment amount of the seat position, etc., is determined for each parameter of the build of the seated passenger, and this parameter is estimated based on the body width and weight of the seated passenger measured at the measurement step S101. Thus, the adjustment amount of the seat position, etc., varies depending on the estimation result of the build of the seated passenger. If there is a difference between the estimation result and an actual build, an error in the calculation result of the adjustment amount is observed. For such a reason, the seat position, etc., might not be optimized even after adjustment.

The factors E1) to E6) for causing the above-described error are listed below:
E1) the weight is not accurately measured because the feet of the passenger seated on the application seat XS are on a vehicle floor;
E2) the weight is not accurately measured due to the clothes of the seated passenger;
E3) the body width is not accurately measured due to the clothes of the seated passenger;
E4) the relationship among the body width, weight, and height of the seated passenger deviates from the relationship indicated by the equation (the correlation equation) for estimating the height from the body width and the weight;
E5) the relationship between the height and build of the seated passenger deviates from the relationship indicated by the equation (the correlation equation) for estimating the build from the height; and
E6) the seating state of the seated passenger is different from a regular seating state.

In the application seat XS of the developed example, the steps for eliminating the influence of the above-described error factors are taken to provide proper adjustment of the seat position, etc., The error factor eliminating steps employed for the application seat XS of the developed example will be described below.

First, for the first error factor E1, i.e., "the weight is not accurately measured because the feet of the passenger seated on the application seat XS are on a vehicle floor," the height adjustment mechanism 62 lifts, in measurement of the weight, the height of the seat to the highest position of the adjustable range in the application seat XS of the developed example. Thus, in measurement of the weight, the feet of the seated passenger lift from the vehicle floor, and the entire weight is on the application seat XS. Consequently, the weight can be accurately measured.

The method for eliminating the above-described error factor E1 may include methods other than the above-described method. For example, the cushion length is extended to the maximum length by the cushion length adjustment mechanism 63, and the entire legs are placed on the seat cushion XS2. Thus, as in the method described above, the entire weight is on the application seat XS. Alternatively, in weight measurement, e.g., sound or a warning label may be used to cause the seated passenger to lift the feet thereof. As another alternative, after the displacement between the weight measurement result and an actual weight is clearly defined by, e.g., experiments, the correction equation for correcting the measurement result may be determined to correct the measurement result according to the correction equation. As still another equation, weight measurement may be continuously performed after a vehicle door is opened. At the moment at which the feet of the passenger lift from the vehicle floor when the passenger is seated on the seat, the measurement result (in other words, the weight when the entire weight is on the application seat XS) may be taken as the actual weight.

Next, for the second error factor E2, i.e., "the weight is not accurately measured due to the clothes of the seated passenger," the weight measurement result is corrected based on the measurement results of the capacitance sensors 42 mounted in the seat cushion XS2 in the application seat XS of the developed example. More specifically, since the measurement results of the capacitance sensors 42 vary depending on the clothing amount of the seated passenger, a correction amount is calculated according to the measurement results of the capacitance sensors 42, and the correction amount is added to the weight measurement result to obtain the actual weight.

In the method for calculating the correction amount, the correlation among the measurement results of the capacitance sensors 42 and the correction amount may be clearly defined by, e.g., experiments, and the measurement results of the capacitance sensors 42 may be substituted in its correlation equation to calculate the correction amount.

Next, for the third error factor E3, i.e., "the body width is not accurately measured due to the clothes of the seated passenger," the measurement result of the body width is corrected based on the measurement results of the capacitance sensors 42 mounted in the seat cushion XS2 in the application seat XS of the developed example. That is, as in weight correction described above, a correction amount is calculated according to the measurement results of the capacitance sensors 42, and the measurement result of the body width is corrected by the correction amount to obtain an actual body width.

In the method for calculating the correction amount, the correlation among the measurement results of the capacitance sensors 42 and the correction amount may be clearly defined by, e.g., experiments, and the measurement results of the capacitance sensors 42 may be substituted in its correlation equation to calculate the correction amount.

Next, for the fourth error factor E4, i.e., "the relationship among the body width, weight, and height of the seated passenger deviates from the relationship indicated by the correlation equation," the application seat XS of the developed example is configured such that the seated passenger oneself operates, after adjustment of the seat position etc., the not-shown switch to be able to re-adjust the seat position, etc. At this point, the controller 50 learns the amount of operation of the seated passenger, i.e., the amount of re-adjustment. Then, in subsequent adjustment, adjustment reflecting the operation amount (the re-adjustment amount) is performed.

The steps including learning the manual operation of the seated passenger and reflection of the learned operation in subsequent adjustment are also employed as the steps taken against the fifth error factor E5, i.e., "the relationship between the height and the build of the seated passenger deviates from the relationship indicated by the correlation equation for estimating the build from the height."

Next, for the sixth error factor E6, i.e., "the seating state of the seated passenger is different from a regular seating state," the seat position, etc., are adjusted considering the difference in the seating state in the application seat XS of the developed example. The "seating state" described herein indicates the position and posture of the seated passenger. Moreover, the state different from the regular seating state indicates, e.g., the state in which the passenger is seated slightly on the front side relative to a normal seating position, more specifically the state in which the buttocks of the seated passenger are positioned on the front side relative to normal positions and the back of the seated passenger inclines as compared to a normal state.

When the seating state is different from the regular seating state, the controller 50 detects such a state, and calculates the difference from the regular seating state. Specifically, the weight sensors are provided respectively at four positions of the application seat XS of the developed example on the front, rear, right, and left sides, and the controller 50 calculates the current position of the center of gravity of the seated passenger based on the measurement result of each weight sensor. a well-known calculation method may be employed as the method for calculating the position of the center of gravity.

When the seating state is different from the regular seating state, the position of the center of gravity of the seated passenger is also off of a normal position, and the controller 50 calculates the displacement between the calculated position of the center of gravity and the normal position of the center of gravity. Such a displacement of the position of the center of gravity corresponds to the difference in the seating state. The normal position of the center of gravity is obtained from data taken when the passenger is seated on the application seat XS in the regular seating state, and is stored in the controller 50 in advance.

In determination of each adjustment amount of the seat position etc., the controller 50 determines the adjustment amount considering the above-described displacement of the position of the center of gravity. Since the seat position, etc., are adjusted considering the displacement of the position of the center of gravity as described above, the seat position, etc., can be adjusted to the optimal seat position, etc., according to the seating state even if the passenger is seated on the application seat XS in the seating state different from the regular seating state.

As described above, since the predicted error factors are eliminated in the application seat XS of the developed example, occurrence of the errors observed in calculation of the adjustment amounts of the seat position, etc., can be suppressed.

Other Examples of Correction of Bones by Vehicle Seat

As in the application seat XS described above, the vehicle seat is applied to correct the posture of the seated passenger to correct the curving state of the bones of the seated passenger. That is, the vehicle seat includes the air cells, and the build of the seated passenger is determined to adjust expansion of the air cells, thereby actively correcting the seating posture of the seated passenger. In active correction of the curving state of the spine of the person (the seated passenger) targeted for correction, it is preferable to efficiently correct this curving state. In the seat configuration in which air cells are arranged respectively on the right and left sides with respect to the midline of a seated passenger as described in, e.g., Japanese Patent Document No. 2009-119230, modifications should be made in order to efficiently correct the curving state of the spine.

A vehicle seat (hereinafter referred to as a "bone correction seat YS") capable of efficiently correcting the curving state of the bones of the seated passenger will be described below. In the bone correction seat YS, the configuration of the vehicle seat, i.e., the configuration in which the movable shoulder support portions Sa1 are provided at the seat back S1, may be employed, but only the configuration of efficiently correcting the curving state of the bones of the seated passenger will be mainly described below. For such a reason, illustration in the views (specifically, FIG. 29 and the figures subsequent thereto) illustrating the bone correction seat YS is simplified to some extent, and devices other than the device for efficiently correcting the curving state of the bones of the seated passenger are not shown.

Configuration Example of Bone Correction Seat

Figure 29:
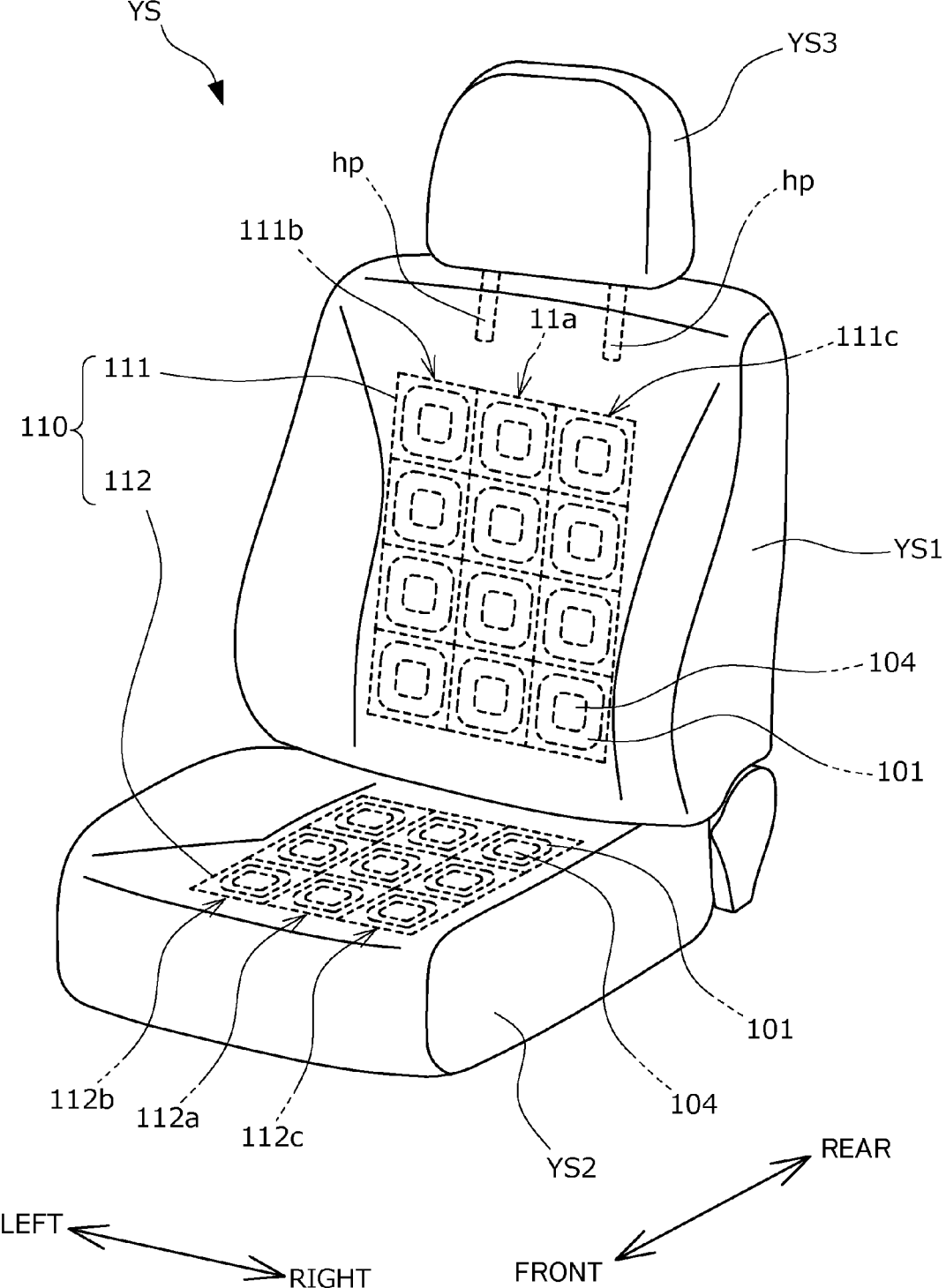
FIG. 29 is a perspective view illustrating a bone correction seat.
Figure 30:
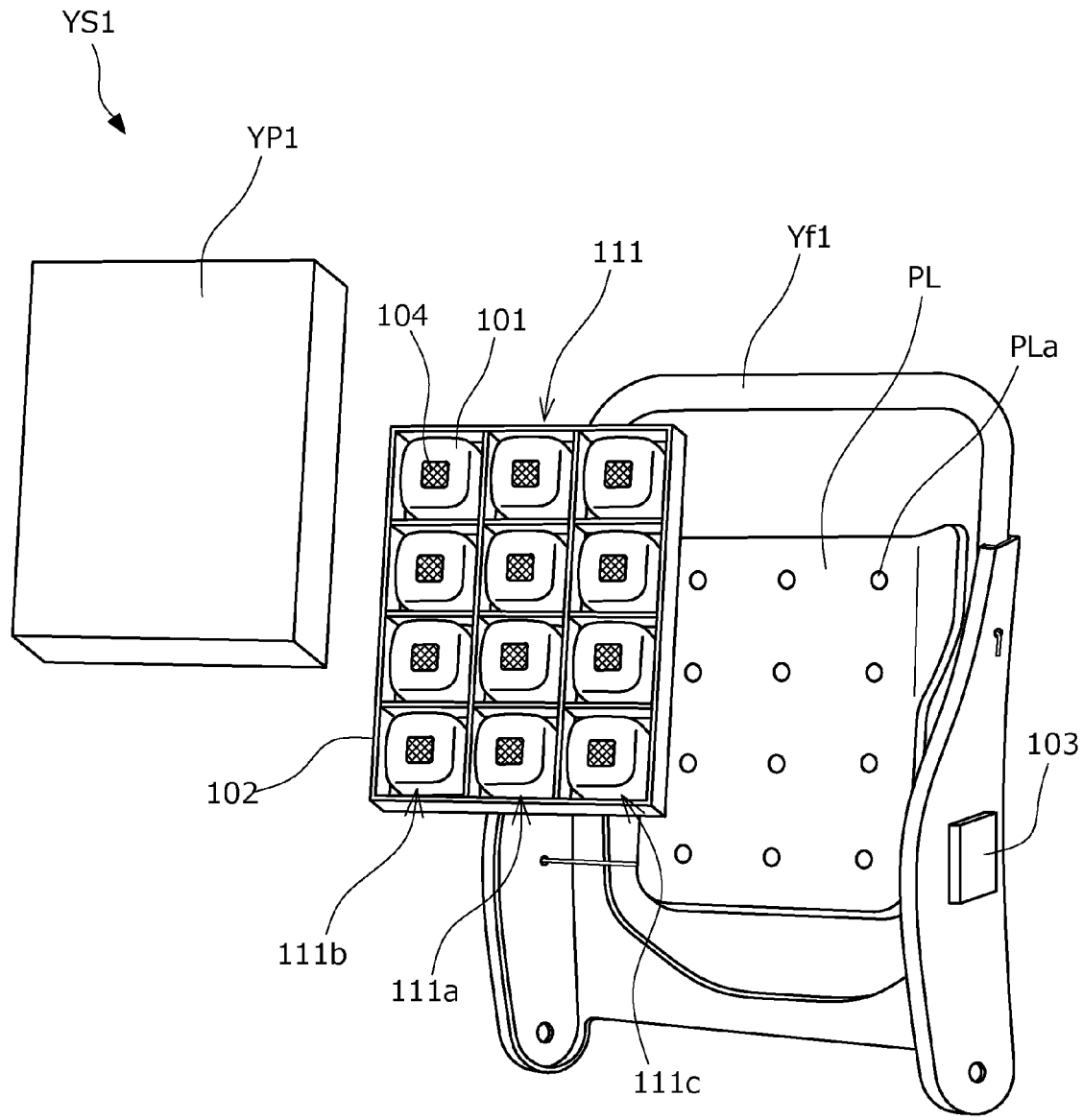
FIG. 30 is an exploded perspective view of a seat back of the bone correction seat.
Figure 31:
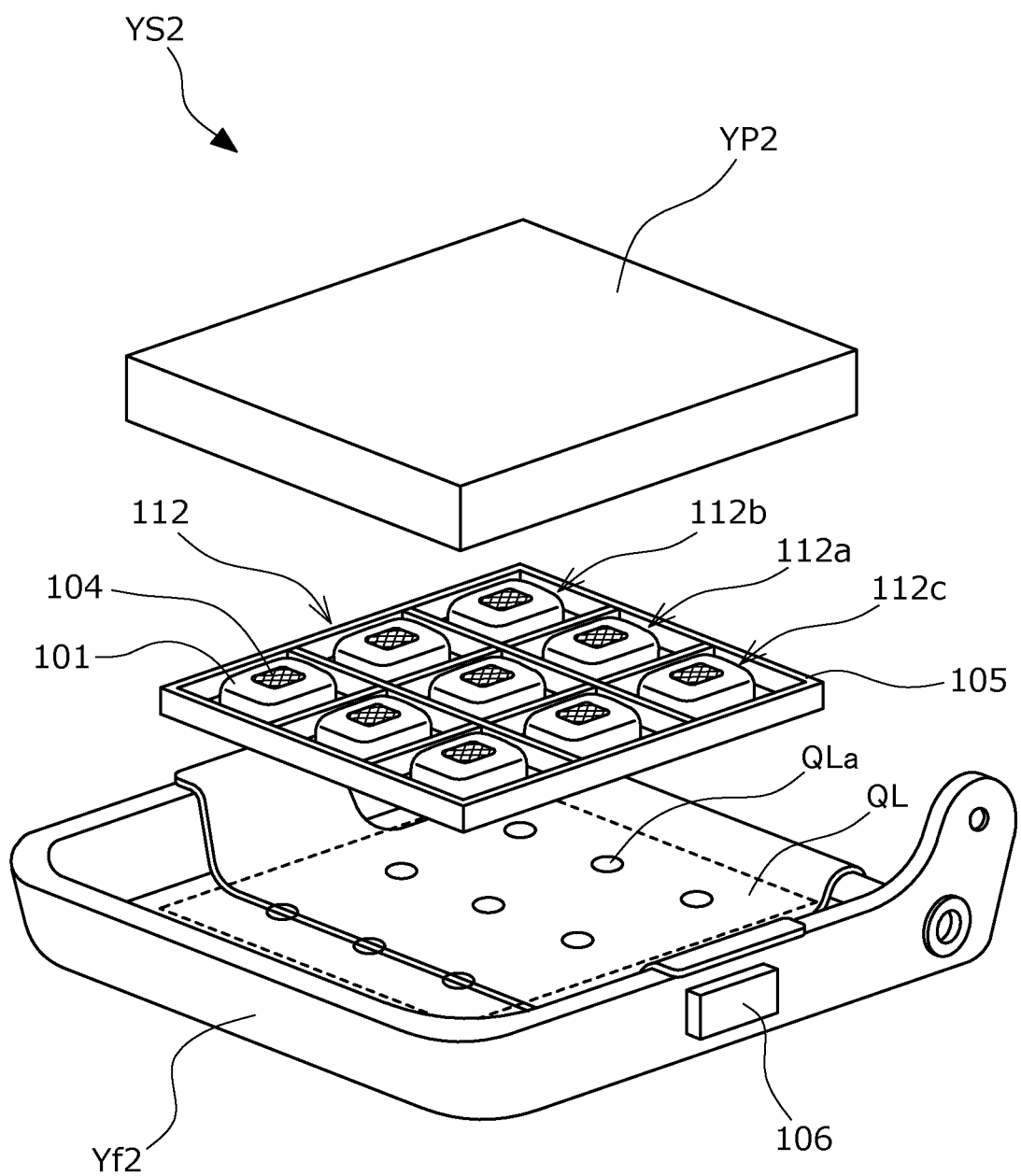
FIG. 31 is an exploded perspective view of a seat cushion of the bone correction seat.

First, a first embodiment will be described as a configuration example of the bone correction seat YS with reference to FIGS. 29 to 31. FIG. 29 is a view illustrating the bone correction seat YS, FIG. 30 is an exploded view of a seat back YS1 of the bone correction seat YS, and FIG. 31 is an exploded view of a seat cushion YS2 of the bone correction seat YS.

As illustrated in FIG. 29, a correction device 110 is mounted in the bone correction seat YS. The correction device 110 is configured to press the back of the passenger seated on the bone correction seat YS to actively correct the curving state of the bones of the seated passenger. The "curving state of the bones" is, as described above, the indicator for the three-dimensional bone structure. Specifically, the curvature of the arc-shaped bones in each region illustrated in FIG. 13 indicates the curving state.

The correction device 110 is divided into a back-side unit 111 configured to correct the curving state of the spine and a leg-side unit 112 configured to correct the curving state of the pelvis and the femoral regions. The back-side unit 111 corrects the curvature A of an upper portion of the vertebrae thoracicae, the curvature B of a lower portion of the vertebrae thoracicae, the curvature C of the vertebrae lumbales, and the curvature D of the vertebrae sacrales. On the other hand, the leg-side unit 112 corrects the curvature E of the pelvis, the curvature F of the proximal end of the femur, and the curvature G of the distal end of the femur.

The back-side unit 111 is mounted in the seat back YS1. The back-side unit 111 includes, as illustrated in FIG. 30, a back-side pressing mechanism including a plurality of air cells 101, a holding frame 102 configured to hold each air cell 101, and an actuator 103 configured to adjust the expansion state of each air cell 101. The back-side pressing mechanism presses the back of the seated passenger, and is disposed between a support plate PL (equivalent to the pressure receiving plate 5 described above) and a back pad YP1 (equivalent to the pad material XP1 described above). The back-side pressing mechanism is divided into a first back-side pressing mechanism 111a configured to press a portion of the back where the spine is positioned, a second back-side pressing mechanism 111b configured to press a portion of the back positioned on the left side of the spine, and a third back-side pressing mechanism 111c configured to press a portion of the back positioned on the right side of the spine.

Each of the back-side pressing mechanisms 111a, 111b, 111c includes the air cells 101 arranged in a line along the spine. Each air cell 101 is in the form of a bag forming a pressing piece, and expands in such a manner that air as fluid is supplied into the air cell 101. Each of the air cells 101 arranged in a line are separated from each other in the direction along the spine. Thus, the air cells 101 expand when air is supplied into the air cells 101, thereby pressing different regions of the back of the seated passenger.

Specifically, each of back-side pressing mechanism 111a, 111b, 111c includes four air cells 101, and each air cell 101 is disposed corresponding to the region targeted for curvature correction by the back-side unit 111. More clearly, the uppermost air cells 101 are disposed corresponding to the position of the upper portion of the vertebrae thoracicae, the second uppermost air cells 101 are disposed corresponding to the position of the lower portion of the vertebrae thoracicae, the third uppermost air cells 101 are disposed corresponding to the position of the vertebrae lumbales, and the lowermost air cells 101 are disposed corresponding to the position of the vertebrae sacrales. The number of air cells 101 in each of back-side pressing mechanism 111a, 111b, 111c is not limited to four, and may be at least equal to or greater than two. For example, the same number of air cells 101 as the number of the bones forming the spine may be provided.

Each air cell 101 expands in such a manner that air is supplied into the air cell 101, thereby pushing the back pad YP1 positioned in the front of the air cell 101 to press the back of the seated passenger. This corrects the curvature in a corresponding region of the back of the seated passenger where the spine is positioned. In particular, since the first back-side pressing mechanism 111a configured to press the portion of the back where the spine is positioned is provided, distortion, etc., of the spine can be actively corrected, and therefore, the curving state of each portion of the spine can be efficiently corrected.

In the configuration illustrated in FIG. 30, the air cells 101 are arranged in the rear of the back pad YP1, but may be arranged in the front of the back pad YP1. In this case, the air cells 101 are pressed against the back of the seated passenger through a cover material, and therefore, responsiveness (response sensitivity) to pressing of the air cells 101 is improved. Alternatively, only air cells 101 may be arranged without the back pad YP1.

The holding frame 102 is a grid-shaped frame in which squares of four columns×three rows are formed, and separates the air cells 101 in the direction along spine and the right-to-left direction. Specifically, the inner space of the holding frame 102 is divided into housing spaces of four columns×three rows by grids. The "housing spaces" serve as hollow portions. The same number of housing spaces as that of the air cells 101 arranged in the direction along the spine and the right-to-left direction are formed, and each air cell 101 is housed in a corresponding one of the housing spaces.

Use of the holding frame 102 as described above facilitates separate arrangement of the air cells 101 in the direction along the spine and the right-to-left direction, as well as reducing displacement of the positions of the air cells 101. Reduction in position displacement of the air cells 101 allows each air cell 101 to properly, i.e., without position displacement, press a corresponding region of the back of the seated passenger.

The actuator 103 is a switching portion configured to adjust the expansion state of each air cell 101 to switch the pressing state of each of the back-side pressing mechanisms 111a, 111b, 111c. Specifically, the actuator 103 is connected to each air cell 101 via a not-shown tube passing through a tube hole PLa formed at the support plate PL, and is configured to supply air into each air cell 101 and to suck air from each air cell 101. This switches the pressing state when each of the back-side pressing mechanisms 111a, 111b, 111c presses the back of the seated passenger. The "pressing state" described herein is a concept encompassing a pressing direction, a portion to be pressed, the magnitude of pressing force, etc., in the configuration illustrated in FIG. 30, the actuator 103 is attached to a predetermined position of a seat back frame Yf1, such as an outer surface of a side frame.

Moreover, the actuator 103 is capable of adjusting, separately for four air cells 101, the expansion state of the air cells 101 forming each of the back-side pressing mechanisms 111a, 111b, 111c. In other words, the actuator 103 switches, separately for the air cells 101, the pressing state when each air cell 101 of the first back-side pressing mechanism 111a presses a corresponding region of the back where the spine is positioned. Further, the actuator 103 switches, separately for the air cells 101, the pressing state when each air cell 101 of the second back-side pressing mechanism 111b and the third back-side pressing mechanism 111c presses a corresponding region of the back adjacent to the spine. Since the pressing state when each region of the back of the seated passenger is pressed is adjusted separately for the air cells 101 as described above, the curvature of each portion of the spine can be more precisely corrected.

Supply and suction of air by the actuator 103 is automatically controlled by an electronic control unit (hereinafter referred to as an "ECU 109") described later. More specifically, a meter configured to measure the index value on the bones of the seated passenger when the passenger is seated on the bone correction seat YS is mounted in the bone correction seat YS. The "index value on the bones" described herein is the value changing according to the curving state of the bones of the seated passenger, specifically the curvature of each portion of the spine. More specifically, as illustrated in FIG. 30, a pressure sensor 104 as the meter is attached to a surface of each air cell 101 positioned on the back side of the seated passenger. The pressure sensor 104 is configured to measure a seating pressure which is an example of the above-described index value. The measurement results of the pressure sensors 104 are transmitted to the ECU 109, and the ECU 109 specifies the curvature of each portion of the spine of the person seated on the bone correction seat YS based on the measurement results of the pressure sensors 104.

After the curvature of each portion of the spine of the seated passenger is specified, the ECU 109 controls the actuator 103 after determining whether or not the curvature of each portion of the spine needs to be corrected. Accordingly, the expansion state of the air cell 101 corresponding to the region targeted for curvature correction is adjusted. control of the actuator 103 by the ECU 109 will be described in detail later.

As described above, in the bone correction seat YS, the index value on the bones is measured when the passenger is seated on the bone correction seat YS, and the curvature of each portion of the spine is corrected based on the measurement result. Consequently, the portion of the back of the seated passenger where the spine is positioned can be pressed in a proper pressing state according to the curvature of each portion of the spine at the moment of curvature measurement.

The meter configured to measure the index value on the bones is not limited to the pressure sensor 104, and other meters may be employed as long as the index value on the bones can be measured. For example, a shape sensor configured to measure the curvature of each portion of the bones may be used.

In the bone correction seat YS, when a collision load is applied from the rear of the vehicle with the passenger being seated on the bone correction seat YS, the actuator 103 sucks air from all of the air cells 101 at once. More specifically, the actuator 103 is controlled when the above-described ECU 109 detects that the collision load from the rear acts on the vehicle, and then, air is sucked from each air cell 101. As a result, the body of the person targeted for bone correction sinks backward of the bone correction seat YS when the load from the rear is applied to the vehicle, and therefore, safety of the seated passenger in rear-end collision can be ensured.

In addition to the above-described configuration in which the actuator 103 sucks air from each air cell 101 with detection of application of the collision load from the rear of the vehicle by the ECU 109 as a trigger, the configuration may be employed, in which air is mechanically sucked from each air cell 101 when the collision load is applied from the rear of the vehicle.

The leg-side unit 112 is provided at the seat cushion YS2, and has the substantially same basic configuration as that of the back-side unit 111. That is, the leg-side unit 112 includes, as illustrated in FIG. 31, a leg-side pressing mechanism including a plurality of air cells 101, a holding frame 105 configured to hold each air cell 101, and an actuator 106 configured to adjust the expansion state of each air cell 101.

The leg-side pressing mechanism is configured to press the back of the seated passenger, particularly the buttocks and femoral regions of the seated passenger, and is disposed between a support plate QL and a cushion pad YP2. Moreover, the leg-side pressing mechanism is divided into a first leg-side pressing mechanism 112a configured to press portions of the buttocks and femoral regions where the spine is positioned, a second leg-side pressing mechanism 112b configured to press portions of the buttocks and femoral regions positioned on the left side of the spine, and a third leg-side pressing mechanism 112c configured to press portions of the buttocks and femoral regions positioned on the right side of the spine. Of the buttocks and the femoral regions, the portions where the spine is positioned are the portions where the midline of the seated passenger passes, and the portions positioned on the left (right) side of the spine are the portions at the same position as that of the left (right) os ischii in the right-to-left direction.

Each of the leg-side pressing mechanisms 112a, 112b, 112c includes three air cells 101 arranged in a line along the spine. Each air cell 101 is disposed corresponding to a region targeted for curvature correction by the leg-side unit 112. More clearly, the rearmost air cells 101 are arranged corresponding to the position of the pelvis, the second rearmost air cells 101 are arranged corresponding to the positions of proximal-end portions of the femurs, and the foremost air cells 101 are arranged corresponding to the positions of distal-end portions of the femurs. the number of air cells 101 in each of the leg-side pressing mechanisms 112a, 112b, 112c is not limited to three, and may be at least equal to or greater than two.

Each air cell 101 expands in such a manner that air is supplied into the air cell 101, thereby pushing the cushion pad YP2 positioned above the air cells 101 to press the buttocks and femoral regions of the seated passenger. This corrects the curvature in a corresponding region of the back of the seated passenger where the spine is positioned. In particular, the second and third leg-side pressing mechanisms 112b, 112c are provided, which are configured to press a center region (the region where the os ischii is positioned, and to be exact, the region extending from the top portion of the os ischii to each femur) of each of the right and left side portions of the pelvis. Thus, distortion, etc., of the pelvis can be actively corrected, and therefore, the curving state of the pelvis can be efficiently corrected.

The holding frame 105 is a grid-shaped frame in which squares of three columns×three rows are formed. The configuration and function of the holding frame 105 are similar to those of the holding frame 102 provided at the back-side unit 111, and therefore, the description thereof will not be repeated.

The actuator 106 is a switching portion configured to adjust the expansion state of each air cell 101 to switch the pressing state of each of the leg-side pressing mechanisms 112a, 112b, 112c. In the configuration illustrated in FIG. 31, the actuator 106 is attached to a predetermined position of a cushion frame Yf2, such as an outer surface of a side frame. The configuration and operation of the actuator 106 are similar to those of the actuator 103 provided at the back-side unit 111.

Moreover, the actuator 106 is capable of adjusting, separately for three air cells 101, the expansion state of the air cells 101 forming each of the leg-side pressing mechanisms 112a, 112b, 112c. More specifically, the actuator 106 supplies and sucks, separately for the air cells 101, air via tubes connected respectively to the air cells 101 through tube holes QLa formed at the support plate QL.

A pressure sensor 104 as the meter is attached to a surface of each air cell 101 positioned on the back side of the seated passenger. When the passenger is seated on the bone correction seat YS, the pressure sensors 104 attached respectively to the air cells 101 measure a seating pressure, and the measurement results are transmitted to the above-described ECU 109. The ECU 109 specifies the curvature of each portion of the pelvis and femurs of the passenger seated on the bone correction seat YS based on the measurement results of the pressure sensors 104. Subsequently, the ECU 109 controls the actuator 106 after determining whether or not, in the pelvis or the femurs, there is a region for which the curvature should be corrected. This adjusts the expansion state of the air cell 101 corresponding to the region targeted for curvature correction. Control of the actuator 106 by the ECU 109 will be described in detail later.

Modifications of Configuration of Bone Correction Seat

Next, modifications (first to third modifications) of the configuration of the bone correction seat YS will be described. the configuration of each modification identical to the configuration of the bone correction seat YS described above will not be described.

1) First Modification

Figure 32:
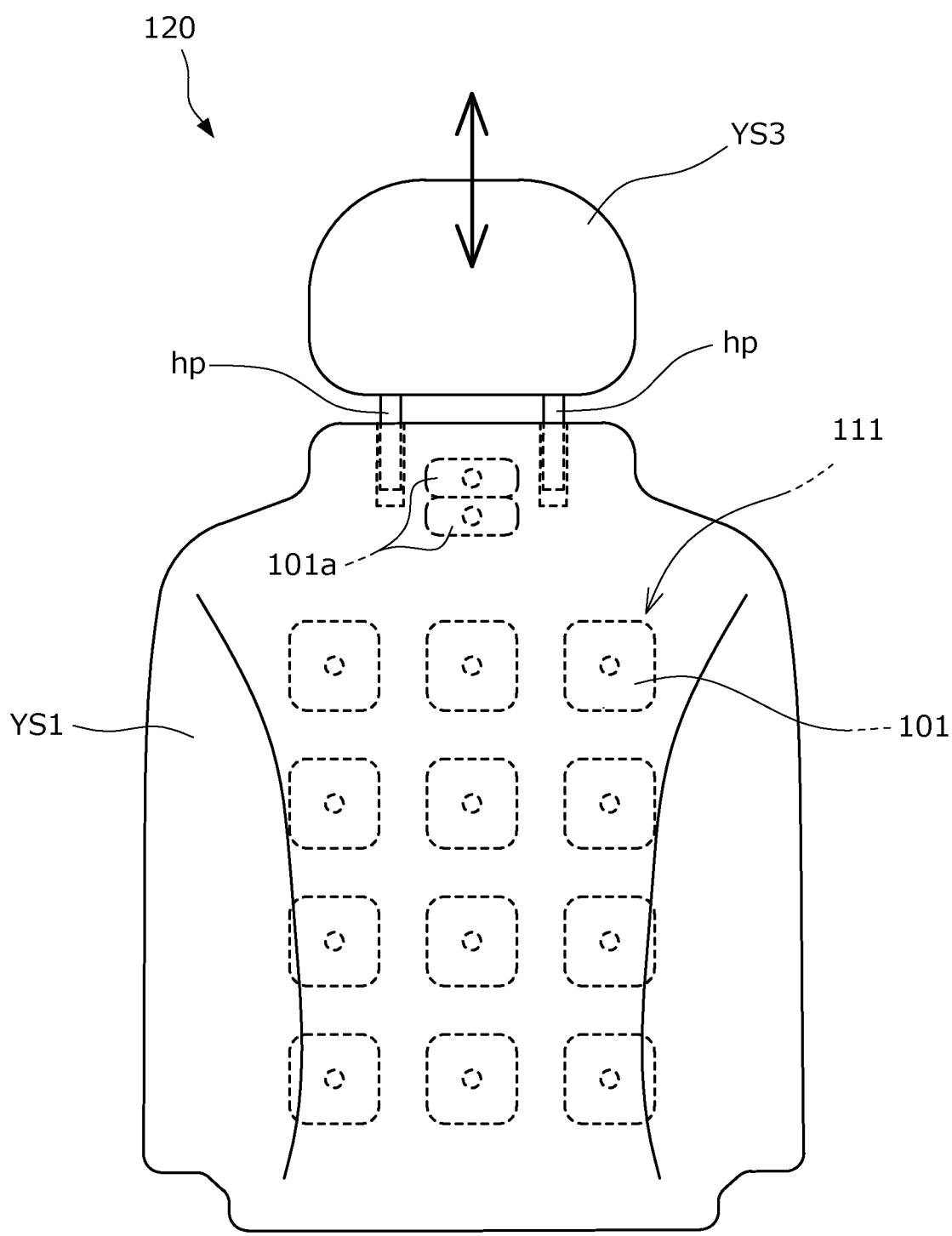
FIG. 32 is a front view illustrating a bone correction seat of the first modification.
Figure 33:
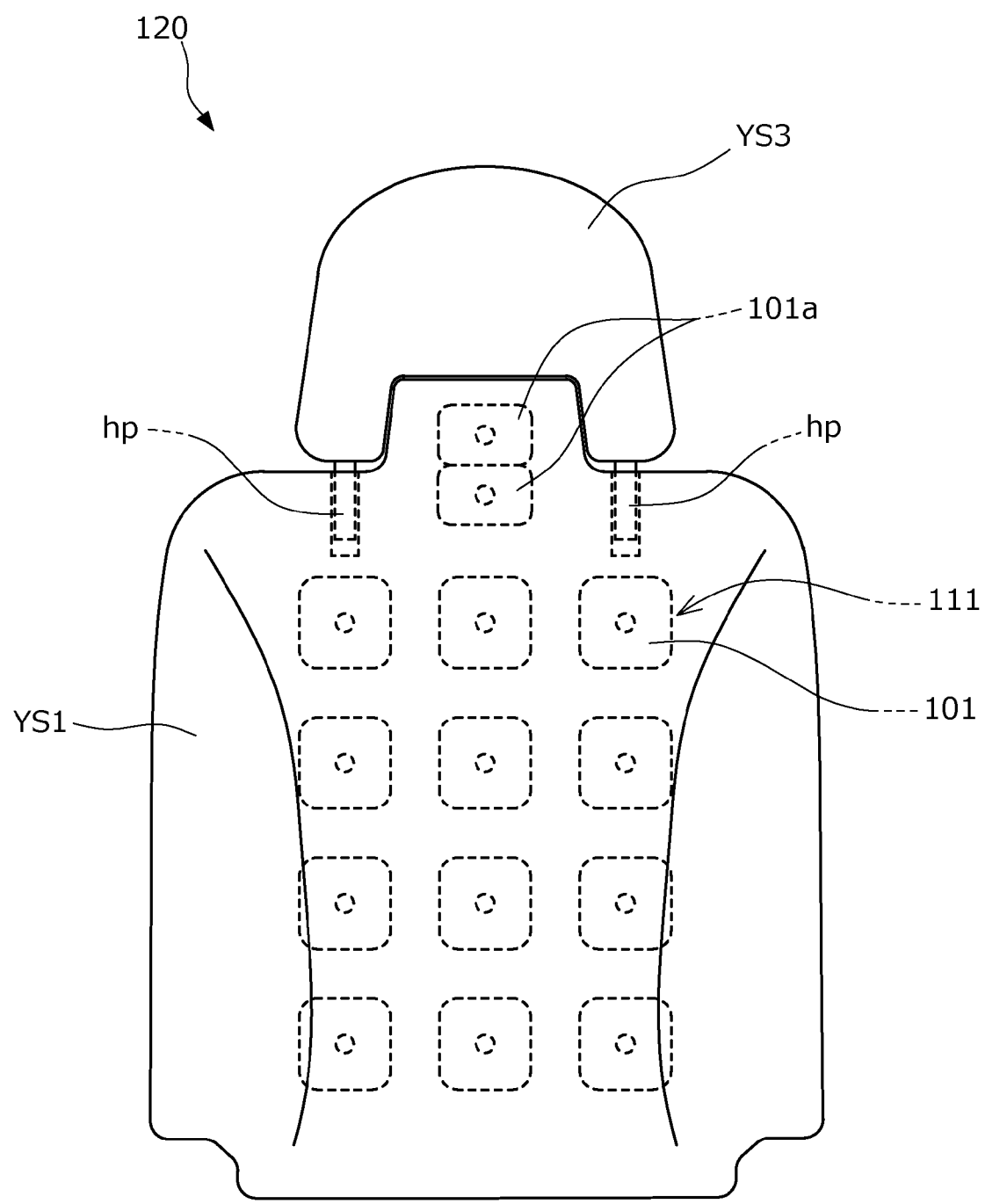
FIG. 33 is a (first) front view illustrating a variation of the bone correction seat of the first modification.
Figure 34:
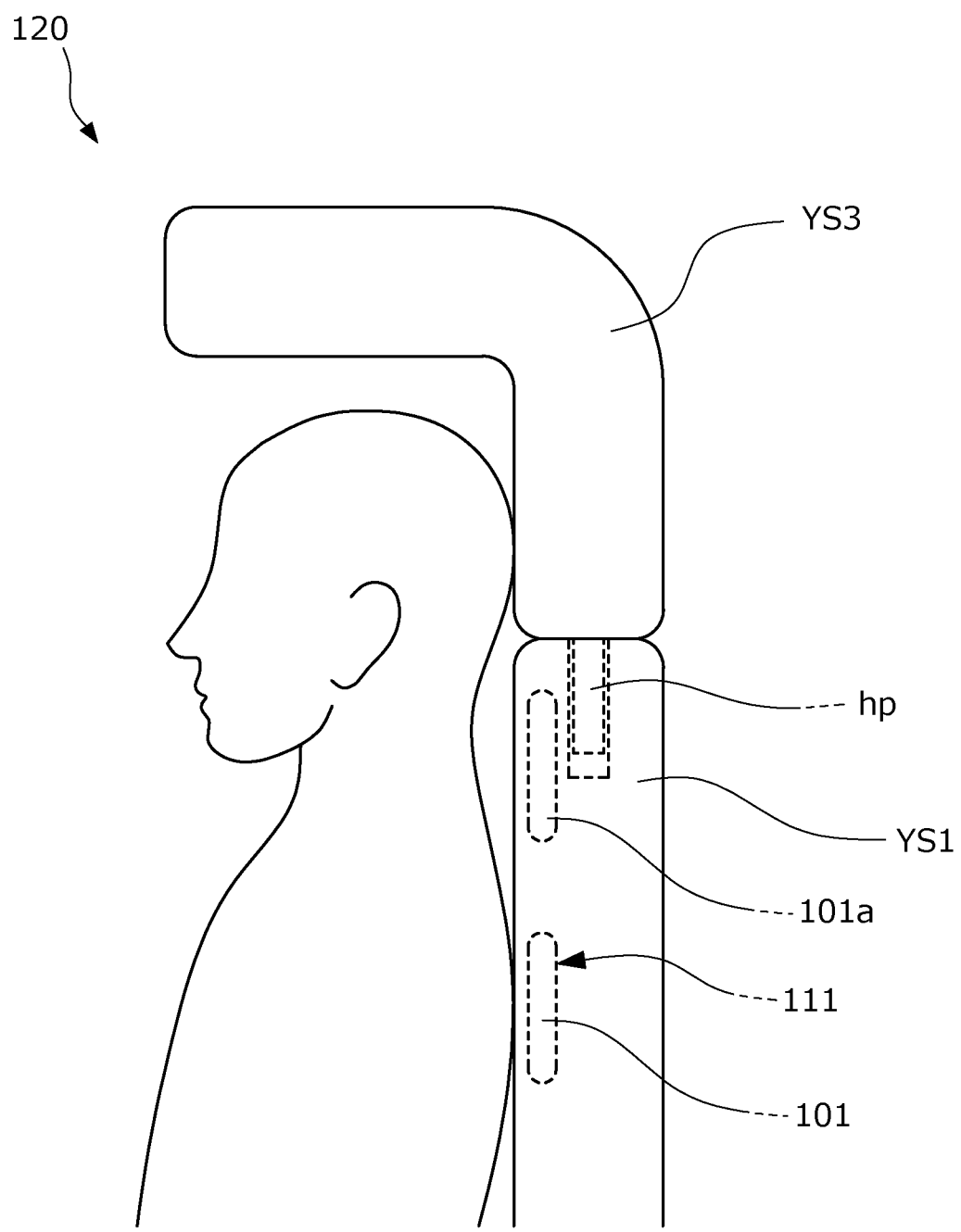
FIG. 34 is a (second) side view illustrating another variation of the bone correction seat of the first modification.

The first modification will be described with reference to FIGS. 32 to 34. FIG. 32 is a view illustrating the bone correction seat YS of the first modification, and FIGS. 33 and 34 are views illustrating variations of the bone correction seat YS of the first modification.

A correction device 120 of the first modification is different from the above-described device in the configuration of the first back-side pressing mechanism 111a. Specifically, as illustrated in FIG. 32, the air cells 101 are arranged corresponding to the positions of the upper and lower portions of the vertebrae thoracicae, the vertebrae lumbales, and the vertebrae sacrales, as well as being arranged corresponding to the position of the vertebrae cervicales. That is, in the first modification, at least one of the air cells 101 forming the first back-side pressing mechanism 111a presses the region where the vertebrae cervicales are positioned, this region being included in the portion of the back of the seated passenger where the spine is positioned.

More specifically, as illustrated in FIG. 32, the following air cells are provided: an air cell 101a configured to press the region where an upper portion of the vertebrae cervicales is positioned; and another air cell 101a configured to press the region where a lower portion of the vertebrae cervicales is positioned. The air cells 101a configured to press the region where the vertebrae cervicales are positioned expand when a collision load acts from the rear of the vehicle. Specifically, the actuator 103 is controlled when the ECU 109 detects that the collision load from the rear acts on the vehicle, and then, air is supplied into the air cells 101a to expand the air cells 101a. As a result, when the body (to be exact, the upper body) of the seated passenger inclines backward due to the collision load from the rear, the vertebrae cervicales of the passenger can be protected.

The air cells 101a configured to press the region where the vertebrae cervicales are positioned are arranged between a pair of head rest pillars hp as illustrated in FIG. 32. Thus, the air cells 101a configured to press the region where the vertebrae cervicales are positioned are arranged so that the space between the head rest pillars hp can be effectively utilized, and therefore, an increase in the size of the bone correction seat YS can be reduced. in arrangement of the air cells 101a configured to press the region where the vertebrae cervicales are positioned, an upwardly-protruding upper middle portion of the seat back YS1 may be, as illustrated in FIG. 32, used to ensure the arrangement space of the air cells 101a described above.

The shape of a head rest YS3 is not limited to the shape illustrated in FIG. 32, i.e., the substantially rectangular shape as viewed from the front. The shape of the head rest YS3 may be an inverted U-shape as viewed from the front as illustrated in FIG. 33. Alternatively, as illustrated in FIG. 34, the head rest YS3 may be substantially in an L-shape as viewed from the side, and may have a portion protruding over the head of the seated passenger. For example, in the configuration illustrated in FIG. 34, sensors such as the pressure sensors 104 are provided at the portion of the head rest YS3 protruding over the head of the seated passenger. Thus, the position of the head (to be exact, the vertex of the head) of the seated passenger can be more accurately measured, and correction can be more precisely made based on the measurement result.

2) Second Modification

Figure 35A:
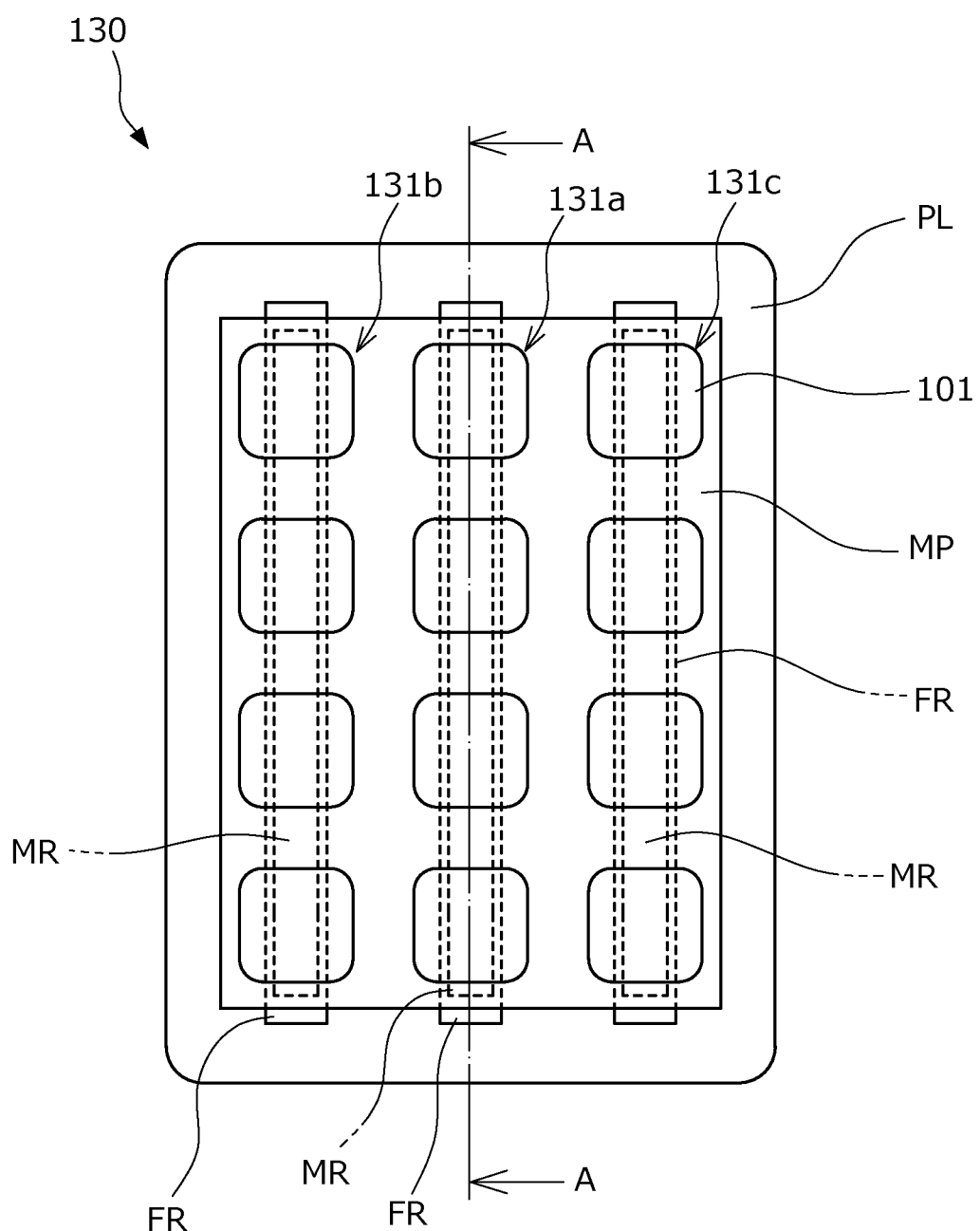
FIG. 35A is a front view illustrating a correction device of the second modification.
Figure 35B:
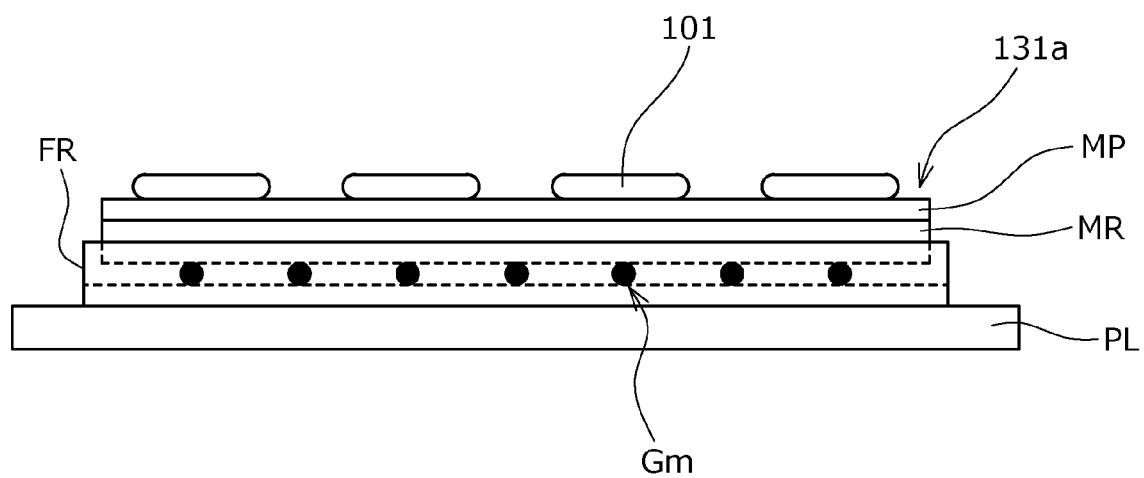
FIG. 35B is a cross-sectional view along an A-A line of FIG. 35A.

The second modification will be described with reference to FIGS. 35A and 35B. FIG. 35A is a view illustrating a correction device of the second modification, and FIG. 35B is a cross-sectional view along an A-A line of FIG. 35A. for the sake of simplicity of illustration, the pressure sensors 104 are not shown in FIGS. 35A and 35B.

A correction device 130 of the second modification includes back-side pressing mechanisms 131a, 131b, 131c having the same configuration as that of the above-described back-side pressing mechanisms 111a, 111b, 111c illustrated in FIG. 30. Moreover, in the second modification, as illustrated in FIGS. 35A and 35B, moving mechanisms each configured to move a corresponding one of the back-side pressing mechanisms 131a, 131b, 131c in the direction along the spine are provided.

Further, in the second modification, the air cells 101 forming each of the back-side pressing mechanisms 131a, 131b, 131c are fixed to a movable plate MP. A movable rail MR extending along the height direction of the seat back YS1 is attached to a rear surface of the movable plate MP. The movable rail MR is attached to move relative to a fixed rail FR fixed to a front surface of the support plate PL. In addition, drive portions Gm configured to operate to move the movable rail MR are provided between the movable rail MR and the fixed rail FR. The drive portions Gm are drive rollers controlled by the ECU 109 described above, and rotate to move the movable rail MR relative to the fixed rail FR.

When the ECU 109 starts the drive portions Gm to move the movable rails MR, the movable plate MP moves relative to the support plate PL. As a result, the relative positions of the back-side pressing mechanisms 131a, 131b, 131c in the bone correction seat YS change in the direction along the spine of the seated passenger. Such a configuration allows, in the correction device 130 of the second modification, the positions of the back-side pressing mechanisms 131a, 131b, 131c to change according to the build of the person seated on the bone correction seat YS. As a result, in the second modification, the curvature of each portion of the spine of the seated passenger can be corrected regardless of the height of the seated passenger.

In the configuration illustrated in FIGS. 35A and 35B, all of the back-side pressing mechanisms 131a, 131b, 131c are fixed to the single movable plate MP, but the movable plate MP is provided separately for the back-side pressing mechanisms 131a, 131b, 131c. According to such a configuration, the back-side pressing mechanisms 131a, 131b, 131c can be separately moved.

3) Third Modification

Figure 36:
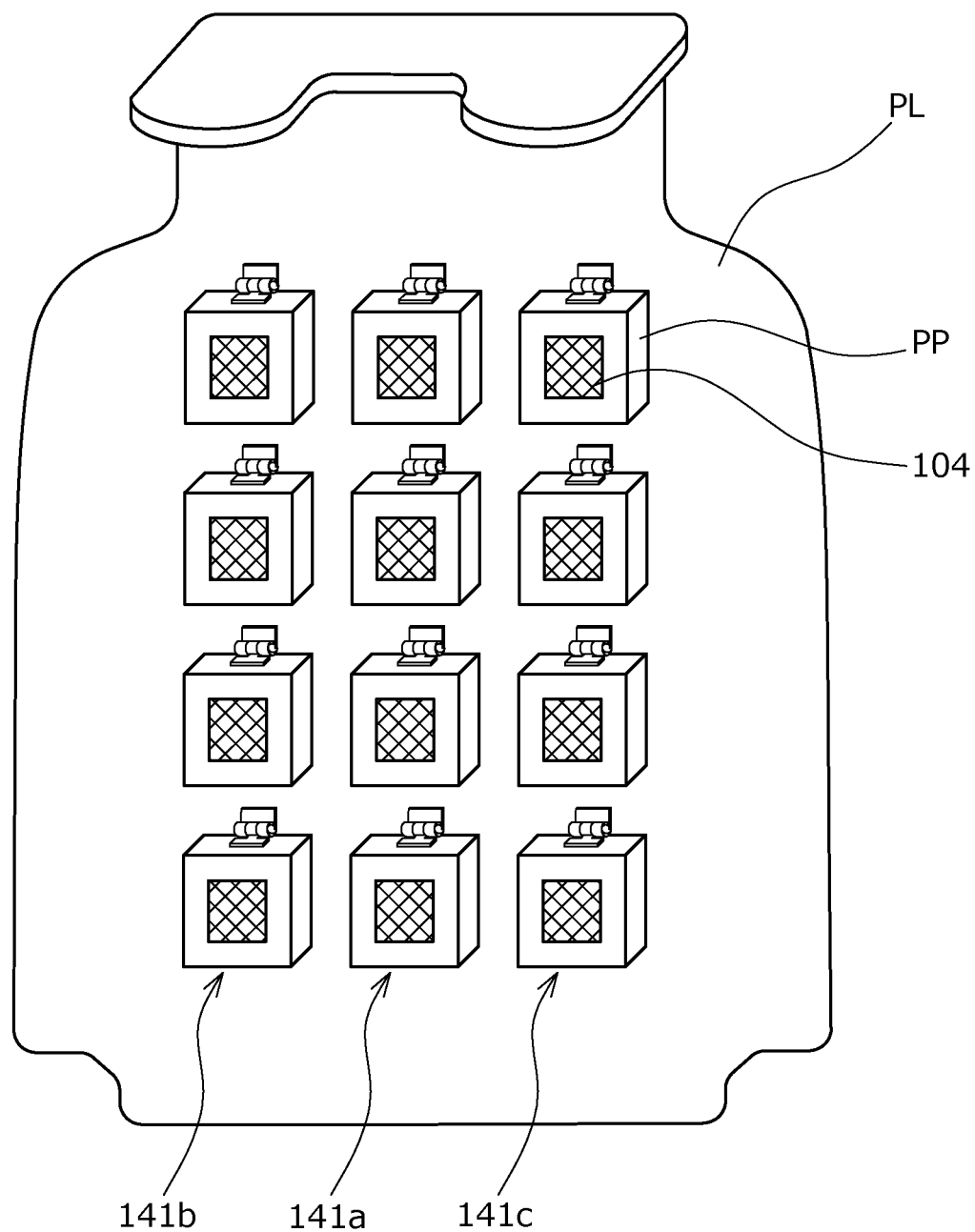
FIG. 36 is a perspective view illustrating a bone correction seat of a third modification.

The third modification will be described with reference to FIGS. 36 and 37. FIG. 36 is a view illustrating the bone correction seat YS of the third modification, and FIG. 37 is a schematic view illustrating operation of pad pieces PP in the bone correction seat YS of the third modification.

In the third modification, as illustrated in FIG. 36, not the air cells 101 but the pad pieces PP, i.e., pieces of the back pad YP1, are used as the mechanism configured to press the back of the seated passenger. More specifically, in a correction device 140 of the third modification, each of back-side pressing mechanisms 141a, 141b, 141c equivalent to the back-side pressing mechanisms 111a, 111b, 111c illustrated in FIG. 30 is formed of the pad pieces PP arranged in a line along the spine. These pad pieces PP are attached to the support plate PL, and are arranged at the same positions as the arrangement positions of the air cells 101 illustrated in FIG. 30.

Figure 37:
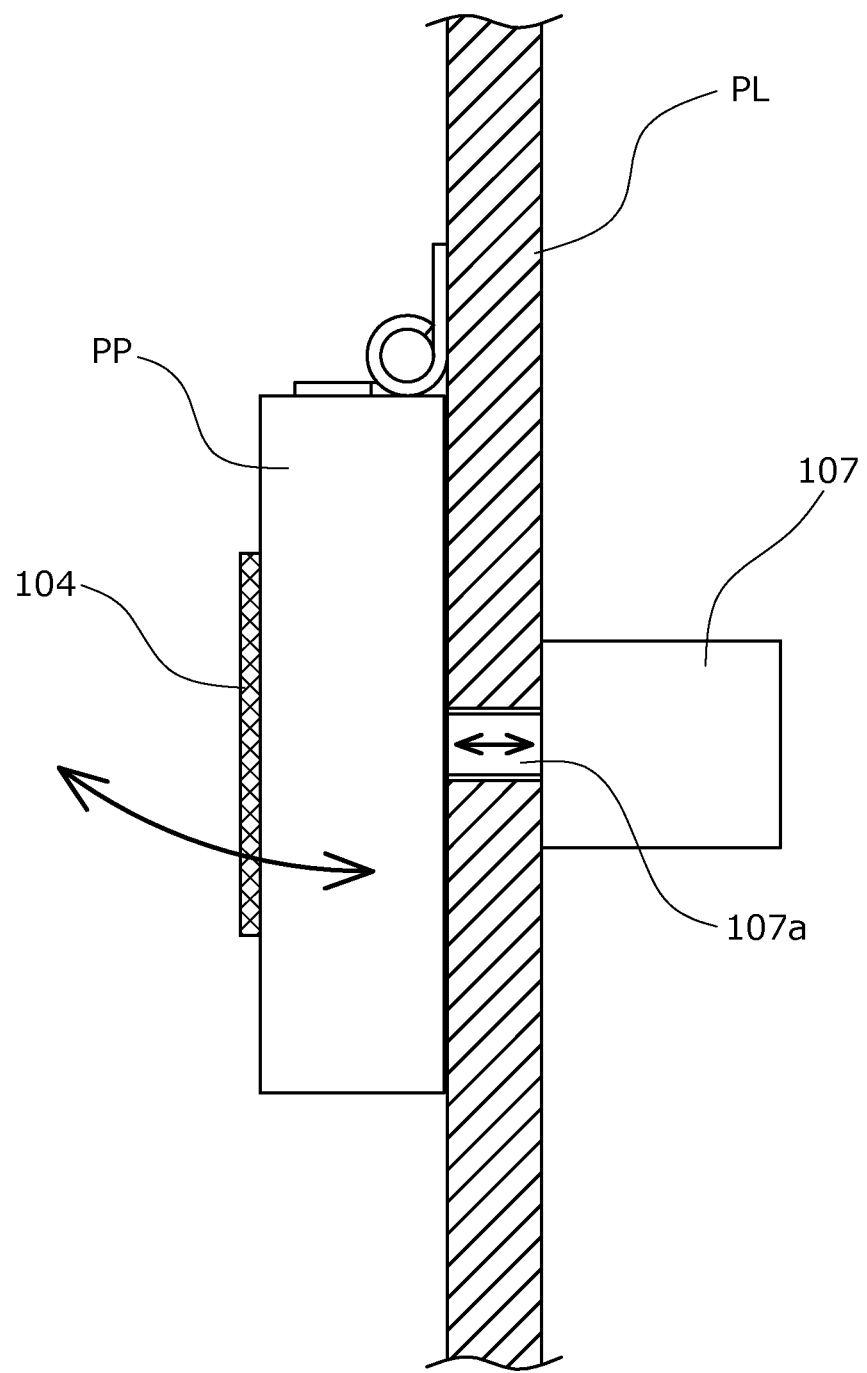
FIG. 37 is a schematic side view illustrating operation of pad pieces in the bone correction seat of the third modification.

Each pad piece PP can press, at a front surface thereof, the back of the seated passenger, and can swing back and forth as illustrated in FIG. 37. This swinging changes the position of the front surface, i.e., the pressing surface, of each pad piece PP in the front-to-back direction, thereby switching the pressing state when each pad piece PP presses the back of the seated passenger. swinging of each pad piece PP is, through the support plate PL, performed by an actuator 107 positioned in the rear of the pad piece PP. More specifically, the actuator 107 includes a rod 107*a* supported to move back and forth in the front-to-back direction, and contacts, at a tip end portion of the rod 107*a*, a rear surface of the pad piece PP. The actuator 107 moves the rod 107*a* back and forth to swing the pad piece PP.

In the third modification, the above-described actuator 107 is provided separately for the pad pieces PP. Thus, in the third modification, the pressing state when each pad piece PP presses the back of the seated passenger can be switched separately for the pad pieces PP.

The configuration of using the pad pieces PP instead of the air cells 101 is applicable not only to the seat back YS1 but also to the seat cushion YS2. That is, the pad pieces PP of the cushion pad YP2 may be arranged in the seat cushion YS2 instead of the air cells 101, and the above-described actuator 107 may be placed at a lower position of each pad piece PP.

Figure 38:
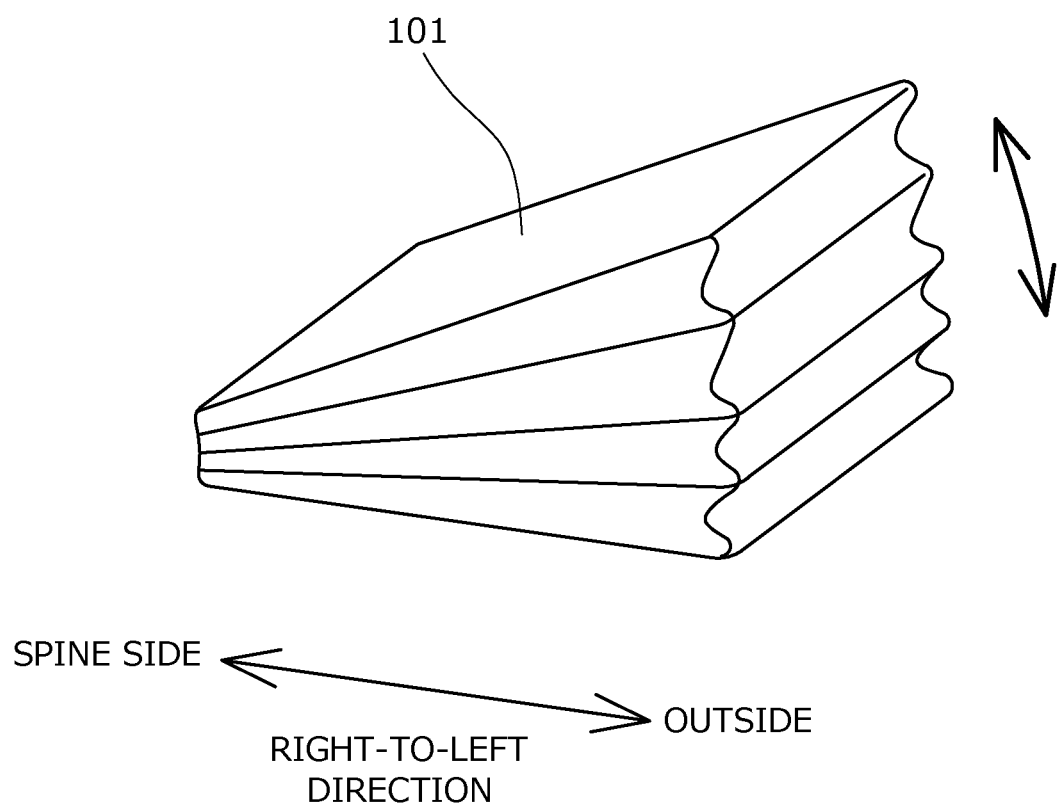
FIG. 38 is a perspective view of a (first) variation of a pressing piece.

Although the modifications of the configuration of the bone correction seat YS have been described so far, there are other modifications. For example, of the air cells 101 forming the back-side pressing mechanisms or the leg-side pressing mechanisms, the air cells 101 configured to press the portion where the spine is positioned and the air cells 101 configured to press the portions positioned next to the spine are not different from each other in the structure thereof in the above-described configuration (specifically, the configuration illustrated in FIG. 30). the air cells 101 configured to press the portion where the spine is positioned and the air cells 101 configured to press the portions positioned next to the spine may be different from each other in the structure thereof. When explanation is made using an example, the air cells 101 configured to press the portions positioned next to the spine may have, as illustrated in FIG. 38, the structure in which the degree of spreading (expansion) increases with a greater distance from the spine. When the air cells 101 having such a structure press the portions positioned next to the spine, the air cells 101 well fit the back of the seated passenger as compared to the case of using the general air cells 101 whose spreading degree is constant regardless of the distance from the spine.

Figure 39:
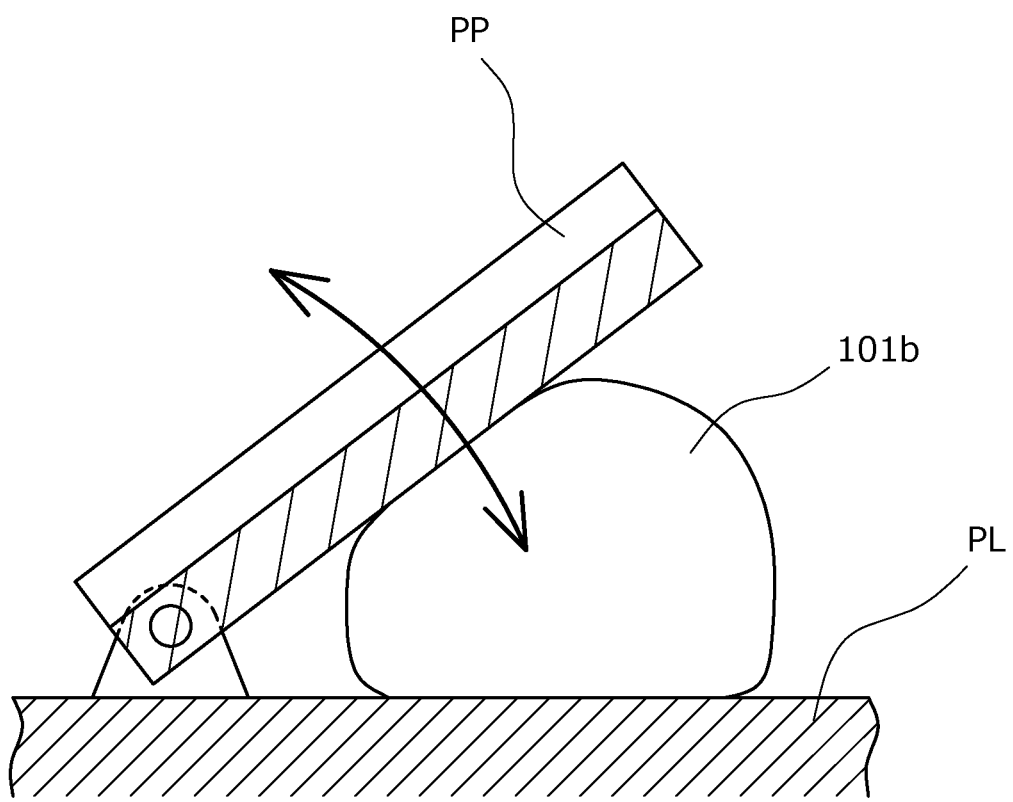
FIG. 39 is a side view of a (second) variation of the pressing piece.

In the configuration using the pad pieces PP described above, each pad piece PP configured to press the portion positioned next to the spine swings, as illustrated in FIG. 39, such that the front surface thereof moves toward the front, the rear, the right, and the left, thereby better fitting the back of the seated passenger. as illustrated in FIG. 39, an air cell 101*b* may be used as the mechanism configured to swing the pad piece PP as described above.

Control of Bone Correction

When the curving state of the spine is actively corrected, the curving state of the spine of the seated passenger usually needs to be detected. In this case, sufficient information required for correction of the curving state of the spine cannot be obtained by the configuration in which only displacement of the pelvis and the thorax is detected as in, e.g., a seat disclosed in Japanese Patent Document No. 2009-165588. As a result, the need for active correction of the curving state of the spine might not be satisfied.

On the other hand, in the bone correction seat YS, the curving state is detected for the spine of the seated passenger and the center regions of the right and left side portions of the pelvis, and control is performed to press the back of the seated passenger in the pressing state according to the detection results. As a result, the curving state of the spine and the curving state of the center region of each of the right and left portions of the pelvis are actively corrected, and therefore, the curving state of the bones of the seated passenger can be corrected to an ideal curving state.

Control of bone correction by the bone correction seat YS will be described below in detail. the explanation is made below with an example case where the air cells 101 form the pressing units (specifically, the back-side unit 111 and the leg-side unit 112) mounted in the bone correction seat YS. The configuration described below is also applicable to the case where each of the pressing units 111, 112 is formed of the pad pieces PP.

Figure 40:
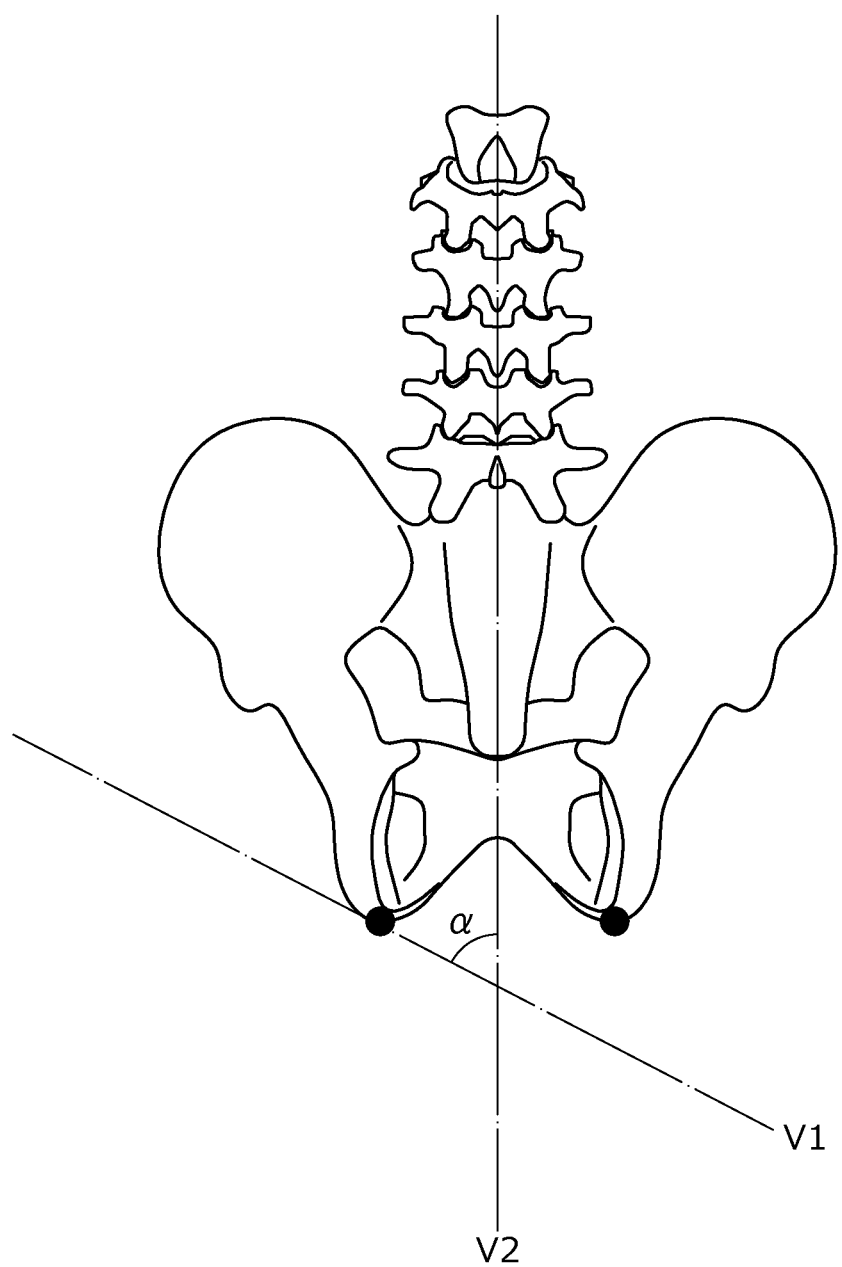
FIG. 40 is a front view illustrating a curving state of a center region of each of right and left side portions of the pelvis.

In bone correction by the bone correction seat YS, the curving state of the spine is corrected in such a manner that the back of the seated passenger is pressed, and the curving state of each center region of the right and left side portions of the pelvis, i.e., the curving state of the os ischii, is corrected in such a manner that the buttocks and femoral regions of the seated passenger are pressed. The "curving state of the spine" described herein is indicated by the curvatures A, B, C, D of the upper and lower portions of the vertebrae thoracicae, the vertebrae lumbales, and the vertebrae sacrales illustrated in FIG. 13. The "curving state of the os ischii" is indicated by an acute angle between a virtual plane V1 contacting the top portion of the os ischii and a virtual plane V2 passing the midline of the body, i.e., an angle $\alpha$ illustrated in FIG. 40. FIG. 40 is a view illustrating the curving state of each center region of the right and left side portions of the pelvis.

Figure 41:
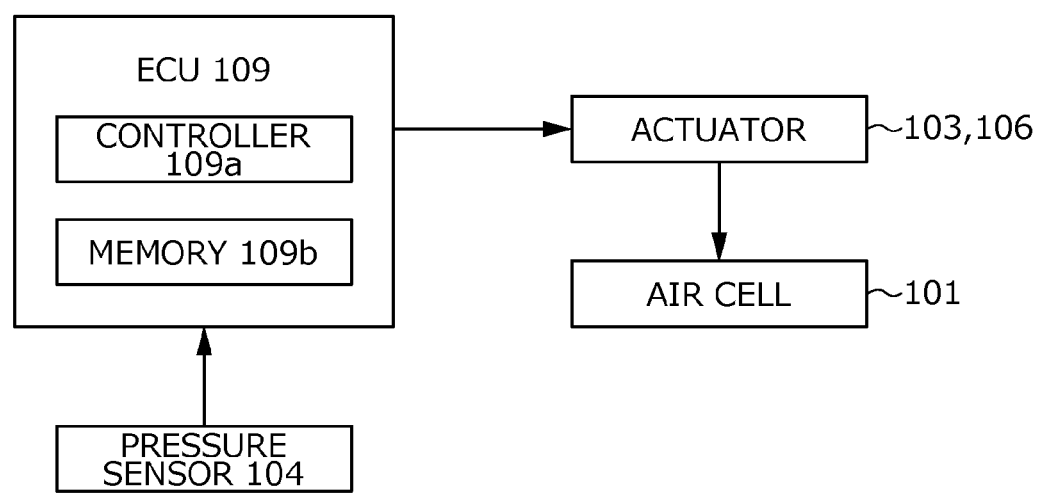
FIG. 41 is a block diagram showing a control system for bone correction.

Control of bone correction as described above is performed by the ECU 109 illustrated in FIG. 41. FIG. 41 is a block diagram illustrating the control system for bone correction.

The ECU 109 includes a controller 109*a* as a control section, and a memory 109*b* as a storage section. When a posture control process to be described later is performed, the ECU 109 controls the above-described actuators 103, 106. This changes the expansion state of each air cell 101, thereby adjusting the pressing state of each pressing unit (specifically, the back-side unit 111 and the leg-side unit 112).

Specifically, the controller 109*a* controls the pressing state of each pressing unit based on signals output from the pressure sensors 104 bonded respectively to the surfaces of the air cells 101. This control performs correction processing for correcting the curving state of the bones of the seated passenger. More specifically, the pressure sensors 104 bonded respectively to the surfaces of the air cells 101 forming the first back-side pressing mechanism 111*a* detect the curving state of the spine, and the controller 109*a* controls the actuator 103 based on the detection results. Accordingly, the pressing state of the back-side unit 111 is controlled, and as a result, the curving state of the spine of the seated passenger is corrected. Similarly, the pressure sensors 104 bonded respectively to the surfaces of the air cells 101 forming the second leg-side pressing mechanism 112*b* and the third leg-side pressing mechanism 112*c* detect the curving state of the os ischii, and the controller 109*a* controls the actuator 106 based on the detection results. Accordingly, the pressing state of the leg-side unit 112 is controlled, and as a result, the curving state of the os ischii of the seated passenger is corrected.

The memory 109*b* of the ECU 109 stores various types of information for the purpose of reference when the controller 109*a* performs the correction processing. Specifically, the memory 109*b* stores the following: the information (hereinafter referred to as "individual identification information") for identifying the seated passenger from the curving state of the bones indicated by the detection results of the pressure sensors 104; and a reference curving state used as a target value in the correction processing.

The individual identification information is the information for identifying an individual registered in advance as the passenger to be seated on the bone correction seat YS, and is stored in the memory 109b in advance. The controller 109a is capable of matching between the curving state of the bones indicated by the detection results of the pressure sensors 104 and the individual identification information to identify the person (individual) seated on the bone correction seat YS.

In order to perform the correction processing by the controller 109a, the reference curving state is stored in advance in the memory 109b. If plural passengers (individuals) are registered, plural reference curving states are set separately for the passengers as illustrated in FIG. 42. FIG. 42 is a table showing data on the reference curving states stored in the memory 109b.

When specific explanation is made on the reference curving state, an ideal curving state (hereinafter referred to as an "ideal curving state") is set as a default value. The "ideal curving state" is a curving state set based on, e.g., the gender, age, build, and bone density of the registered passenger. The reference curving state can be freely corrected according to a passenger's preference and the like, and the corrected curving state (hereinafter referred to as an "individual curving state") can be stored in the memory 109b as the reference curving state. For example, the individual curving state may be obtained when the passenger seated on the bone correction seat YS turns ON a not-shown switch, and at this point, may be stored in the memory 109b as the curving state of the bones of the seated passenger. Alternately, the curving state of the bones of the seated passenger may be measured after the lapse of a predetermined time since the passenger is seated on the bone correction seat YS, and this measurement result may be automatically stored in the memory 109b as the individual curving state. Either of the ideal curving state or the individual curving state may be stored as the reference curving state, or both of the ideal curving state and the individual curving state may be stored as the reference curving state.

When the bones are divided into a plurality of detection target regions and the curving state is detected for each detection target region, the reference curving states (indicated by "Xa1," "Xb1," "Xc1," etc., in FIG. 42) are set for each detection target region as shown in FIG. 42. The detection target region is a unit used in the detection of the curving state, and is also a unit used when the correction processing is performed by the controller 109a. for example, the detection target regions may be divided corresponding respectively to the air cells 101 as the components of each of the pressing units 111, 112. Alternatively, e.g., the upper portion of the back, the lower portion of the back, and a seating portion may be set in advance as the sections of the detection target regions. As another alternative, each of the back portion and the seating portion may be divided into a plurality of detection target regions.

In the case shown in FIG. 42, the bones are divided into three detection target regions (a region A, a region B, and a region C), but the number of detection target regions may be optionally set.

Figure 43:
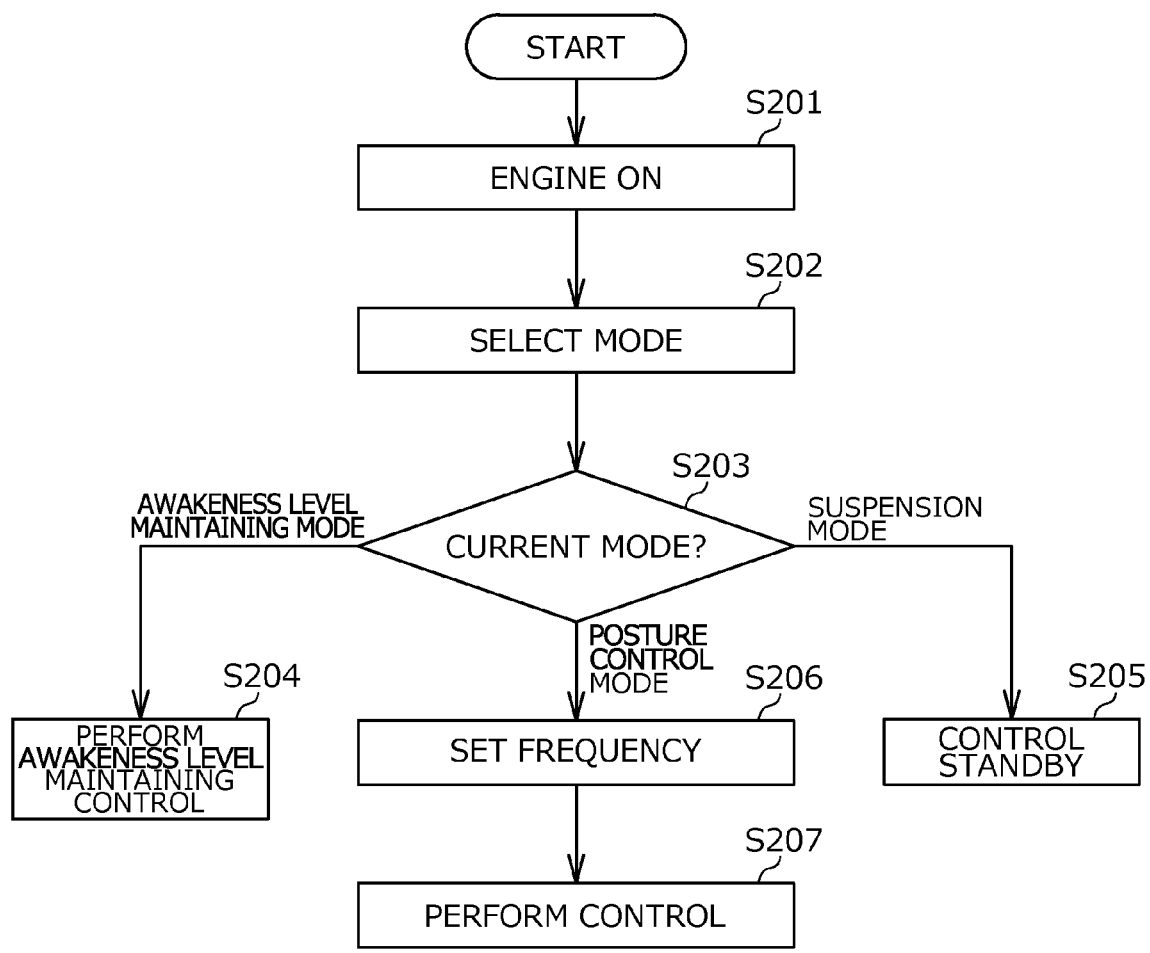
FIG. 43 is a flowchart showing a control flow in bone correction.
Figure 44:
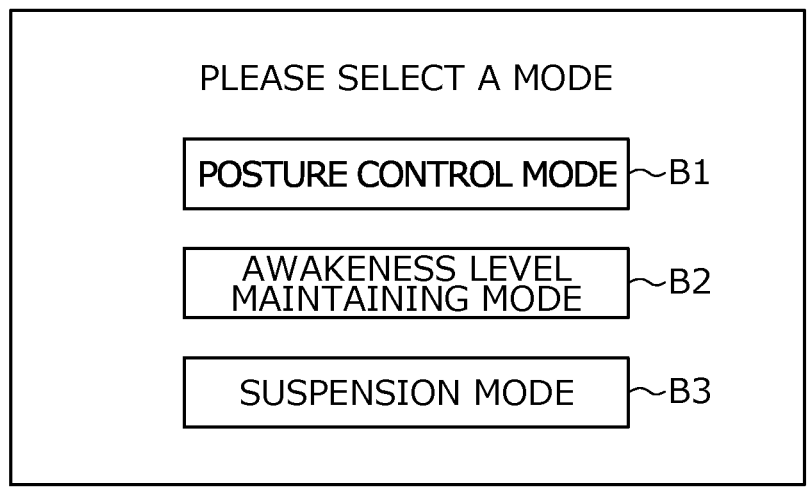
FIG. 44 is a display view illustrating an operation image in mode selection.
Figure 45:
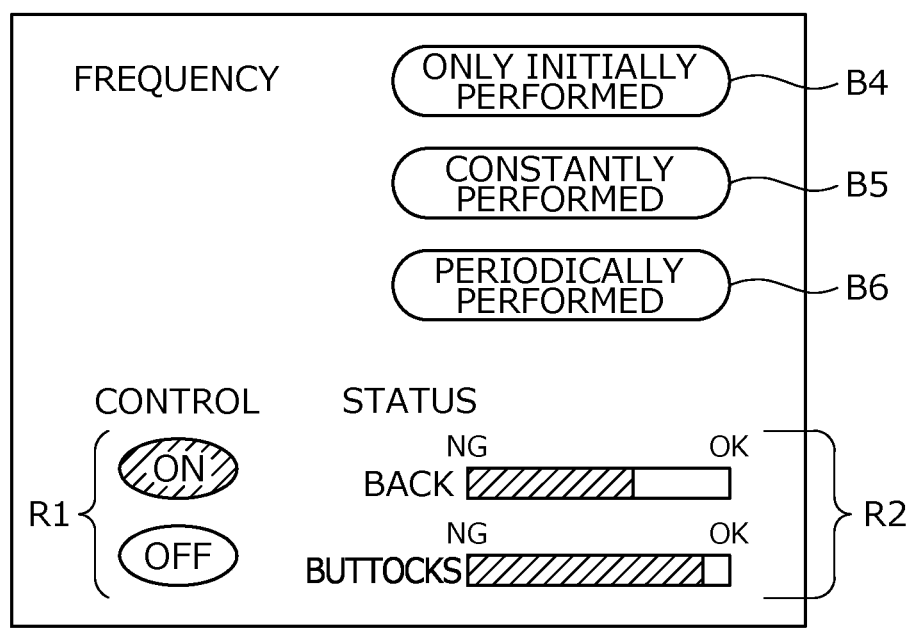
FIG. 45 is a display view illustrating an operation image when a posture control mode is selected.
Figure 46:
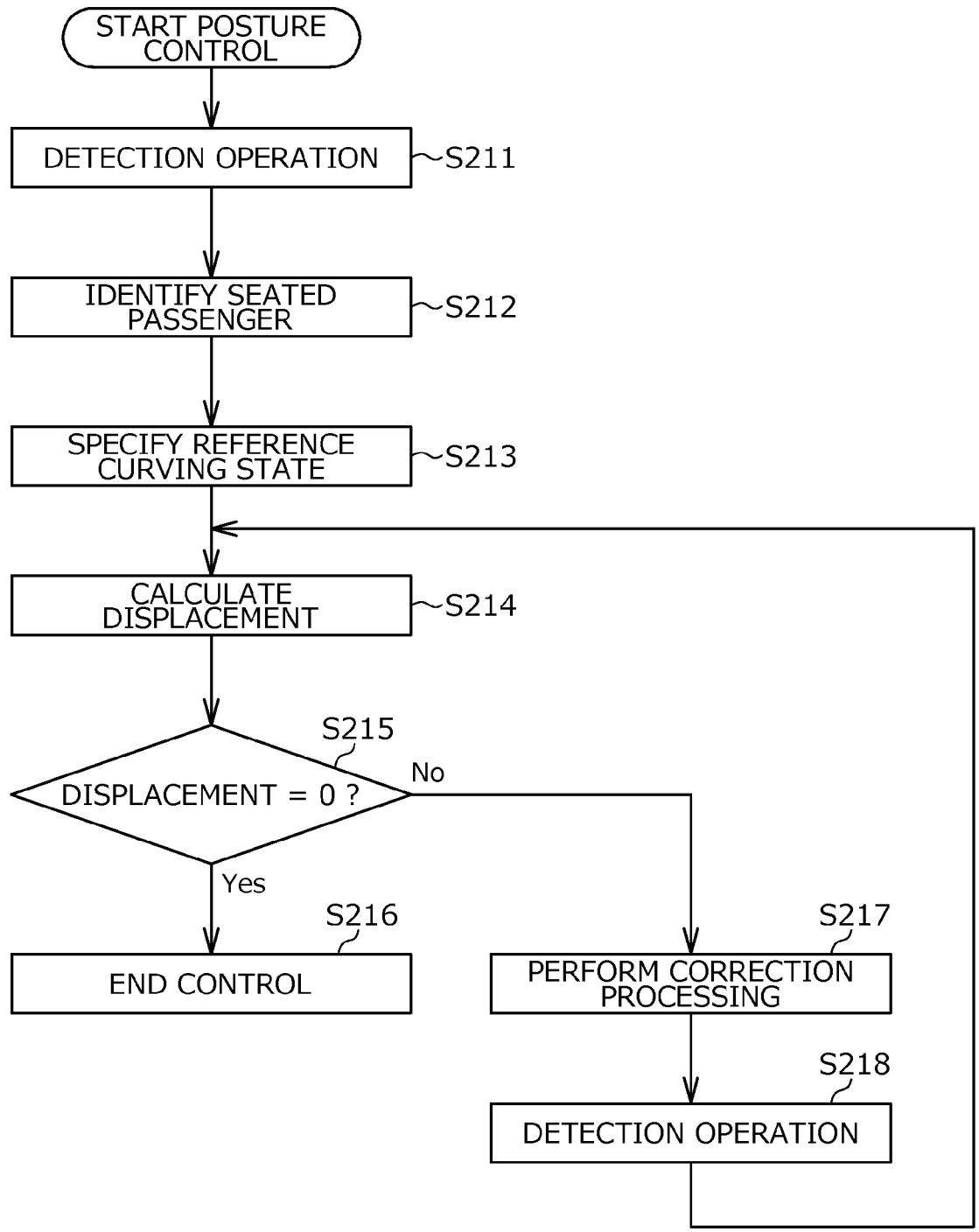
FIG. 46 is a flowchart showing a basic flow of a posture control process.

Next, an example of control of bone correction will be described with reference to FIGS. 43 to 46. FIG. 43 is a flowchart showing a control flow in bone correction, FIG. 44 is a view illustrating an operation image in mode selection, FIG. 45 is a view illustrating an operation image when a posture control mode is selected, and FIG. 46 is a flowchart showing a basic flow in a posture control process.

The control flow shown in FIG. 43 starts when an engine of the vehicle turns ON (S201). With the engine being turned ON, the ECU 109 starts to cause the passenger to select a control mode (S202). Three modes of an "awakeness level maintaining mode," the "posture control mode," and a "suspension mode" are provided as the control mode, and the passenger seated on the bone correction seat YS selects one of three control modes described above (S203). in mode selection, the operation image illustrated in FIG. 44 is displayed on an operation panel (not shown) placed inside the vehicle. The seated passenger presses, e.g., a mode selection button B1, B2, B3 displayed on the operation panel to specify the control mode.

When the "awakeness level maintaining mode" is selected as the control mode, awakeness level maintaining control is performed, which is for changing the pressing state of each of the pressing units 111, 112 to maintain the level of awakeness of the seated passenger (S204). In the awakeness level maintaining control, the controller 109a of the ECU 109 determines the level of awakeness of the seated passenger based on information (e.g., brain waves and the rate of respiration) from a not-shown measurement device configured to measure the level of awakeness. When the level of awakeness reaches a threshold, the controller 109a drives the actuators 103, 106 to change the pressing state of each of the pressing units 111, 112 such that the level of awakeness of the seated passenger is maintained at a certain level. when the awakeness level maintaining control is performed for the person seated on a driver's seat, the pressing state is changed to such an extent that driving is not disturbed.

When the "suspension mode" is selected as the control mode, the ECU 109 comes into a control suspension state (S205). That is, in the "suspension mode," the controller 109a does not drive the actuators 103, 106, and each of the pressing units 111, 112 also comes into the state of not pressing the back of the seated passenger.

When the "posture control mode" is selected as the control mode, posture control is performed, which is for changing the pressing state of each of the pressing units 111, 112 such that the seating posture of the seated passenger changes to a predetermined posture. That is, in the posture control mode, the controller 109a controls the actuators 103, 106 to cause each of the pressing units 111, 112 to press the back of the seated passenger, and as a result, the curving state of the bones of the seated passenger is corrected.

Moreover, when the "posture control mode" is selected, the frequency of performing the posture control is set (S206), and the posture control is performed with the set frequency (S207). Specifically, three types of "only initially performed," "periodically performed," and "constantly performed" are provided as the frequency of performing the posture control, and the seated passenger selects one of the above-described three types of frequency. When the "only initially performed" is selected, the posture control is performed only once right after the engine is turned ON. When the "periodically performed" is selected, the posture control is repeatedly performed at every lapse of a predetermined time. When the "constantly performed" is selected, the posture control is continuously performed after the engine is turned ON.

In frequency selection, the operation image illustrated in FIG. 45 is displayed on the above-described operation panel, and the seated passenger presses, e.g., frequency selection buttons B4, B5, B6 displayed on the operation panel to select the frequency of performing the posture control. As illustrated in FIG. 45, information R1 indicating whether or not the posture control is currently performed and information R2 indicating the current bone curving state to be corrected by the posture control are also displayed together with the above-described frequency selection buttons B4, B5, B6 in the operation image for frequency selection. With confirmation of the information R1, R2, the seated passenger can optionally switch the frequency of performing the posture control to the frequency suitable for the current situation.

A basic flow of the posture control process performed when the "posture control mode" is selected will be described below. The posture control process starts, as shown in FIG. 46, from a detection operation for detecting, by the pressure sensors 104, the curving state of the bones of the seated passenger (S211). In order to detect the curving state of the bones of the passenger seated on the bone correction seat YS in the detection operation, each pressure sensor 104 bonded to a corresponding one of the air cells 101 forming the pressing units 111, 112 detects a seating pressure in a corresponding portion of the bone correction seat YS, and outputs a signal to the ECU 109 according to the detection result.

In the ECU 109 having received the signal output from each pressure sensor 104, the controller 109a analyzes the signal to specify the curving state of the bones of the seated passenger. Afterwards, the controller 109a matches between the specified curving state of the bones and the individual identification information stored in the memory 109b to identify the seated passenger (S212). Subsequently, the controller 109a specifies, from a plurality of reference curving states stored in the memory 109b, the reference curving state corresponding to the seated passenger identified at the preceding step S212 (S213). Then, based on the curving state of the bones indicated by the detection results of the pressure sensors 104 and the specified reference curving state, the controller 109a calculates a displacement between these curving states (S214).

If the displacement is 0 ("Yes" at S215), the ECU 109 ends the posture control (S216). On the other hand, if the displacement is not 0 ("No" at S215), the controller 109a performs the correction processing (S217), and drives the actuators 103, 106 to control the pressing state of each of the pressing units 111, 112 by the above-described displacement. Thus, the curving state of each of the spine and os ischii of the seated passenger is corrected closer to the reference curving state. When the frequency of performing the posture control is set at the "periodically performed" or the "constantly performed," the detection operation is performed again by the pressure sensors 104 after the correction processing (S218), and then, the series of the processing S214 to S217 after the processing for calculating the displacement are repeatedly performed.

As a result of the above-described procedure, the curving state of the bones of the seated passenger is corrected to the ideal curving state according to the build and age of the seated passenger.

Developed Example of Posture Control

In addition to the above-described basic flow of the posture control shown in FIG. 46, developed flows for providing more effective posture control may be employed. The developed flows (first to ninth developed flows) of the posture control will be described below with reference to FIGS. 47 to 55. FIGS. 47 to 55 are flowcharts showing the developed flows of the posture control process.

1) First Developed Flow

In the first developed flow, the bones are divided into a plurality of detection target regions, and the detection operation and the correction processing are performed for each of the divided detection target regions. The case where the bones are divided into three detection target regions of a region A, a region B, and a region C will be described below as an example. The regions A, B, C may correspond respectively to the upper portion of the back, the lower portion of the back, and the seating portion, may correspond respectively to the upper portion of the back, the middle portion of the back, and the lower portion of the back, or may correspond respectively to a far-side portion of the seating portion, a middle portion of the seating portion, and a near-side portion of the seating portion.

Figure 47:
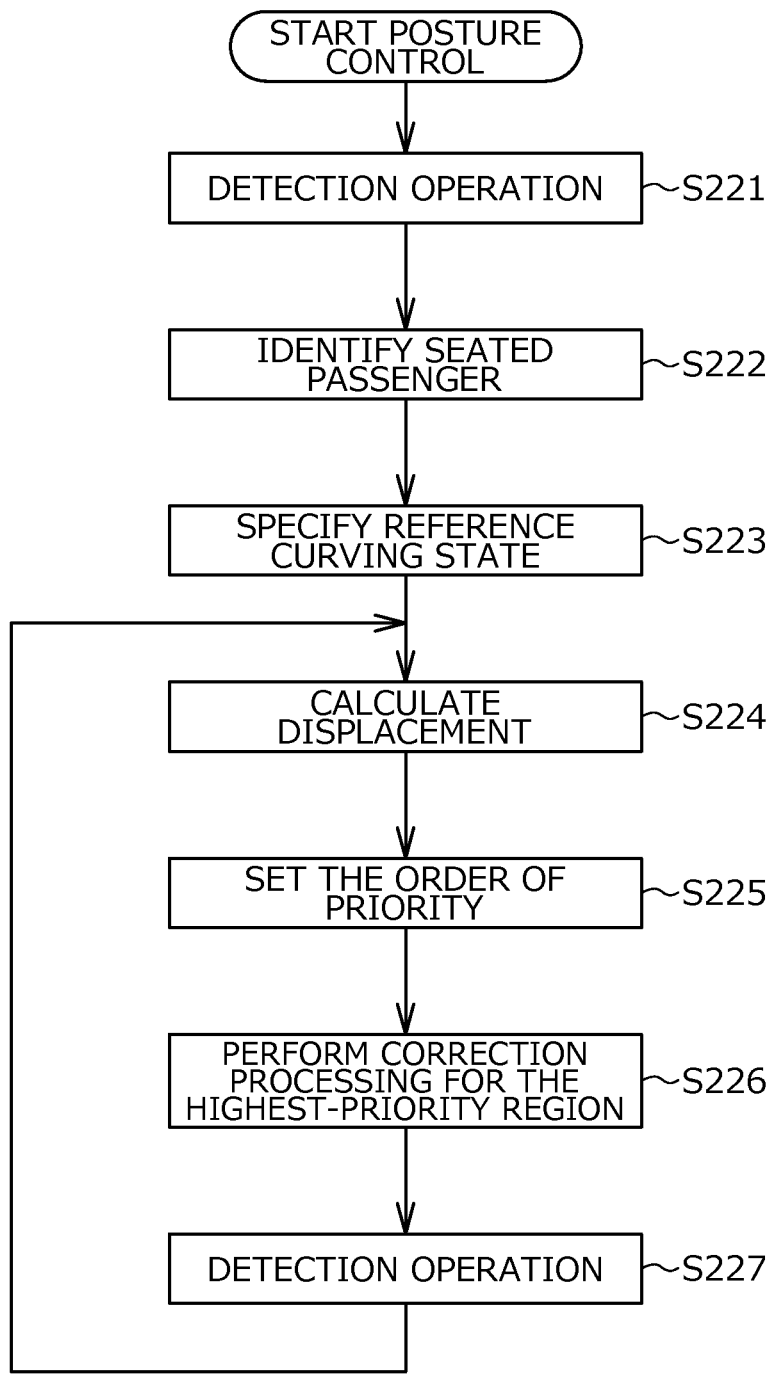
FIG. 47 is a flowchart showing a first developed flow of the posture control process.
Figure 48:
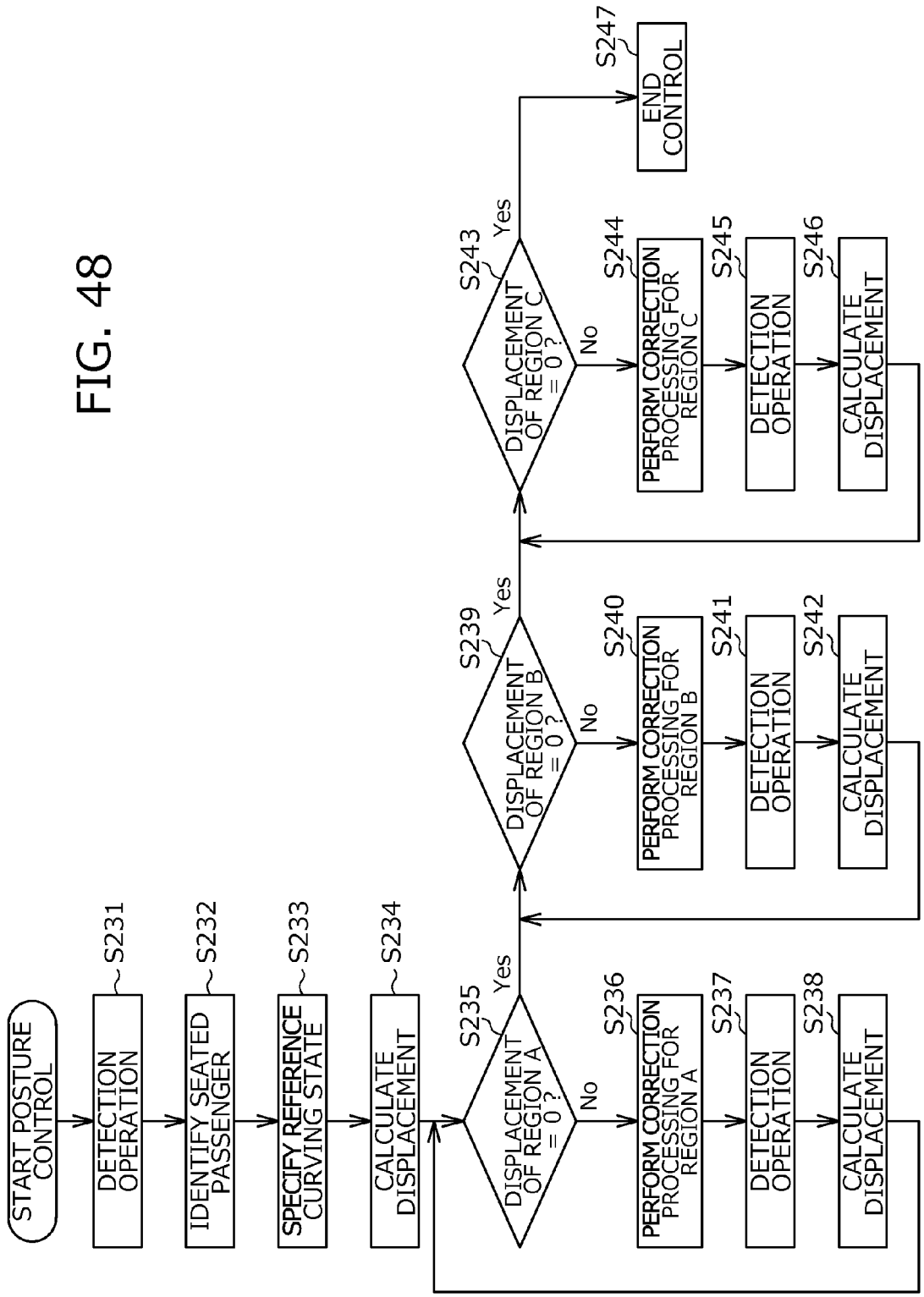
FIG. 48 is a flowchart showing a second developed flow of the posture control process.
Figure 49:
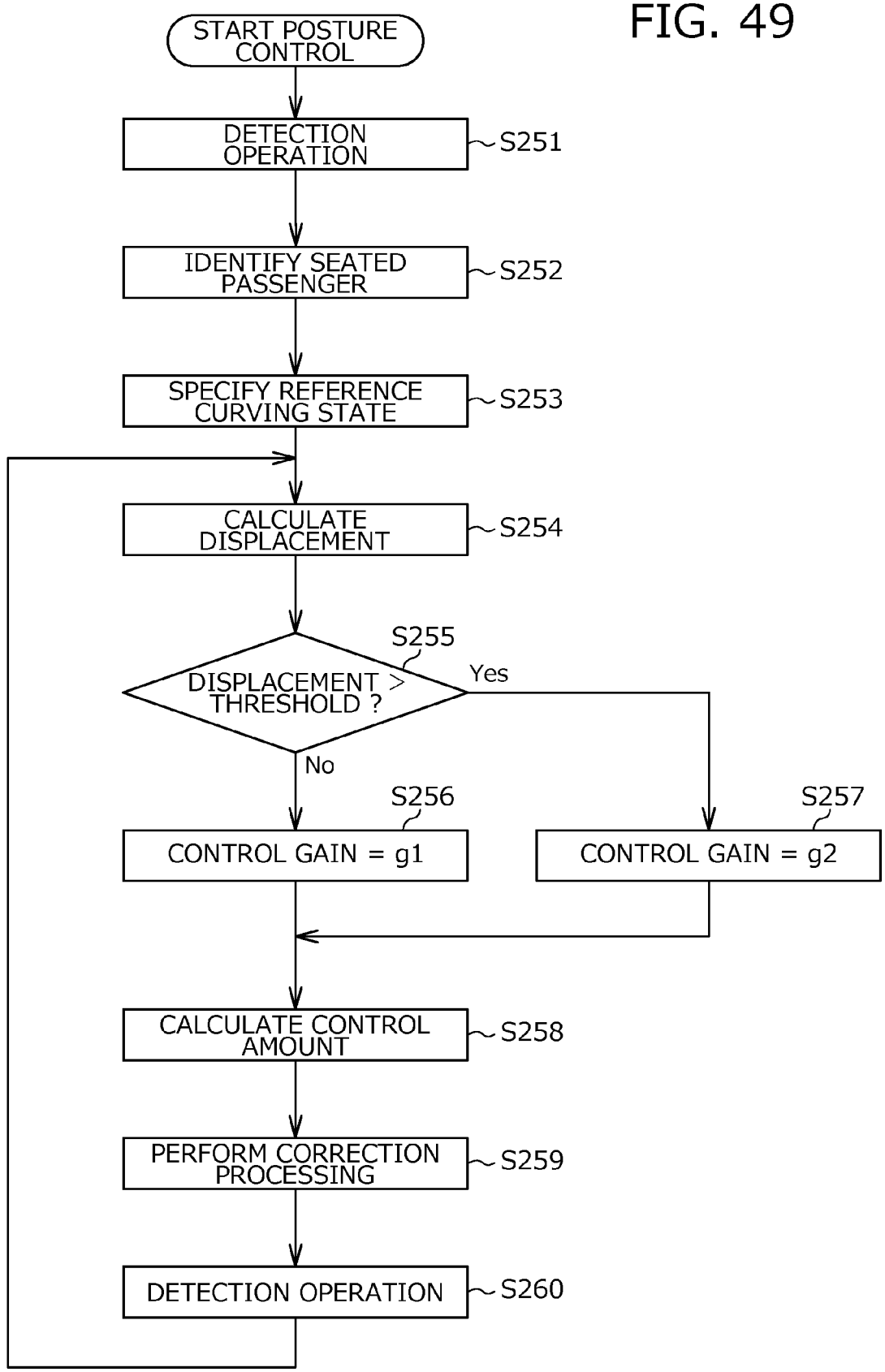
FIG. 49 is a flowchart showing a third developed flow of the posture control process.
Figure 50:
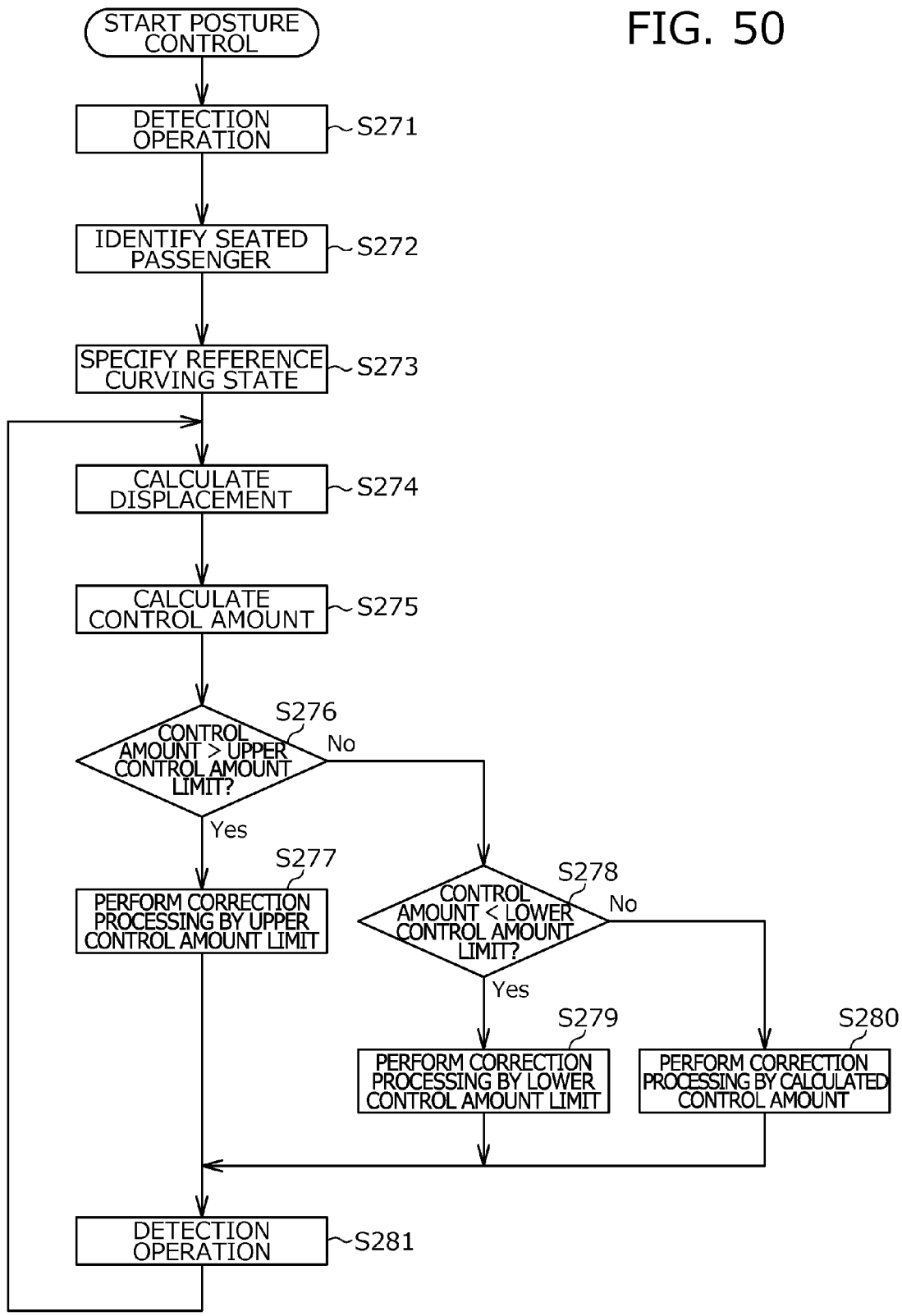
FIG. 50 is a flowchart showing a fourth developed flow of the posture control process.
Figure 51:
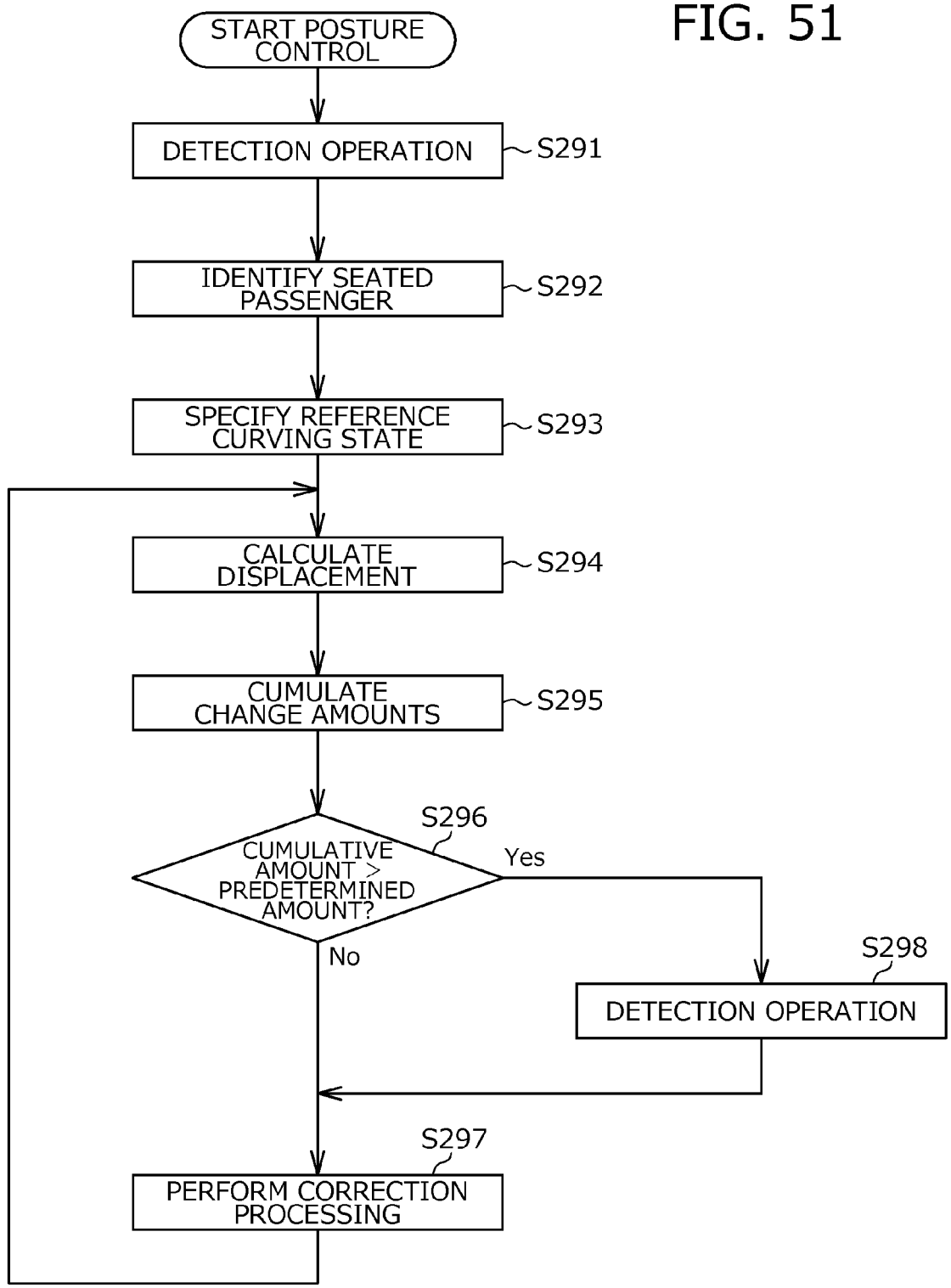
FIG. 51 is a flowchart showing a fifth developed flow of the posture control process.

As shown in FIG. 47, the first developed flow is mostly similar to the basic flow shown in FIG. 46. Specifically, in the first developed flow, when the posture control begins, the detection operation is performed by the pressure sensors 104 (S221). Subsequently, the step for identifying the seated passenger based on the detection results (S222), the step for specifying the reference curving state corresponding to the identified seated passenger (S223), and the step for calculating the displacement between the curving state of the bones detected by the detection operation and the reference curving state (S224) are performed in this order.

During the first developed flow, the curving state of each of a plurality of detection target regions (the regions A, B, C) is detected at the step S221 for performing the detection operation by the pressure sensors 104. Similarly, at the step S223 for specifying the reference curving state, the reference curving state is specified separately for the detection target regions. Moreover, at the step S224 for calculating the displacement, the displacement from the reference curving state is calculated separately for the detection target regions.

After the displacement is calculated separately for the detection target regions, the order of priority is set for the detection target regions based on the displacement (S225). At this point, a higher priority of the detection target region is set for a greater displacement. Then, the controller 109a of the ECU 109 performs the correction processing for one of three detection target regions on which the highest priority is set (S226). That is, in the first developed flow, a portion of the back of the seated passenger corresponding to the highest-priority detection target region with the greatest displacement is pressed on a priority basis, and therefore, the curving state of the region is corrected on a priority basis. When the frequency of performing the posture control is set at "periodically performed" or "constantly performed," the detection operation is performed again by the pressure sensors 104 after the end of the correction processing (S227). Subsequently, the series of the steps S224 to S227 after the processing for calculating the displacement are repeatedly performed.

As described above, in the first developed flow, the curving state is, on a priority basis, corrected in the detection target region where the displacement between the curving state detected by the pressure sensors 104 and the reference curving state is great, i.e., the detection target region highly requiring the correction processing. This can efficiently correct the curving state of the bones.

Not only the order of priority of the detection target regions is determined based on the displacement between the curving state detected by the pressure sensors 104 and the reference curving state, but this order may also be set for the detection target regions according to region defining positions at the back of the seated passenger.

2) Second Developed Flow

In the second developed flow, the bones are, as in the first developed flow, divided into a plurality of detection target regions, and the detection operation and the correction processing are performed for each of the divided detection target regions. The highest-priority detection target region is targeted for the correction processing in the first developed flow, whereas the correction processing is sequentially performed starting from the highest-priority detection target region to eventually perform the correction processing for all of the detection target regions in the second developed flow. The second developed flow will be described with reference to FIG. 48. The following case will be described below as an example: the bones are divided into three detection target regions of regions A, B, C, the highest priority is set on the region A, the second highest priority is set on the region B, and the lowest priority is set on the region C.

In the second developed flow, the procedure S231 to S234 after the detection operation performed by the pressure sensors 104 and before calculation of the displacement of the curving state are similar to those of the first developed flow. In the second developed flow, when the step S234 for calculating the displacement is completed, it is, based on the calculated displacement, determined for each detection target region whether or not the correction processing should be performed. Specifically, it is first determined whether or not the displacement (hereinafter referred to as a "displacement of the region A") of the curving state in the highest-priority region A is 0 (S235). If the displacement of the region A is not 0, the controller 109a of the ECU 109 performs the correction processing for the region A (S236). Subsequently, the detection operation for detecting the corrected curving state is performed by the pressure sensors 104 (S237), and then, the displacement between the corrected curving state and the reference curving state is calculated (S238). A series of these steps S235 to S238 are repeatedly performed until the displacement of the region A reaches 0.

On the other hand, if the displacement of the region A is 0, it is determined whether or not the displacement (hereinafter referred to as a "displacement of the region B") of the curving state in the second-highest-priority region B is 0 (S239). The procedure subsequent thereto is similar to that in the case of the region A. That is, if the displacement of the region B is not 0, the correction processing is repeatedly performed for the region B until the displacement reaches 0 (S240), and the detection operation for detecting the corrected curving state (S241) and the processing for calculating the displacement between the corrected curving state and the reference curving state (S242) are repeatedly performed.

If the displacement of the region B is 0, it is determined whether or not the displacement (hereinafter referred to as a "displacement of the region C") of the curving state in the lowest-priority region C is 0 (S243). The procedure subsequent thereto is similar to that in the cases of the regions A, B. That is, if the displacement of the region C is not 0, the correction processing is repeatedly performed for the region C until the displacement reaches 0 (S244), and the detection operation for detecting the corrected curving state (S245) and the processing for calculating the displacement between the corrected curving state and the reference curving state (S246) are repeatedly performed.

If the displacement of the region C is 0, the ECU 109 ends the posture control (S247).

As described above, in the second developed flow, after the bones are divided into a plurality of detection target regions, the correction processing is sequentially performed for the detection target regions. Since the correction processing is performed separately for the different detection target regions of the bones, the curving state of the bones can be more precisely corrected. Moreover, in the second developed flow, the correction processing for a plurality of detection target regions is preferentially performed from a higher-priority detection target region, and therefore, the curving state of the bones can be efficiently corrected.

3) Third Developed Flow

In the third developed flow, while the correction processing is performed, the controller 109a of the ECU 109 controls the pressing state of each of the pressing units 111, 112 by a control amount according to a control condition. The "control condition" described herein is the condition for determining the control amount applied when the controller 109a controls the pressing state of each of the pressing units 111, 112. Specifically, the control condition is the magnitude relationship between the displacement of the curving state and a threshold for determining a control gain. the threshold is determined depending on, e.g., the position and type (e.g., a driver's seat or a front passenger seat) of the bone correction seat YS, the build, age, etc., of the seated passenger, and the state of a dial or switch provided for setting the threshold. The third developed flow will be described with reference to FIG. 49.

In the posture control proceeding according to the third developed flow, most of the steps (specifically, S251 to S254, S259, and S260 in FIG. 49) are identical to those of the basic flow. In the third developed flow, after the displacement of the curving state is calculated, the controller 109a of the ECU 109 determines whether or not the displacement exceeds the above-described threshold (S255). Subsequently, the controller 109a determines the control gain according to the determination result (S256, s257). The "control gain" described herein is the ratio of the control amount in control of the pressing state of each of the pressing units 111, 112 by the controller 109a to the above-described displacement. That is, the control gain is equivalent to the degree of correction when the curving state of each portion of the bones is corrected by the correction processing, more specifically the correction amount per unit time. Plural control gains are set according to the control condition (specifically, the above-described magnitude relationship between the displacement and the threshold), and are stored in the memory 109b of the ECU 109.

The controller 109a calculates the control amount based on the control gain, stored in the memory 109b, corresponding to the control condition in the correction processing and the displacement of the curving state (S258). More specifically, if the displacement of the curving state does not exceed the threshold ("No" at S255), the controller 109a calculates the control amount using a control gain g1 for the case where the displacement does not exceed the threshold (S256, S258). On the other hand, if the displacement of the curving state exceeds the threshold ("Yes" at S255), the controller 109a calculates the control amount using a control gain g2 for the case where the displacement exceeds the threshold (S257, S258). After calculating the control amount, the controller 109a performs the correction processing. In this processing, the pressing state of each of the pressing units 111, 112 is controlled by the calculated control amount (S259).

As described above, in the third developed flow, the curving state of the bones is corrected at the correction degree corresponding to the control condition at the moment of the correction processing. Specifically, the correction degree is adjusted according to, e.g., the position of the bone correction seat YS and the build and age of the seated passenger. Thus, for example, even when the bone correction seat YS is positioned above (or forward) a predetermined position and this situation requires avoidance of sudden posture control action, if the posture control proceeds according to the third developed flow, the control amount is calculated using a smaller control gain g2, and as a result, the sudden posture control action can be avoided.

4) Fourth Developed Flow

In the fourth developed flow, the control amount applied when the controller 109a of the ECU 109 controls the pressing state of each of the pressing units 111, 112 is limited within an allowable range. The fourth developed flow will be described below with reference to FIG. 50.

In the fourth developed flow, a series of the steps S271 to S274 after the beginning of the posture control and before calculation of the displacement of the curving state are identical to those of the basic flow. After measuring the displacement of the curving state, the controller 109a of the ECU 109 calculates, based on the displacement of the curving state, the control amount applied when the pressing state of each of the pressing units 111, 112 is controlled (S275). Subsequently, the controller 109a determines whether or not the calculated control amount falls within the allowable range (S276, S278). Specifically, the preset upper and lower limits of the control amount are stored in the memory 109b of the ECU 109, and the controller 109a determines whether or not the calculated control amount exceeds the upper control amount limit (S276). If the calculated control amount exceeds the upper control amount limit, the controller 109a controls, in the correction processing, the pressing state of each of the pressing units 111, 112 by the upper control amount limit (S277).

On the other hand, if the calculated control amount does not exceed the upper control amount limit, the controller 109a determines whether or not the calculated control amount falls below the lower control amount limit (S278). If the calculated control amount falls below the lower control amount limit, the controller 109a controls, in the correction processing, the pressing state of each of the pressing units 111, 112 by the lower control amount limit (S279). Conversely, if the calculated control amount does not fall below the lower control amount limit, the controller 109a performs the correction processing by the calculated control amount (S280).

In the fourth developed flow, if the frequency of performing the posture control is set at the "periodically performed" or the "constantly performed," the detection operation is performed again by the pressure sensors 104 after completion of the correction processing (S281). Subsequently, a series of the steps S274 to S281 after calculation of the displacement are repeatedly performed.

As described above, in the fourth developed flow, the controller 109a of the ECU 109 controls, in the correction processing, the pressing state of each of the pressing units 111, 112 by the control amount set to not fall outside the allowable range. Thus, while the correction processing is performed, the following states can be suppressed: an excessive load is applied onto the seated passenger; and a sufficient load required for correction is not applied to the seated passenger.

5) Fifth Developed Flow

In the fifth developed flow, the detection operation is periodically performed by the pressure sensors 104. Moreover, the displacement of the curving state is obtained every time the detection operation is performed, and then, the amount of change (hereinafter referred to as a "change amount") in the displacement is obtained. The "change amount" described herein is the difference between a currently-obtained displacement and a previously-obtained displacement. In the fifth developed flow, the change amounts calculated from the beginning of the posture control to a current point of time are cumulated, and when the cumulative result exceeds a predetermined amount, the correction processing is performed. The fifth developed flow will be described below with reference to FIG. 51.

In the fifth developed flow, a series of the steps S291 to S294 after the beginning of the posture control and before calculation of the displacement of the curving state are identical to those of the basic flow. After calculating the displacement of the curving state, the controller 109a of the ECU 109 calculates the above-described change amounts to cumulate the change amounts calculated from the beginning of the posture control to a current point of time (S295). Subsequently, the controller 109a determines whether or not the cumulative result of the change amounts exceeds the predetermined amount (S296). If the cumulative result does not exceed the predetermined amount ("No" at S296), the detection operation is performed again by the pressure sensors 104 (S297). Subsequently, the series of the processing S294 to S297 are repeatedly performed until the above-described cumulative result exceeds the predetermined amount. When the cumulative result exceeds the predetermined amount ("Yes" at S296), the correction processing is performed (S298).

As described above, in the fifth developed flow, the change amounts in the displacement of the curving state are cumulated, and this cumulative result is used for determining whether or not the correction processing is performed. The posture of the seated passenger changes depending on the degree of fatigue, and the displacement of the curving state changes with the change in the seating posture. Thus, the cumulative result obtained by accumulation of the change amounts in the displacement of the curving state reflects the degree of fatigue of the seated passenger. In the fifth developed flow, based on the above-described cumulative result indicating the degree of fatigue, it is determined whether or not the correction processing is performed. Thus, the posture control can be provided according to the degree of fatigue of the seated passenger.

6) Sixth Developed Flow

Figure 52:
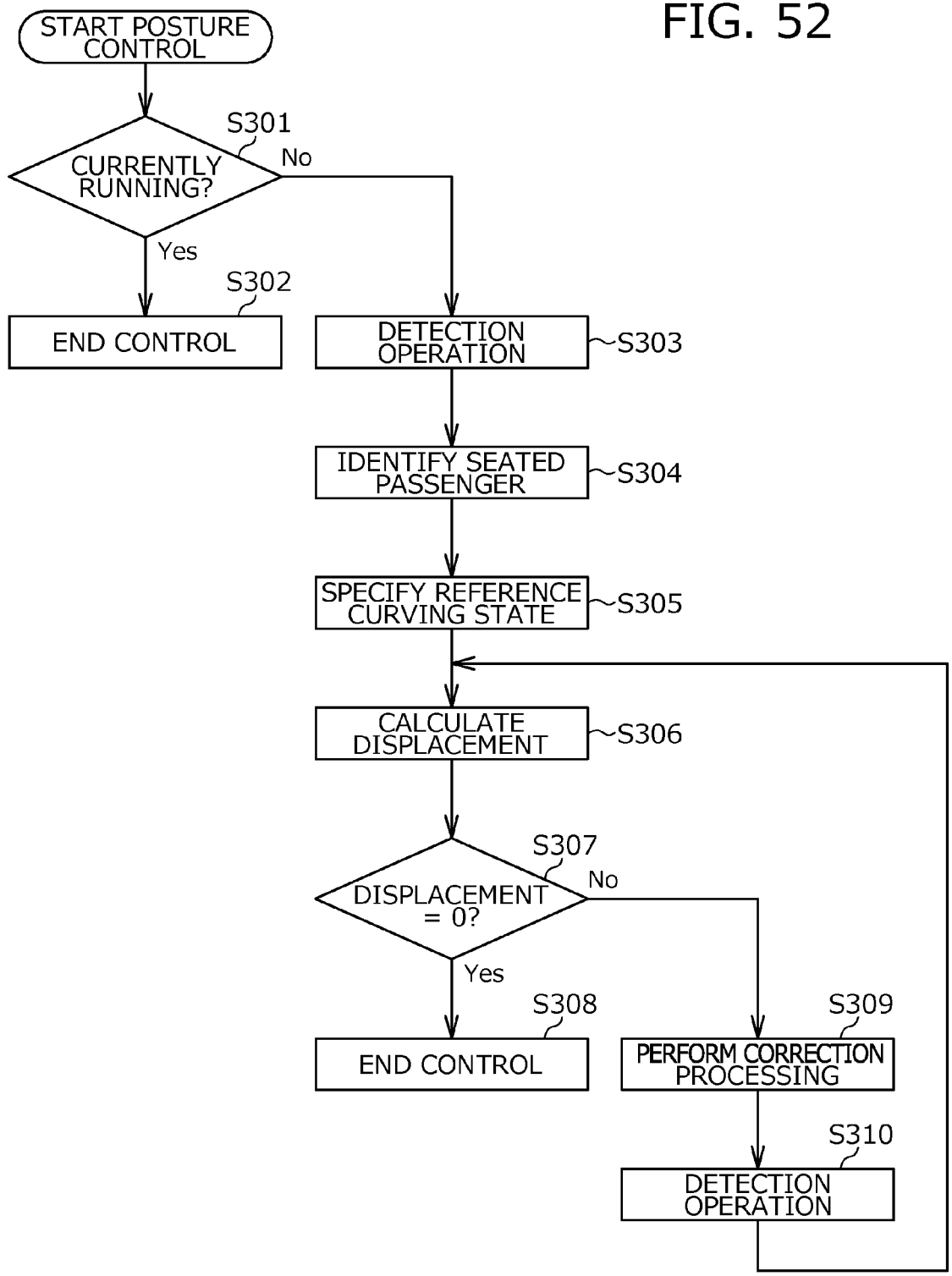
FIG. 52 is a flowchart showing a sixth developed flow of the posture control process.
Figure 53:
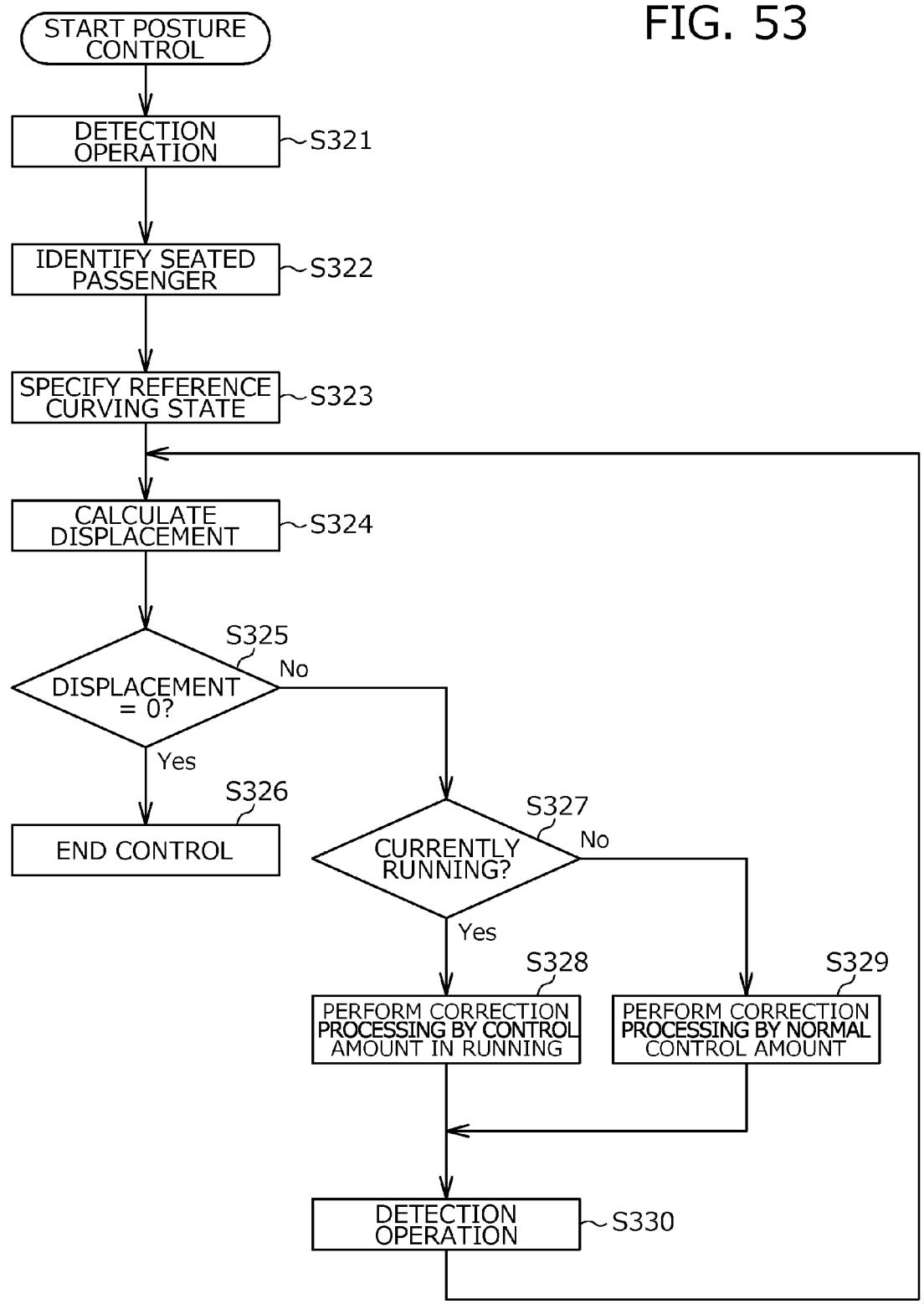
FIG. 53 is a flowchart showing a seventh developed flow of the posture control process.

In the sixth developed flow, it is, according to a running situation of the vehicle, determined whether or not the correction processing is performed. Specifically, in the sixth developed flow, when the posture control begins, the controller 109a of the ECU 109 determines, as shown in FIG. 52, whether or not the vehicle is currently running (S301). If it is determined that the vehicle is running ("Yes" at S301), the controller 109a ends the posture control (S302). On the other hand, if it is determined that the vehicle is not running ("No" at S301), the controller 109a proceeds with the posture control by the procedure similar to that of the basic flow, and performs the series of the steps (S303 to S310 in FIG. 52) for the posture control.

As described above, in the sixth developed flow, performance of the correction processing can be limited according to the running situation of the vehicle. This can reduce the influence of the correction processing on operation of the vehicle. More clearly, large correction of the curving state of the bones of the person (the driver) seated on the driver's seat during running of the vehicle provides a great feeling of discomfort to the driver. Thus, such a situation should be avoided. For this reason, when the posture control is performed for the driver, if the sixth developed flow is employed, performance of the correction processing is limited while the vehicle is running. As a result, the curving state of the bones of the driver can be controlled at proper timing without disturbing operation of the vehicle.

The vehicle running situation targeted for limitation of performance of the correction processing is not limited to the situation while the vehicle is running. For example, performance of the correction processing may be limited in the following cases: the vehicle is running at equal to or higher than a predetermined speed; the vehicle is non-linearly running; and the vehicle is running during a predetermined time period (e.g., a morning time).

7) Seventh Developed Flow

In the seventh developed flow, the correction processing is limited according to the running situation of the vehicle as in the sixth developed flow. More specifically, the control amount applied when each of the pressing units 111, 112 is controlled in the correction processing is adjusted according to the running situation of the vehicle. The seventh developed flow will be described below with reference to FIG. 53.

In the seventh developed flow, a series of the steps S321 to S324 after the beginning of the posture control and before calculation of the displacement of the curving state are identical to those of the basic flow. After calculating the displacement, the controller 109a of the ECU 109 determines whether or not the displacement is 0 (S325). If the displacement is 0, the posture control is ended (S326). On the other hand, if the displacement is not 0, the controller 109a determines whether or not the vehicle is currently running (S327).

Then, if it is determined that the vehicle is running ("Yes" at S327), the controller 109a performs the correction processing by a control amount in running (S328). If it is determined that the vehicle is not running ("No" at S327), the correction processing is performed by a normal control amount. The "normal control amount" described herein is the control amount obtained by general calculating procedure without specific limitations as the control amount applied when the controller 109a controls the pressing state of each of the pressing units 111, 112. The "control amount in running" is the control amount obtained by such calculating procedure that the control amount in running is less than the normal control amount.

If the frequency of performing the posture control is set at the "periodically performed" or the "constantly performed," the detection processing is performed again by the pressure sensors 104 after completion of the correction processing (S330). Subsequently, a series of the steps S324 to S330 after calculation of the displacement are repeatedly performed.

As described above, in the seventh developed flow, since the control amount in the correction processing is limited according to the running situation of the vehicle, the advantage similar to that of the sixth developed flow, i.e., the advantage that the influence of the correction processing on operation of the vehicle is reduced, can be provided. In the seventh developed flow, the vehicle running situation taken into consideration in order to limit the control amount in the correction processing is, as in the sixth developed flow, not limited to the situation where the vehicle is running or is not running. The vehicle speed, the running pattern (linearly running or non-linearly running), or the time period in which the vehicle is running may be taken into consideration.

8) Eighth Developed Flow

Figure 54:
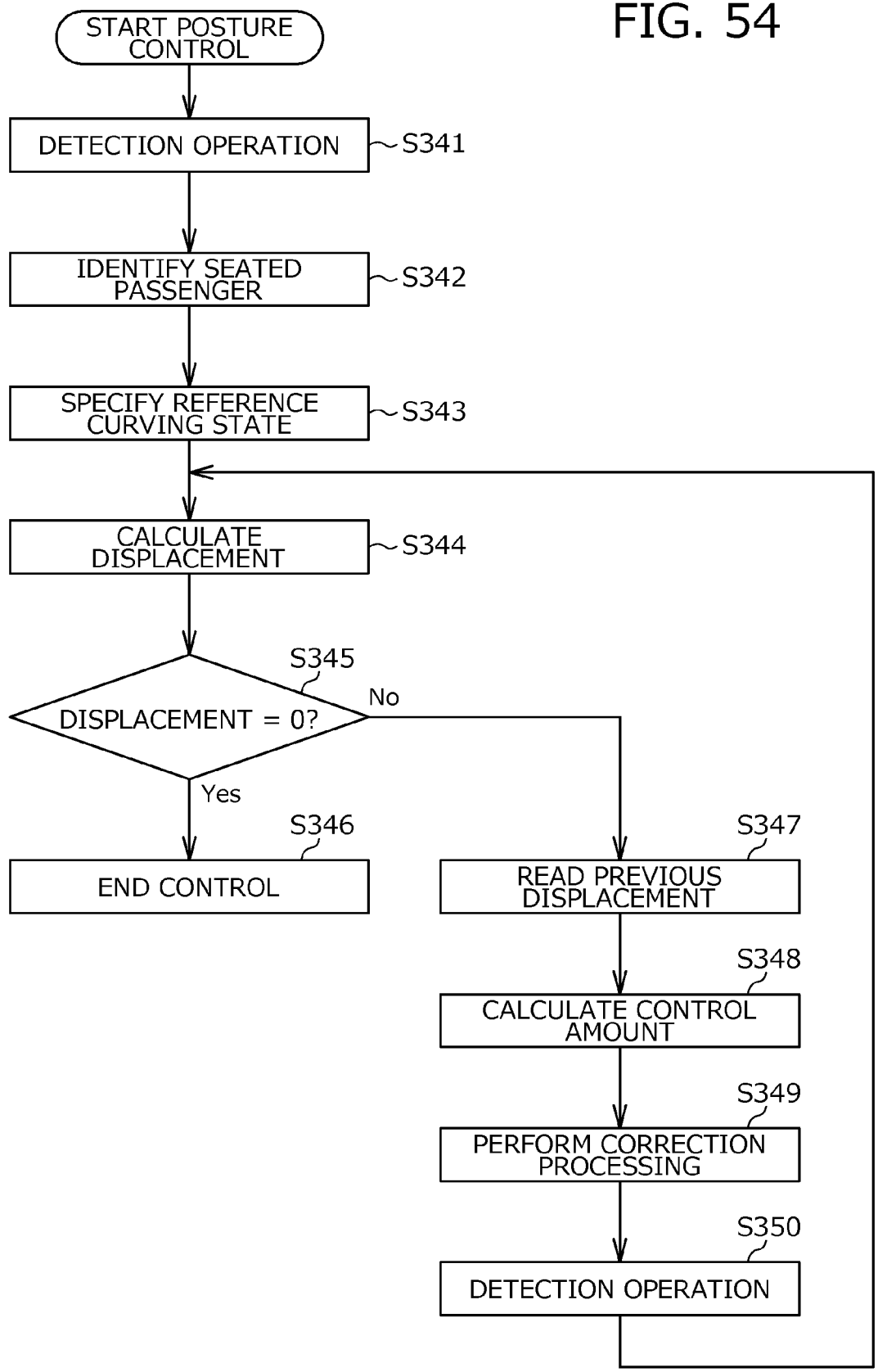
FIG. 54 is a flowchart showing an eighth developed flow of the posture control process.

In the eighth developed flow, the series of the steps S341 to S350 performed in the posture control are substantially identical to those of the basic flow as shown in FIG. 54. On the other hand, in the eighth developed flow, in order to calculate the control amount applied when the pressing state of each of the pressing units 111, 112 is controlled, the displacements (hereinafter referred to as "previous displacements") of the curving state calculated in the preceding posture control are read (S347), and then, a control amount is calculated based on the previous displacement and a current displacement (S348). That is, in the eighth developed flow, the above-described control amount is calculated based on the detection result obtained by the most-recently-performed detection operation and the detection results obtained by the detection operation made prior to the most-recently-performed detection operation. Then, in the correction processing, the pressing state of each of the pressing units 111, 112 is controlled by the above-described control amount.

As described above, in the eighth developed flow, since the correction processing is performed based on the current detection result and the previous detection results obtained prior thereto, the curving state of the bones can be corrected considering a temporal change in the curving state. As a result, the tendency of changing the curving state of the bones of the seated passenger can be grasped, and the curving state of the bones can be corrected at a suitable correction degree according to such tendency. The method for calculating the control amount from the previous displacements and the current displacement is not limited. For example, the control amount may be calculated from an average of the previous and current displacements. Alternatively, each of the previous and current displacements may be weighted, and then, the control amount may be calculated.

9) Ninth Developed Flow

Figure 55:
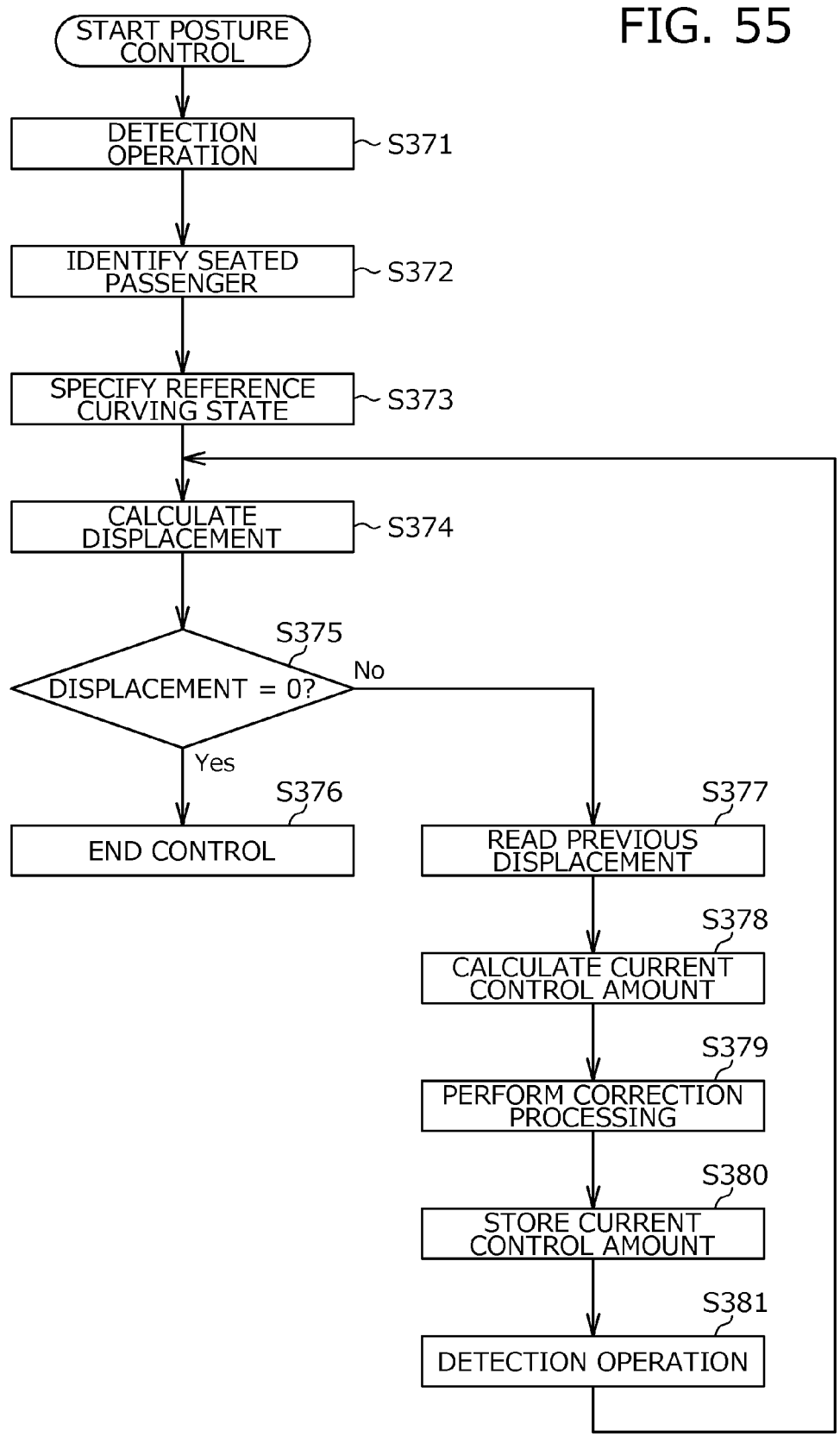
FIG. 55 is a flowchart showing a ninth developed flow of the posture control process.

In the ninth developed flow, the controller 109a learns, in a certain turn of the correction processing, the control amount applied when each of the pressing units 111, 112 is controlled. The controller 109a reflects the control amount in subsequent turns of the correction processing. More specifically, a series of the steps S371 to S374 after the beginning of the posture control and before calculation of the displacement of the curving state are identical to those of the basic flow as shown in FIG. 55. After the displacement is calculated, it is determined whether or not the displacement is 0 (S375). If the displacement is 0, the posture control is ended (S376).

On the other hand, if the displacement is not 0, the controller 109a performs the correction processing. At this point, in order to calculate a control amount (hereinafter referred to as a "current control amount") applied in a current turn of the correction processing, the controller 109a reads, from the memory 109b, a control amount (hereinafter referred to as a "previous control amount") applied in a previous turn of the correction processing (S377). Then, the controller 109a calculates the current control amount according to the displacement of the curving state and the previous displacement (S378), and performs the current turn of the correction processing by the calculated control amount (S379). the method for calculating the current control amount according to the previous control amount is not limited. For example, the control amount may be obtained in such a manner that the control amount obtained from the displacement of the curving state by a general calculation method is multiplied by a coefficient corresponding to the previous control amount, and may be used as the current control amount.

After the correction processing is performed, the controller 109a stores the current control amount in the memory

109b (S380). If the frequency of performing the posture control is set at "periodically performed" or "constantly performed," the detection operation is performed again by the pressure sensors 104 after the correction processing (S381). Subsequently, a series of the steps S374 to S381 after calculation of the displacement are repeatedly performed.

As described above, in the ninth developed flow, the control amount at each turn of the correction processing is learned, and the learned contents are reflected in subsequent turns of the correction processing. Thus, in each turn of the correction processing, the curving state of the bones can be corrected at the correction degree set according to a history of the performed correction processing, for example.

The configuration of actively correcting the curving state of the spine of the passenger seated on the bone correction seat YS and the control flow thereof have been described above. Such configuration and control flow are not limited to those of the foregoing embodiments, and other embodiments may be employed as long as the curving state of the spine can be actively corrected. For example, according to the above-described embodiments, in the posture control process, the detection operation is first performed by the pressure sensors 104. Then, the curving state of the bones of the seated passenger is specified based on the detection results, and the seated passenger is identified based on the specified result. Subsequently, the reference curving state corresponding to the identified seated passenger is specified from the reference curving states stored in the memory 109b. The present invention is not limited to such a configuration. The processing for identifying the seated passenger may be skipped as long as the curving state of the bones indicated by the detection results of the pressure sensors 104 can be specified and the reference curving state corresponding to such a curving state can be specified.

In the above-described embodiments, the reference curving states are stored in the memory 109b, but may be updated in association with, e.g., an increase in the age of the seated passenger. Moreover, in the above-described embodiments, the reference curving state is set separately for the seated passengers and the detection target regions, but may be set separately for the positions of the bone correction seat YS or the running situations of the vehicle.

Further, in the above-described embodiments, as illustrated in FIG. 45, the information (the information R2 in FIG. 45) indicating the current status of the curving state of the bones is displayed on the operation panel provided inside the vehicle. Since the information indicating the curving state of the bones is displayed on the panel or monitor provided inside the vehicle, the seated passenger can set, based on this, the frequency of performing the correction processing according to the curving state of the bones at a current point of time, for example. Moreover, the information indicating the curving state of the bones at each point of time before and after the previous turn of the correction processing may be displayed on the panel or the monitor. Alternatively, the current curving state of the bones may be displayed as compared to the ideal curving state. Such a displayed comparison is viewed by the seated passenger, and causes the seated passenger to improve the curving state of the bones by correction. Based on the displayed information, the frequency of performing correction and the degree of correction can be set by the seated passenger oneself, and the curving state of the bones can be corrected in a stepwise manner according to the set values.

TABLE OF REFERENCE NUMERALS

| | |
|---|---|
| 1 | Upper Frame |
| 2 | Side Frame |
| 2a | Side Plate, |
| 2b | Front Edge Portion |
| 3 | Lower Connection Frame |
| 4 | Side Air Cell |
| 5 | Pressure Receiving Plate |
| 5a | Connection Wire |
| 6 | Pillar Position Adjustment Mechanism |
| 7 | Pillar Support Portion |
| 8 | Waist Air Cell |
| 9 | Cushion Air Cell |
| 10 | Air Cell |
| 11 | Support Plate |
| 12 | Holding Pipe |
| 13 | Attachment Bracket |
| 13a | Base Portion, |
| 13b | Side Portion |
| 14 | Rod-Shaped Member |
| 15 | Wire |
| 16 | Pressure Receiving Plate |
| 20 | Resin Plate |
| 20a | Cutout |
| 21 | Deformable Portion |
| 22 | Extension |
| 23 | Groove |
| 24 | Cutout |
| 25 | Deformable Piece on One End Side |
| 26 | Deformable Piece on the Other End Side |
| 30 | Ottoman Air Cell |
| 31 | Support Member |
| 31a | Support Piece |
| 40 | Shape Sensor |
| 41 | Body Pressure Sensor |
| 41a | Detector, |
| 41b | Transmission Line |
| 42 | Capacitance Sensor |
| 50 | Controller |
| 51 | Pillar Position Adjustment Mechanism |
| 52 | Compressor |
| 53 | Air Supply Line |
| 54 | Solenoid Valve |
| 55 | Tilt Mechanism |
| 61 | Front-Back Position Adjustment Mechanism |
| 62 | Height Adjustment Mechanism |
| 63 | Cushion Length Adjustment Mechanism |
| 101, 101a, 101b | Air Cell |
| 102, 105 | Holding Frame |
| 103, 106 | Actuator |
| 104 | Pressure Sensor |
| 107 | Actuator |
| 107a | Rod |
| 109 | ECU |
| 109a | Controller |
| 109b | Memory |
| 110 | Correction Device |
| 111 | Back-Side Unit |
| 111a | First Back-Side Pressing Mechanism |
| 111b | Second Back-Side Pressing Mechanism |
| 111c | Third Back-Side Pressing Mechanism |
| 112 | Leg-Side Unit |
| 112a | First Leg-Side Pressing Mechanism |
| 112b | Second Leg-Side Pressing Mechanism |
| 112c | Third Leg-Side Pressing Mechanism |
| 120, 130, 140 | Correction Device |
| 131a, 131b, 131c, 141a, 141b, 141c | Back-Side Pressing Mechanism |
| S | Seat |
| S1 | Seat Back |
| S2 | Seat Cushion |
| S3 | Head Rest |
| Sa1 | Shoulder Support Portion |
| Sa2 | Side Support |
| Sf1 | Seat Back Frame |
| C1, C2 | Tube Member |
| CS | Control System |
| hp | Head Rest Pillar |
| XS | Application Seat |
| Xf2 | Cushion Frame |

-continued

TABLE OF REFERENCE NUMERALS

| | |
|---|---|
| XS1 | Seat Back |
| XS2 | Seat Cushion |
| XS3 | Head Rest |
| Xa1 | Shoulder Support |
| Xa2 | Side Support |
| Xa3 | Lumber Support |
| Xa4 | Side Cushion Support |
| Xa5 | Ottoman Portion |
| XP1, XP2 | Pad Material |
| Pa1 | Flat Portion, |
| Pb1 | Projection, |
| Pc1 | Insertion Groove |
| YP1 | Back Pad |
| YP2 | Cushion Pad |
| FR | Fixed Rail |
| Gm | Drive Portion |
| MP | Movable Plate |
| MR | Movable Rail |
| PL | Support Plate |
| PLa | Tube Hole |
| PP | Pad Piece |
| QL | Support Plate |
| QLa | Tube Hole |
| YS | Bone Correction Seat |
| YS1 | Seat Back |
| YS2 | Seat Cushion |
| YS3 | Head Rest |
| Yf1 | Seat Back Frame |
| Yf2 | Cushion Frame |
| B1, B2, B3 | Mode Selection Button |
| B4, B5, B6 | Frequency Selection Button |
| R1, R2 | Information |

The invention claimed is:

1. A vehicle seat comprising:
a seat back that supports a seated passenger from a rear, wherein:
  a shoulder support portion provided at the seat back and that supports each of shoulders of the seated passenger includes a bag that expands by supply of fluid into the bag,
  the bag expands such that one end portion of the shoulder support portion positioned on an outside in a width direction of the vehicle seat moves more forward than another end portion of the shoulder support portion positioned on an inside in the width direction, and
  when the bag expands to move the one end portion more forward than the other end portion, an upper portion of the one end portion moves more forward than a lower portion of the one end portion.

2. The vehicle seat according to claim 1, wherein the bag is arranged such that an outer portion of an upper end of the bag on the outside in the width direction is positioned below an inner portion of the upper end of the bag on the inside in the width direction.

3. The vehicle seat according to claim 1, wherein:
the seat back includes a plate-shaped member disposed in a front of the bag,
when the bag expands while contacting a rear surface of the plate-shaped member, the plate-shaped member deforms such that a portion of the plate-shaped member corresponding to the one end portion is positioned more forward than a portion of the plate-shaped member corresponding to the other end portion, thereby moving the one end portion more forward than the other end portion, and
an area of a front surface of the plate-shaped member is greater than an area of a surface of the bag contacting the plate-shaped member.

4. The vehicle seat according to claim 1, wherein:
the seat back includes a plate-shaped member disposed in the front of the bag,
when the bag expands while contacting the rear surface of the plate-shaped member, the plate-shaped member deforms such that the portion of the plate-shaped member corresponding to the one end portion is positioned more forward than the portion of the plate-shaped member corresponding to the other end portion, thereby moving the one end portion more forward than the other end portion, and
in the plate-shaped member, a dividing portion divides the plate-shaped member into first and second portions and is formed between the first and second portions, the first portion being positioned in the rear of one of the shoulders of the seated passenger, and the second portion being positioned in the rear of another shoulder of the seated passenger.

5. A vehicle seat, comprising:
a seat back that supports a seated passenger from a rear, wherein:
  a shoulder support portion provided at the seat back and that supports each of shoulders of the seated passenger includes a bag that expands by supply of fluid into the bag,
  the bag expands such that one end portion of the shoulder support portion positioned on an outside in a width direction of the vehicle seat moves more forward than another end portion of the shoulder support portion positioned on an inside in the width direction,
  the seat back comprises:
    a plate-shaped member disposed in the front of the bag; and
    movement restriction portions disposed respectively at both end portions of the seat back in the width direction that restrict movement of the seated passenger in the width direction,
  the plate-shaped member comprises:
    a deformable portion that, when the bag expands while contacting the rear surface of the plate-shaped member, deforms such that the portion of the plate-shaped member corresponding to the one end portion is positioned more forward than the portion of the plate-shaped member corresponding to the other end portion, and
    an extension positioned below the deformable portion and extending downward to pass a space between the movement restriction portions in the width direction,
  wherein the extension:
    is narrower than the deformable portion in the width direction, and
    is disposed such that both ends of the extension in the width direction are positioned on an inside of the movement restriction portions.

6. The vehicle seat according to claim 1, wherein:
the bag includes two bags arranged in the width direction, and
a tube member that forms a path of fluid to be supplied to each bag and to be sucked from each bag is disposed to pass a middle portion of the seat back where a clearance is formed between the bags in the width direction.

7. The vehicle seat according to claim 1, wherein:
the seat back includes a plate-shaped member disposed in the front of the bags,
the plate-shaped member includes, at an upper end portion thereof, a deformable portion that, when the bag expands while contacting the rear surface of the plate-shaped member, deforms such that the portion of the plate-shaped member corresponding to the one end portion is positioned more forward than the portion of the plate-shaped member corresponding to the other end portion, and an outer end portion of an outer edge of the deformable portion positioned on the outside in the width direction inclines downward toward the outside in the width direction.

8. A vehicle seat, comprising:

a seat back that supports a seated passenger from a rear, wherein:

a shoulder support portion provided at the seat back and that supports each of shoulders of the seated passenger includes a bag that expands by supply of fluid into the bag, the bag expands such that one end portion of the shoulder support portion positioned on an outside in a width direction of the vehicle seat moves more forward than another end portion of the shoulder support portion positioned on an inside in the width direction, the seat back includes a plate-shaped member disposed in the front of the bags, the plate-shaped member comprises:

a deformable portion that, when the bag expands while contacting the rear surface of the plate-shaped member, deforms such that the portion of the plate-shaped member corresponding to the one end portion is positioned more forward than the portion of the plate-shaped member corresponding to the other end portion, and an extension positioned below the deformable portion and extending downward, and the deformable portion and the extension are integrally connected together.

9. The vehicle seat according to claim 1, wherein:

the seat back comprises:

a seat back frame forming a framework of the seat back;

a support plate attached to the seat back frame that supports the bags from the rear; and a holding portion attached to the seat back frame that contacts a rear surface of the support plate to hold the support plate.

10. The vehicle seat according to claim 1, wherein the bag is arranged such that a direction from an end of the bag on the inside in the width direction toward an end of the bag on the outside in the width direction is coincident with a longitudinal direction of the bag.

11. The vehicle seat according to claim 10, wherein a length in a vertical direction is greater in an end portion of the bag on the inside in the width direction than in an end portion of the bag on the outside in the width direction.

12. The vehicle seat according to claim 1, wherein:

the seat back includes a pillar support portion that supports a head rest pillar extending from a lower portion of a head rest of the vehicle seat, and the bag is arranged such that an end of the bag on the inside in the width direction is positioned on the inside relative to a middle of the pillar support portion in the width direction.

13. The vehicle seat according to claim 1, wherein:

the seat back includes a plate-shaped member disposed in the front of the bags, the plate-shaped member includes a deformable portion that, when the bags expand while contacting the rear surface of the plate-shaped member, deforms such that the portion of the plate-shaped member corresponding to the one end portion is positioned more forward than the portion of the plate-shaped member corresponding to the other end portion, and in a state in which the seated passenger is seated on the vehicle seat, the deformable portion deforms, by expansion of the bags, while curving to cover around the shoulders of the seated passenger.

14. The vehicle seat according to claim 1, wherein:

the seat back includes a plate-shaped member disposed in the front of the bags, when the bags expand while contacting the rear surface of the plate-shaped member, the plate-shaped member deforms such that the portion of the plate-shaped member corresponding to the one end portion is positioned more forward than the portion of the plate-shaped member corresponding to the other end portion, thereby moving the one end portion more forward than the other end portion, and each bag is arranged such that an end of the bag on the outside in the width direction is positioned on the outside relative to an end of the plate-shaped member on the outside in the width direction.

15. The vehicle seat according to claim 1, wherein:

the seat back includes a seat back frame forming a framework of the seat back, and each bag is arranged such that a front end of the bag is positioned more forward than the seat back frame when the bag expands.

16. The vehicle seat according to claim 1, wherein:

the seat back includes a seat back frame forming a framework of the seat back, and each bag is provided such that an end of the bag on the outside in the width direction is positioned on the outside relative to an end of the seat back frame on the outside in the width direction.

17. The vehicle seat according to claim 1, wherein:

the seat back comprises:

a seat back frame forming a framework of the seat back;

a connection member that connects between one end portion of the seat back frame and another end portion of the seat back frame in the width direction; and a plate-shaped support plate that supports the bag from the rear, and the support plate is fixed to the connection member.

18. The vehicle seat according to claim 17, wherein, in a vertical direction, a region of the seat back where the bag is arranged overlaps with a region of the seat back where the connection member is disposed.

19. The vehicle seat according to claim 1, wherein:

the seat back includes a plate-shaped member disposed in the front of the bags, the plate-shaped member includes a deformable portion that, when the bags expand while contacting the rear surface of the plate-shaped member, deforms such that the portion of the plate-shaped member corresponding to the one end portion is positioned more forward than the portion of the plate-shaped member corresponding to the other end portion, and a lower end region of an outer edge of the deformable portion in the portion located at an end portion on the outside in the width direction inclines inward in the width direction toward a lower side.

* * * * *